(12) United States Patent
Kume et al.

(10) Patent No.: US 12,539,874 B2
(45) Date of Patent: Feb. 3, 2026

(54) AUTOMATED DRIVING CONTROL DEVICE, NON-TRANSITORY COMPUTER READABLE STORAGE MEDIUM STORING AUTOMATED DRIVING CONTROL PROGRAM, PRESENTATION CONTROL DEVICE, AND NON-TRANSITORY COMPUTER READABLE STORAGE MEDIUM STORING PRESENTATION CONTROL PROGRAM

(71) Applicant: DENSO CORPORATION, Kariya (JP)

(72) Inventors: Takuya Kume, Kariya (JP); Kazuki Izumi, Kariya (JP)

(73) Assignee: DENSO CORPORATION, Kariya (JP)

( * ) Notice: Subject to any disclaimer, the term of this patent is extended or adjusted under 35 U.S.C. 154(b) by 196 days.

(21) Appl. No.: 18/476,291

(22) Filed: Sep. 27, 2023

(65) Prior Publication Data
US 2024/0034345 A1     Feb. 1, 2024

Related U.S. Application Data

(63) Continuation of application No. PCT/JP2022/007563, filed on Feb. 24, 2022.

(30) Foreign Application Priority Data

Mar. 30, 2021  (JP) .................................. 2021-057769
Oct. 6, 2021   (JP) .................................. 2021-164998
Nov. 22, 2021  (JP) .................................. 2021-189632

(51) Int. Cl.
*B60Q 1/00*       (2006.01)
*B60W 30/165*     (2020.01)
(Continued)

(52) U.S. Cl.
CPC .......... *B60W 50/14* (2013.01); *B60W 30/165* (2013.01); *B60W 30/182* (2013.01);
(Continued)

(58) Field of Classification Search
CPC .. B60W 50/14; B60W 30/165; B60W 30/182; B60W 40/04; B60W 40/076;
(Continued)

(56) References Cited

U.S. PATENT DOCUMENTS

2018/0058865 A1    3/2018  Takeuchi et al.
2018/0373250 A1   12/2018  Nakamura et al.
(Continued)

FOREIGN PATENT DOCUMENTS

JP    2007148788 A    6/2007
JP    2016205971 A   12/2016
(Continued)

*Primary Examiner* — Anh V La
(74) *Attorney, Agent, or Firm* — Harness, Dickey & Pierce, P.L.C.

(57) ABSTRACT

By an automated driving control device, a non-transitory computer readable storage medium storing automated driving control program, a presentation control device, or a non-transitory computer readable storage medium storing presentation control program, at least one of a switching of a traveling control state of a subject vehicle among a driving assistance control and an autonomous traveling control, notification of a shift of the traveling control state, change of a setting of a vehicle-to-vehicle distance, or notification of the change is performed.

43 Claims, 19 Drawing Sheets

(51) Int. Cl.
*B60W 30/182* (2020.01)
*B60W 40/04* (2006.01)
*B60W 40/076* (2012.01)
*B60W 50/02* (2012.01)
*B60W 50/14* (2020.01)
*B60W 60/00* (2020.01)
*B60W 50/00* (2006.01)

(52) U.S. Cl.
CPC .......... *B60W 40/04* (2013.01); *B60W 40/076* (2013.01); *B60W 50/0205* (2013.01); *B60W 60/005* (2020.02); *B60W 2050/0083* (2013.01); *B60W 2050/0215* (2013.01); *B60W 2552/15* (2020.02); *B60W 2552/53* (2020.02); *B60W 2554/406* (2020.02); *B60W 2554/80* (2020.02)

(58) Field of Classification Search
CPC .......... B60W 50/0205; B60W 60/005; B60W 2050/0083; B60W 2050/0215; B60W 2552/15; B60W 2552/53; B60W 2554/406; B60W 2554/80; B60W 2552/10; B60W 2554/804; B60W 2754/30; B60W 30/16; G08G 1/16

USPC ................ 340/435, 436, 903, 988, 995.1
See application file for complete search history.

(56) References Cited

U.S. PATENT DOCUMENTS

| | | | |
|---|---|---|---|
| 2019/0004514 A1* | 1/2019 | Hiwatashi | G06V 40/18 |
| 2019/0084579 A1* | 3/2019 | Maura | G08G 1/00 |
| 2020/0094831 A1 | 3/2020 | Kudo | |
| 2020/0148205 A1 | 5/2020 | Yoshida et al. | |
| 2020/0231158 A1* | 7/2020 | Okuyama | B60W 60/0054 |
| 2020/0307583 A1 | 10/2020 | Yashiro et al. | |
| 2021/0291872 A1* | 9/2021 | Kondo | G01C 21/3655 |

FOREIGN PATENT DOCUMENTS

| | | |
|---|---|---|
| JP | 2019006275 A | 1/2019 |
| JP | 201936339 A | 3/2019 |
| JP | 2020050091 A | 4/2020 |
| JP | 2020075585 A | 5/2020 |
| JP | 2020158021 A | 10/2020 |
| WO | WO-2019043847 A1 | 3/2019 |

* cited by examiner

| CONTROL PATTERN | RELATION OF SETTING OF VEHICLE-TO-VEHICLE DISTANCE SMALL← →LARGE |
|---|---|
| 1 | CONGESTED TIME LEVEL 3 < LEVEL 2 OR LOWER < AREA LEVEL 3 |
| 2 | CONGESTED TIME LEVEL 3 < AREA LEVEL 3 < LEVEL 2 OR LOWER |
| 3 | CONGESTED TIME LEVEL 3 < AREA LEVEL 3 = LEVEL 2 OR LOWER |
| 4 | LEVEL 2 OR LOWER < CONGESTED TIME LEVEL 3 = AREA LEVEL 3 |

AUTOMATED DRIVING CONTROL DEVICE, NON-TRANSITORY COMPUTER READABLE STORAGE MEDIUM STORING AUTOMATED DRIVING CONTROL PROGRAM, PRESENTATION CONTROL DEVICE, AND NON-TRANSITORY COMPUTER READABLE STORAGE MEDIUM STORING PRESENTATION CONTROL PROGRAM

CROSS REFERENCE TO RELATED APPLICATIONS

The present application is a continuation application of International Patent Application No. PCT/JP2022/007563 filed on Feb. 24, 2022, which designated the U.S. and claims the benefit of priority from Japanese Patent Application No. 2021-057769 filed on Mar. 30, 2021, the benefit of priority from Japanese Patent Application No. 2021-164998 filed on Oct. 6, 2021, and the benefit of priority from Japanese Patent Application No. 2021-189632 filed on Nov. 22, 2021. The entire disclosures of all of the above applications are incorporated herein by reference.

TECHNICAL FIELD

The present disclosure relates to an automated driving control device, a non-transitory computer readable storage medium storing an automated driving control program, a presentation control device, and a non-transitory computer readable storage medium storing a presentation control program.

BACKGROUND

A travel control device of a comparative example can perform autonomous traveling control in which a driver is not required to have a periphery monitoring obligation. The travel control device accelerates or decelerates a subject vehicle to control a vehicle-to-vehicle distance in a front-rear direction between the subject vehicle and another vehicle that travels on the same lane as the subject vehicle.

SUMMARY

By an automated driving control device, a non-transitory computer readable storage medium storing an automated driving control program, a presentation control device, or a non-transitory computer readable storage medium storing a presentation control program, at least one of a switching of a traveling control state of a subject vehicle among a driving assistance control and an autonomous traveling control, notification of a shift of the traveling control state, change of a setting of a vehicle-to-vehicle distance, or notification of the change is performed.

DETAILED DESCRIPTION

Figure 1:
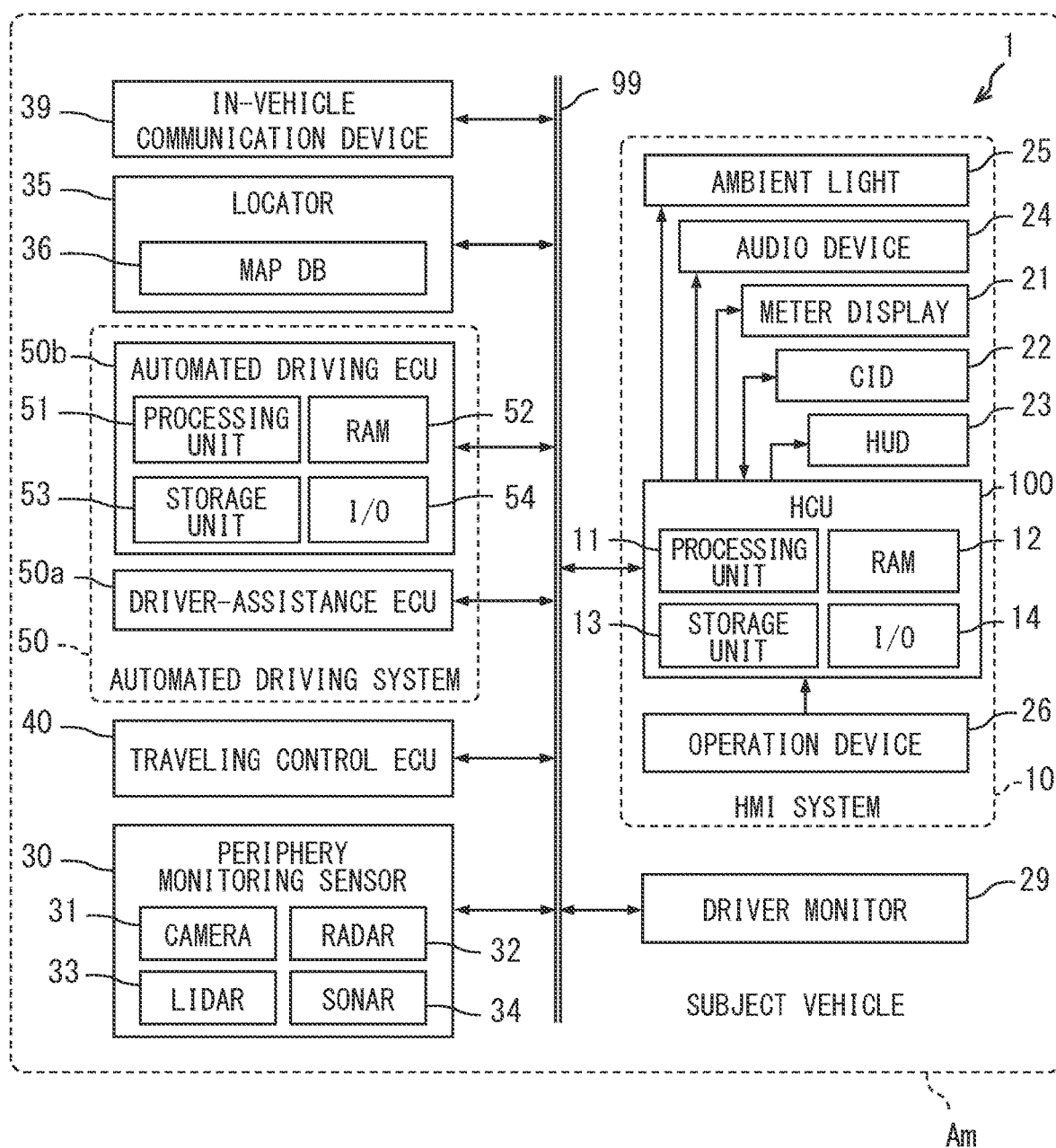
FIG. 1 is a diagram showing an overview of an in-vehicle network including an automated driving system and an HMI system according to a first embodiment of the present disclosure.

In the comparative example, when automated driving control with no periphery monitoring obligation is started, the driver may not recognize a surrounding condition of the subject vehicle. For this reason, it is easy for the subject vehicle to feel uncomfortable with a change in a vehicle-to-vehicle distance from the subject vehicle to a vehicle to follow. As a result, the convenience of automated driving may be low.

An example of the present disclosure provides an automated driving control device, an automated driving control program, a presentation control device, and a presentation control program capable of improving convenience of automated driving with no periphery monitoring obligation.

According to one aspect of the present disclosure to achieve the object, an automated driving control device includes: a control switching unit configured to switch a traveling control state of a subject vehicle among at least a driving assistance control with a periphery monitoring obligation of a driver and an autonomous traveling control without the periphery monitoring obligation of the driver; a vehicle-to-vehicle distance control unit configured to change a setting of a vehicle-to-vehicle distance from the subject vehicle to a follow-target vehicle when the traveling control state shifts from the driving assistance control to the autonomous traveling control; and a notification control unit configured to cause an information presentation device to perform notification indicating a shift completion of a shift to the autonomous traveling control after a change of the vehicle-to-vehicle distance when the traveling control state shifts from the driving assistance control to the autonomous traveling control. The information presentation device presents information to the driver.

Further, according to another aspect of the present disclosure, an automated driving control program causes at least one processor to: switch a traveling control state of a subject vehicle among at least a driving assistance control with a periphery monitoring obligation of a driver and an autonomous traveling control without the periphery monitoring obligation of the driver; change a setting of a vehicle-to-vehicle distance from the subject vehicle to a follow-target vehicle when the traveling control state shifts from the driving assistance control to the autonomous traveling control; and cause an information presentation device to perform notification indicating a shift completion of a shift to the autonomous traveling control after the change of the vehicle-to-vehicle distance when the traveling control state shifts from the driving assistance control to the autonomous traveling control. The information presentation device presents information to the driver.

Further, according to another aspect of the present disclosure, a presentation control device is used for a subject vehicle having an automated driving function and controls presentation of information to a driver. The device includes: an information acquisition unit configured to acquire switching information indicating switching of a traveling control state among at least a driving assistance control with a periphery monitoring obligation of the driver and an autonomous traveling control without the periphery monitoring obligation of the driver; and a notification control unit configured to provide a notification of shift completion of the traveling control state based on the switching information. The notification control unit provides notification of shift completion of a shift to the autonomous traveling control after the automated driving function changes a vehicle-to-vehicle distance from the subject vehicle to a follow-target vehicle when the traveling control state shifts from the driving assistance control to the autonomous traveling control.

Further, according to another aspect of the present disclosure, a presentation control program is used for a subject vehicle having an automated driving function and controls presentation of information to a driver. The program causes at least one processor to: acquire switching information indicating switching of a traveling control state among at least a driving assistance control with a periphery monitoring obligation of the driver and an autonomous traveling control without the periphery monitoring obligation of the driver; and provide a notification of shift completion of the traveling control state based on the switching information. The processor provides notification of shift completion of shift to the autonomous traveling control after the automated driving function changes a vehicle-to-vehicle distance from the subject vehicle to a follow-target vehicle, when the traveling control state shifts from the driving assistance control to the autonomous traveling control.

In these aspects, in a case where a traveling control state shifts from driver-assistance control with a periphery monitoring obligation to automated driving control with no periphery monitoring obligation, a notification indicating completion of the shift to the automated driving control is issued after a vehicle-to-vehicle distance is changed. Therefore, the vehicle-to-vehicle distance is changed while a driver continues monitoring the periphery. As a result, the driver can easily recognize a process for changing the vehicle-to-vehicle distance, and thus the convenience of automated driving can be improved.

Further, according to another aspect of the present disclosure, an automated driving control device includes: a control switching unit configured to switch a traveling control state of a subject vehicle among at least a driving assistance control with a periphery monitoring obligation of a driver and an autonomous traveling control without the periphery monitoring obligation of the driver; a traffic congestion recognition unit configured to recognize a traffic congestion in a periphery of the subject vehicle; and a vehicle-to-vehicle distance control unit configured to set a vehicle-to-vehicle distance, from the subject vehicle to a follow-target vehicle (At), to be lower than the vehicle-to-vehicle distance recognized during traveling with the autonomous traveling control, when the traffic congestion recognition unit recognizes the traffic congestion during traveling with the autonomous traveling control.

Further, according to another aspect of the present disclosure, an automated driving control program causes at least one processor to: switch a traveling control state of a subject vehicle among at least a driving assistance control with a periphery monitoring obligation of a driver and an autonomous traveling control without the periphery monitoring obligation of the driver; set a vehicle-to-vehicle distance, from the subject vehicle to a follow-target vehicle, to be lower than a vehicle-to-vehicle distance recognized during traveling with the driving assistance control in the traffic congestion, during traveling with the autonomous traveling control in the traffic congestion.

In these aspects, a vehicle-to-vehicle distance in a case where the vehicle travels in traffic congestion under the autonomous traveling control with no periphery monitoring obligation is set to be smaller than a vehicle-to-vehicle distance in the case where the vehicle travels in the traffic congestion under the driver-assistance control with a periphery monitoring obligation. Therefore, in a traffic congestion traveling scene with no periphery monitoring obligation, it is difficult for another vehicle to cut in between the subject vehicle and a follow-target vehicle. According to the above description, a situation in which the autonomous traveling control is terminated due to the cut-in of the other vehicle is less likely to occur. As a result, since a state with no periphery monitoring obligation is easily continued, the convenience of automated driving can be improved.

Further, according to another aspect of the present disclosure, an automated driving control device includes: a control switching unit configured to switch a traveling control state of a subject vehicle among at least a driving assistance control with a periphery monitoring obligation of a driver and an autonomous traveling control without the periphery monitoring obligation of the driver; a vehicle-to-vehicle distance control unit configured to change a setting of a vehicle-to-vehicle distance from the subject vehicle to a follow-target vehicle when the traveling control state shifts from the driving assistance control to the autonomous traveling control; and a notification control unit configured to perform notification indicating that the vehicle-to-vehicle distance changes, when the vehicle-to-vehicle distance changes due to a shift of the traveling control state from the driving assistance control to the autonomous traveling control.

Further, according to another aspect of the present disclosure, an automated driving control program causes at least one processor to: switch a traveling control state of a subject vehicle among at least a driving assistance control with a periphery monitoring obligation of a driver and an autonomous traveling control without the periphery monitoring obligation of the driver; change a setting of a vehicle-to-vehicle distance from the subject vehicle to a follow-target vehicle when the traveling control state shifts from the driving assistance control to the autonomous traveling control; and perform notification indicating that the vehicle-to-vehicle distance changes, when the vehicle-to-vehicle distance changes due to a shift of the traveling control state from the driving assistance control to the autonomous traveling control.

Further, according to another aspect of the present disclosure, a presentation control device is used for a subject vehicle having an automated driving function and controls presentation of information to a driver. The device comprising: an information acquisition unit configured to acquire control status information related to switching of a traveling control state among at least a driving assistance control with a periphery monitoring obligation of the driver and an autonomous traveling control without the periphery monitoring obligation of the driver; and a notification control unit configured to perform, based on the control status information, notification indicating that a vehicle-to-vehicle distance from the subject vehicle to a follow-target vehicle changes when a change of the vehicle-to-vehicle distance due to a shift of the traveling control state from the driving assistance control to the autonomous traveling control is recognized.

Further, according to another aspect of the present disclosure, a presentation control program is used for a subject vehicle having an automated driving function and controls presentation of information to a driver. The program causes at least one processor to: acquire control status information related to switching of a traveling control state among at least a driving assistance control with a periphery monitoring obligation of the driver and an autonomous traveling control without the periphery monitoring obligation of the driver; and perform, based on the control status information, notification indicating that a vehicle-to-vehicle distance from the subject vehicle to a follow-target vehicle changes when a change of the vehicle-to-vehicle distance due to a shift of the traveling control state from the driving assistance control to the autonomous traveling control is recognized.

In these aspects, in a case where the traveling control state shifts from the driver-assistance control with a periphery monitoring obligation to the automated driving control with no periphery monitoring obligation, when the vehicle-to-vehicle distance is changed, a notification indicating the change in the vehicle-to-vehicle distance is issued. Therefore, since the driver can easily recognize the process for changing the vehicle-to-vehicle distance, the convenience of automated driving can be improved.

Further, according to another aspect of the present disclosure, an automated driving control device is capable of, by using information of an autonomous sensor, performing an autonomous traveling control without a periphery monitoring obligation of a driver. The device includes: an environment recognition unit configured to recognize a traveling environment of a periphery of a subject vehicle for performing the autonomous traveling control based on information detected by the autonomous sensor; and a vehicle-to-vehicle distance control unit configured to switch a setting of a vehicle-to-vehicle distance from the subject vehicle traveling with the autonomous traveling control to a follow-target vehicle among a first setting vehicle-to-vehicle distance associated with the autonomous traveling control and a second setting vehicle-to-vehicle distance that facilitates detection of the periphery of the subject vehicle by the autonomous sensor as compared with the first setting vehicle-to-vehicle distance.

Further, according to another aspect of the present disclosure, an automated driving control program is capable of, by using information of an autonomous sensor, performing an autonomous traveling control without a periphery monitoring obligation of a driver. The program causes at least one processor to: recognize a traveling environment of a periphery of a subject vehicle for performing the autonomous traveling control based on information detected by the autonomous sensor; and switch a setting of a vehicle-to-vehicle distance from the subject vehicle traveling with the autonomous traveling control to a follow-target vehicle among a first setting vehicle-to-vehicle distance associated with the autonomous traveling control and a second setting vehicle-to-vehicle distance that facilitates detection of the periphery of the subject vehicle by the autonomous sensor as compared with the first setting vehicle-to-vehicle distance.

In these aspects, in the subject vehicle traveling under the autonomous traveling control, by switching setting of the vehicle-to-vehicle distance from a first set vehicle-to-vehicle distance to a second set vehicle-to-vehicle distance, detection of the periphery of the subject vehicle by an autonomous sensor and recognition of a traveling environment in the periphery of the subject vehicle are facilitated. As a result, the automated driving with no periphery monitoring obligation is easily continued, and thus the convenience of automated driving can be improved.

Further, according to another aspect of the present disclosure, an automated driving control device includes: a control switching unit configured to switch a traveling control state of a subject vehicle among at least a driving assistance control with a periphery monitoring obligation of a driver and an autonomous traveling control without the periphery monitoring obligation of the driver; and a vehicle-to-vehicle distance control unit configured to change a setting of a vehicle-to-vehicle distance from the subject vehicle to a follow-target vehicle when the traveling control state shifts from the autonomous traveling control to the driving assistance control. The driving assistance control includes a hands-on control with a steering wheel gripping obligation of the driver and a hands-off control without the steering wheel gripping obligation of the driver. Depending on a case of a shift from the autonomous traveling control to the hands-on control or a case of a shift from the autonomous traveling control to the hands-off control, the vehicle-to-vehicle distance control unit changes the setting of the vehicle-to-vehicle distance after the shift.

Further, according to another aspect of the present disclosure, an automated driving control program causes at least one processor to: switch a traveling control state of a subject vehicle among at least a driving assistance control with a periphery monitoring obligation of a driver and an autonomous traveling control without the periphery monitoring obligation of the driver; change a setting of a vehicle-to-vehicle distance from the subject vehicle to a follow-target vehicle when the traveling control state shifts from the autonomous traveling control to the driving assistance control; and depending on a case of a shift from the autonomous traveling control to a hands-on control with a steering wheel gripping obligation of the driver or a case of a shift from the autonomous traveling control to a hands-off control without the steering wheel gripping obligation of the driver, change the setting of the vehicle-to-vehicle distance after the shift.

In these aspects, the setting of the vehicle-to-vehicle distance is changed between a hands-on control in which the driver has a holding obligation of a steering wheel and a hands-off control in which the driver does not have the holding obligation of the steering wheel. According to the above description, since the vehicle-to-vehicle distance suitable for each of the hands-on control and the hands-off control can be ensured at the timing of the shift from the autonomous traveling control to the driver-assistance control, the driver is less likely to feel uncomfortable with the vehicle-to-vehicle distance under the driver-assistance control. As a result, the convenience of automated driving can be improved.

Further, according to another aspect of the present disclosure, an automated driving control device is capable of performing an autonomous traveling control without a periphery monitoring obligation of a driver. The device includes: an environment recognition unit configured to recognize a traveling environment in a periphery of a subject vehicle; and a vehicle-to-vehicle distance control unit configured to change a setting of a vehicle-to-vehicle distance from the subject vehicle to a follow-target vehicle (At) in a case of traveling with the autonomous traveling control, according to the traveling environment recognized by the environment recognition unit.

Further, according to another aspect of the present disclosure, an automated driving control program is capable of performing an autonomous traveling control without a periphery monitoring obligation of a driver. The program causes at least one processor to: recognize a traveling environment in a periphery of a subject vehicle; and change a setting of a vehicle-to-vehicle distance from the subject vehicle to a follow-target vehicle in a case of traveling with the autonomous traveling control, according to the recognized traveling environment.

Further, according to another aspect of the present disclosure, an automated driving control device is capable of performing an autonomous traveling control without a periphery monitoring obligation of a driver. The device includes: a lane recognition unit configured to recognize a characteristic of a subject vehicle lane in which a subject vehicle travels when the subject vehicle travels on a road including a plurality of lanes; and a vehicle-to-vehicle distance control unit configured to change, according to the characteristic of the subject vehicle lane recognized by the lane recognition unit, a setting of a vehicle-to-vehicle distance from the subject vehicle to a follow-target vehicle in a case of traveling with the autonomous traveling control.

Further, according to another aspect of the present disclosure, an automated driving control program is capable of performing an autonomous traveling control without a periphery monitoring obligation of a driver. The program causes at least one processor to: recognize a characteristic of a subject vehicle lane in which a subject vehicle travels when the subject vehicle travels on a road including a plurality of lanes; and change a setting of a vehicle-to-vehicle distance from the subject vehicle to a follow-target vehicle in a case of traveling with the autonomous traveling control, according to the recognized characteristic of the subject vehicle lane.

In these aspects, the setting of the vehicle-to-vehicle distance from the subject vehicle to the follow-target vehicle is changed according to the surrounding condition in the periphery of the subject vehicle or characteristics of a subject vehicle lane. Therefore, it is possible to prevent another vehicle from cutting in front of the subject vehicle, or to support smooth cutting in by the other vehicle. According to the above description, a situation in which the autonomous traveling control with no periphery monitoring obligation is terminated due to the cut-in of the other vehicle is less likely to occur. As a result, since a traveling state with no periphery monitoring obligation is easily continued, the convenience of automated driving can be improved.

Further, according to another aspect of the present disclosure, an automated driving control device is capable of performing an autonomous traveling control without a periphery monitoring obligation of a driver. The device includes: a different vehicle recognition unit configured to recognize a follow-target vehicle followed by a subject vehicle during traveling with the autonomous traveling control; and a notification control unit configured to cause an information presentation device to perform notification related to a start timing of the subject vehicle based on a start of the follow-target vehicle when the follow-target vehicle and the subject vehicle stop due to a traffic congestion in a periphery of the subject vehicle. The information presentation device presents information to the driver.

Further, according to another aspect of the present disclosure, an automated driving control program is capable of performing an autonomous traveling control without a periphery monitoring obligation of a driver. The program causes at least one processor to: recognize a follow-target vehicle followed by a subject vehicle during traveling with the autonomous traveling control; and cause an information presentation device to perform notification related to a start timing of the subject vehicle based on a start of the follow-target vehicle when the follow-target vehicle and the subject vehicle stop due to a traffic congestion in a periphery of the subject vehicle. The information presentation device presents information to the driver.

Further, according to another aspect of the present disclosure, a presentation control device is used for a subject vehicle having an automated driving function and controls presentation of information to a driver. The device includes: an information acquisition unit configured to acquire start control information related to a start timing of the subject vehicle when the automated driving function for causing the subject vehicle to follow a follow-target vehicle stops the subject vehicle traveling in a traffic congestion; and a notification control unit configured to perform, based on the start control information, notification related to the start timing after a start of the follow-target vehicle.

Further, according to another aspect of the present disclosure, a presentation control program is used for a subject vehicle having an automated driving function and controls presentation of information to a driver. The program causes at least one processor to: acquire start control information related to a start timing of the subject vehicle when the automated driving function for causing the subject vehicle to follow a follow-target vehicle stops the subject vehicle traveling in a traffic congestion; and perform, based on the start control information, notification related to the start timing after a start of the follow-target vehicle.

In these aspects, when the subject vehicle stops together with the follow-target vehicle due to traffic congestion while traveling under the autonomous traveling control with no periphery monitoring obligation, a notification regarding a starting timing of the subject vehicle is issued after the starting of the follow-target vehicle. Therefore, even when a vehicle-to-vehicle distance to the follow-target vehicle is large and empty before the subject vehicle starts, the driver can recognize a starting schedule of the subject vehicle, and thus the driver is less likely to feel uncomfortable with the large vehicle-to-vehicle distance. As a result, the convenience of automated driving can be improved.

Hereinafter, multiple embodiments will be described with reference to the drawings. The same reference numerals are assigned to corresponding components in each embodiment, and thus, duplicate descriptions may be omitted. When only a portion of a configuration in each embodiment is described, with respect to other portions of the configuration, configurations of other embodiments described in advance can be applied. Further, not only combinations of the configurations explicitly shown in the description of the respective embodiments, but also the configurations of the multiple embodiments can be partially combined with each other even when the combinations are not explicitly shown if there is no problem in the combinations in particular.

First Embodiment

In a first embodiment of the present disclosure, an automated driving electronic control unit (ECU) 50b and a human machine interface control unit (HCU) 100 shown in FIG. 1 are provided in an in-vehicle network 1. The automated driving ECU 50b shown in FIGS. 1 and 2 implements a function of an automated driving control device. The HCU 100 shown in FIGS. 1 and 3 implements a function of a presentation control device.

Figure 2:
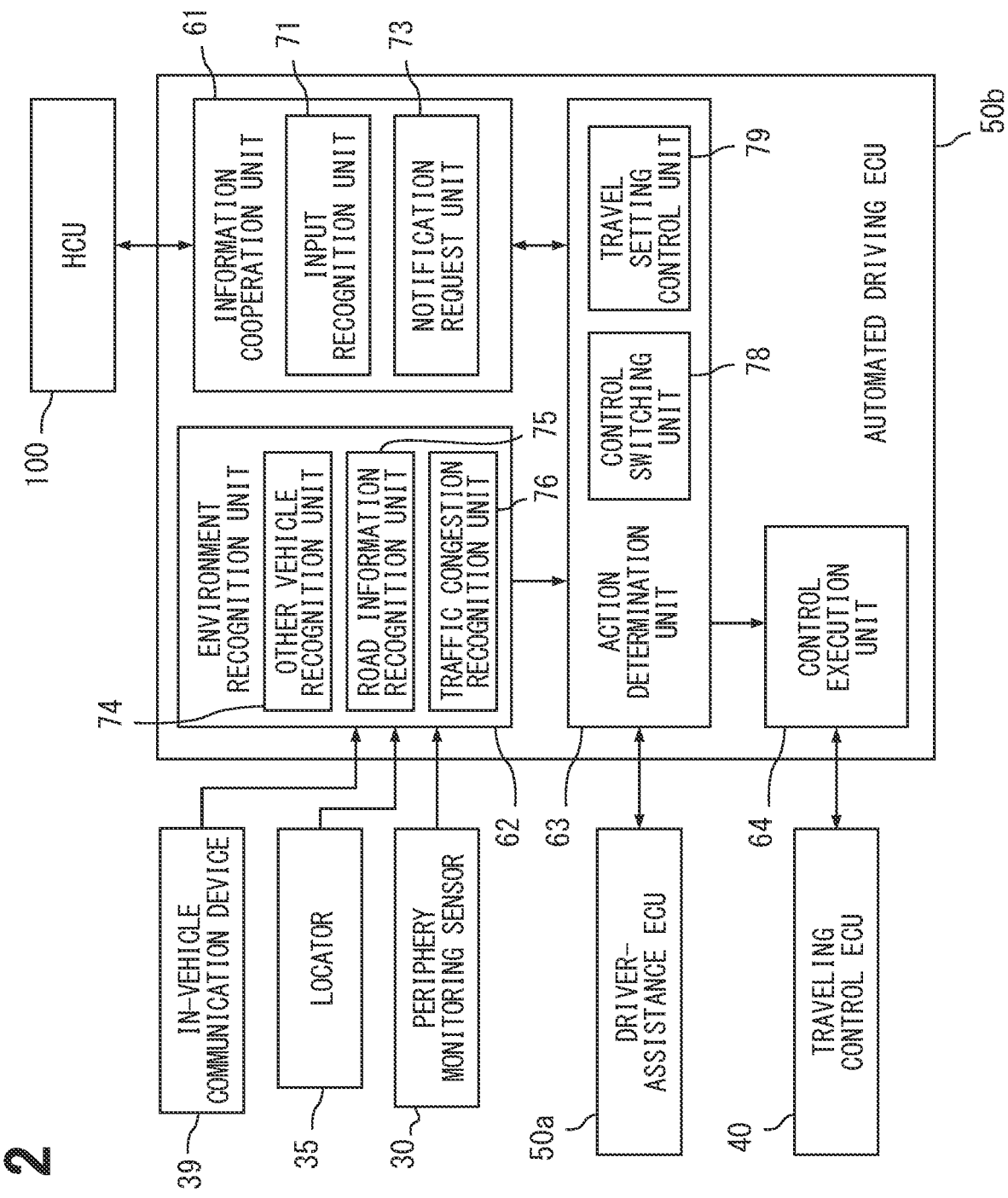
FIG. 2 is a block diagram showing details of an automated driving ECU.
Figure 3:
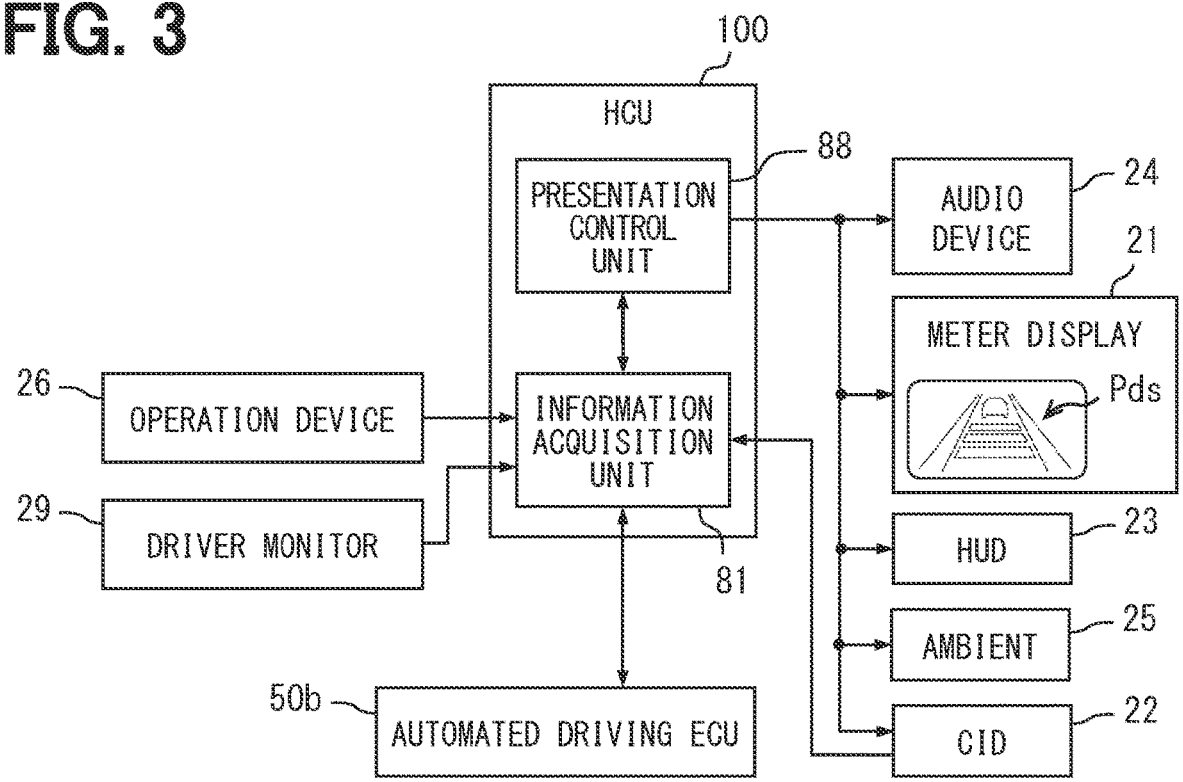
FIG. 3 is a block diagram showing details of an HCU.
Figure 4:
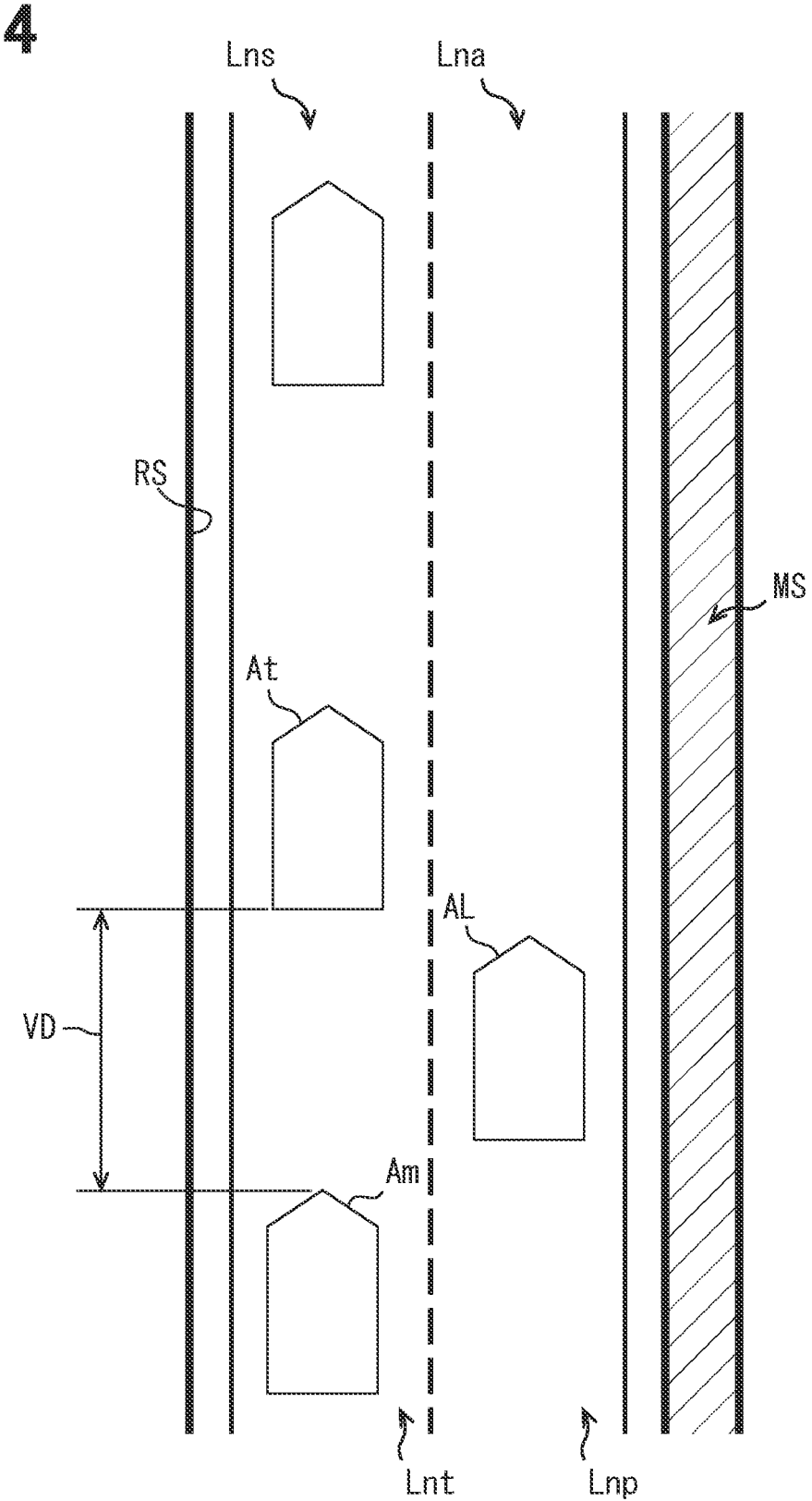
FIG. 4 is a diagram showing details of following traveling control.

As shown in FIGS. 1 to 3, the automated driving ECU 50b and the HCU 100 are mounted on a vehicle (hereinafter, referred to as subject vehicle Am, see FIG. 4) together with a driver-assistance ECU 50a. The automated driving ECU 50b constitutes an automated driving system 50 of the subject vehicle Am together with the driver-assistance ECU 50a and the like. When the automated driving system 50 is mounted, the subject vehicle Am becomes an autonomous vehicle having an automated driving function.

The driver-assistance ECU 50a is an in-vehicle ECU that implements a driver-assistance function for assisting a driving operation of a driver in the automated driving system 50. The driver-assistance ECU 50a enables partial automated driving control or advanced driver-assistance of about Level 2 of an automated driving level defined by the Society of Automotive Engineers. Autonomous driving performed by the driver-assistance ECU 50a is automated driving with a periphery monitoring obligation that requires monitoring of the periphery of the subject vehicle by visual observation of the driver.

The automated driving ECU 50b is an in-vehicle ECU that implements an automated driving function capable of substituting a driving operation of the driver in the automated driving system 50. The automated driving ECU 50b can perform autonomous traveling of Level 3 or higher in which the system is a control subject. The automated driving performed by the automated driving ECU 50b is automated driving that does not need to monitor the periphery of the subject vehicle, that is, eyes-off automated driving with no periphery monitoring obligation.

In the automated driving system 50, a traveling control state of the automated driving function is switched between multiple controls including at least automated driving control with a periphery monitoring obligation by the driver-assistance ECU 50a and automated driving control with no periphery monitoring obligation by the automated driving ECU 50b. In the following description, an automated driving control of Level 2 or lower by the driver-assistance ECU 50a may be referred to as "driver-assistance control", and an automated driving control of Level 3 or higher by the automated driving ECU 50b may be referred to as "autonomous traveling control".

In an autonomous traveling period in which the subject vehicle Am travels under the autonomous traveling control of the automated driving ECU 50b, a specific action (hereinafter, referred to as a second task) other than predetermined driving can be permitted by the driver. The second task is regularly permitted by the driver until a request for performing a driving operation by cooperation between the automated driving ECU 50b and the HCU 100, that is, a request for driving takeover occurs. For example, actions such as viewing of entertainment contents such as moving image contents, a device operation of a smartphone or the like, and meals are assumed as the second task.

The driver-assistance ECU 50a, the automated driving ECU 50b, and the HCU 100 are communicably connected to a communication bus 99 of the in-vehicle network 1 mounted on the subject vehicle Am. A driver monitor 29, a periphery monitoring sensor 30, a locator 35, an in-vehicle communication device 39, a traveling control ECU 40, and the like are connected to the communication bus 99. These nodes connected to the communication bus 99 can communicate with each other. Specific nodes among the ECUs and the like may be directly electrically connected to each other and may communicate with each other without the communication bus 99.

The driver monitor 29 includes a near-infrared light source, a near-infrared camera, and a control unit that controls the near-infrared light source and the near-infrared camera. The driver monitor 29 is installed, for example, on an upper surface of a steering column portion or an upper surface of an instrument panel with the near-infrared camera facing a headrest portion of a driver's seat. The near-infrared camera may integrally include a meter display 21 or a center information display (hereinafter, referred to as CID) 22, which will be described later, and may be provided on any screen.

The driver monitor 29 uses the near-infrared camera to capture the driver's head radiated with near-infrared light by the near-infrared light source. The captured image by the near-infrared camera is subjected to image analysis by the control unit. The control unit extracts information such as a position of an eye point and a sight line direction of the driver from the captured image. The driver monitor 29 provides driver status information extracted by the control unit to the HCU 100, the automated driving ECU 50b, and the like.

The periphery monitoring sensor 30 is an autonomous sensor that monitors a surrounding environment of the subject vehicle Am. The periphery monitoring sensor 30 can detect a moving object and a stationary object from a detection range in the periphery of the subject vehicle. The periphery monitoring sensor 30 can detect at least a preceding vehicle, a following vehicle, a side vehicle, and the like traveling in the periphery of the subject vehicle Am. The periphery monitoring sensor 30 provides detection information of an object in the periphery of the subject vehicle to the driver-assistance ECU 50a, the automated driving ECU 50b, and the like.

The periphery monitoring sensor 30 includes, for example, one or multiple camera units 31, millimeter wave radars 32, lidars 33, and sonars 34. The camera unit 31 may include a monocular camera, or may include a compound eye camera. The camera unit 31 is mounted on the subject vehicle Am so as to be able to capture a range in front of the subject vehicle Am. The camera unit 31 capable of capturing a side range and a rear range of the subject vehicle Am may be mounted on the subject vehicle Am. The camera unit 31 outputs, as detection information, at least one of imaging data obtained by capturing the periphery of the subject vehicle and an analysis result of the imaging data.

The millimeter wave radar 32 emits millimeter waves or quasi-millimeter waves toward the periphery of the subject vehicle. The millimeter wave radar 32 outputs detection information generated by a process for receiving reflected waves reflected by the moving object and the stationary object. The lidar 33 emits laser light toward the periphery of the subject vehicle. The lidar 33 outputs detection information generated by a process for receiving laser light reflected by a moving object and a stationary object present in an emitted range. The sonar 34 emits ultrasonic waves toward the periphery of the subject vehicle. The sonar 34 outputs detection information generated by a process for receiving ultrasonic waves reflected by a moving object, a stationary object, or the like present in the vicinity of the subject vehicle.

The locator 35 includes a global navigation satellite system (GNSS) receiver, an inertial sensor, and the like. The locator 35 sequentially measures a subject vehicle position and a traveling direction of the subject vehicle Am by combining a positioning signal received by the GNSS receiver, a measurement result of the inertial sensor, vehicle speed information output to the communication bus 99, and the like. The locator 35 sequentially outputs, as locator information, position information and direction information of the subject vehicle Am based on the positioning result to the communication bus 99.

The locator 35 further includes a map database (hereinafter, referred to as map DB) 36 that stores map data. The map DB 36 mainly includes a large capacity storage medium for storing a large number of three-dimensional map data and two-dimensional map data. The three-dimensional map data is a so-called high definition (HD) map, and includes road information necessary for the automated driving control. The three-dimensional map data includes information necessary for advanced driver-assistance and automated driving, such as three-dimensional shape information of a road and detailed information about each lane. The locator 35 reads map data about the periphery of a current position from the map DB 36, and provides the map data to the driver-assistance ECU 50*a*, the automated driving ECU 50*b*, and the like together with the locator information.

The in-vehicle communication device 39 is an in-vehicle communication unit mounted on the subject vehicle Am and functions as a vehicle to everything (V2X) communication device. The in-vehicle communication device 39 transmits and receives information by wireless communication to and from a roadside device installed beside the road. As an example, the in-vehicle communication device 39 receives congestion information about the periphery of the current position and the traveling direction of the subject vehicle Am from the roadside device. The congestion information is, for example, VICS (registered trademark) information. The in-vehicle communication device 39 provides the received congestion information to the automated driving ECU 50*b* and the like.

The traveling control ECU 40 is an electronic control device mainly including a microcontroller. The traveling control ECU 40 has at least functions of a brake control ECU, a drive control ECU, and a steering control ECU. The traveling control ECU 40 continuously controls a braking force of each wheel, an output of an in-vehicle power source, and a steering angle based on any one of an operation command based on a driving operation of the driver, a control command of the driver-assistance ECU 50*a*, and a control command of the automated driving ECU 50*b*. In addition, the traveling control ECU 40 generates vehicle speed information indicating a current traveling speed of the subject vehicle Am based on detection signals of wheel speed sensors provided in hub portions of wheels, and sequentially outputs the generated vehicle speed information to the communication bus 99.

Next, the HCU 100, the driver-assistance ECU 50*a*, and the automated driving ECU 50*b* will be described in detail.

The HCU 100 constitutes a human machine interface (HMI) system 10 together with multiple display devices, an audio device 24, an ambient light 25, an operation device 26, and the like. The HMI system 10 has an input interface function for receiving operations performed by an occupant such as the driver of the subject vehicle Am, and an output interface function for presenting information to the driver.

Each display device presents information through a vision of the driver by image display or the like. The display device includes the meter display 21, the CID 22, and a head-up display (hereinafter, referred to as HUD) 23. The CID 22 has a function of a touch panel and detects a touch operation on a display screen by the driver or the like. The audio device 24 includes multiple speakers installed in a vehicle compartment in a manner of surrounding a driver's seat, and causes the speakers to reproduce a notification sound, a voice message, or the like in the vehicle compartment. The ambient light 25 is provided on the instrument panel, the steering wheel, or the like. The ambient light 25 presents information using a peripheral field of view of the driver by ambient display that changes a color of emitted light.

The operation device 26 is an input unit that receives a user operation performed by the driver or the like. For example, a user operation related to activation and stop of the automated driving function is input to the operation device 26. As an example, a driver input for instructing shift from the driver-assistance control to the autonomous traveling control is input to the operation device 26. The operation device 26 includes a steering switch provided on a spoke portion of the steering wheel, an operation lever provided on a steering column portion, a voice input device for recognizing an utterance content of the driver, and the like.

The HCU 100 functions as the presentation control device, and integrally controls presentation to the driver such as information related to automated driving. The HCU 100 requests the driver to perform driving takeover based on the request for performing the driving operation by the automated driving ECU 50*b*. In addition, as described above, the HCU 100 can cooperate with the automated driving ECU 50*b* to allow execution of a second task by the driver, and reproduce moving image contents and the like related to the second task in a manner that does not interfere with a driving takeover request.

The HCU 100 mainly includes a control circuit including a processing unit 11, a RAM 12, a storage unit 13, an input and output interface 14, and a bus connecting the processing unit 11, the RAM 12, the storage unit 13, and the input and output interface 14. The processing unit 11 is hardware for a calculation process and is coupled to the RAM 12, and executes various processes for implementing a presentation control method according to the present disclosure by accessing the RAM 12. The processing unit 11 includes at least one processor core such as a central processing unit (CPU) and a graphics processing unit (GPU). The processing unit 11 may further include a field-programmable gate array (FPGA), a neural network processing unit (NPU), an IP core having another dedicated function, and the like. The RAM 12 may include a video RAM for generating image data. The processing unit 11 executes various processes for a presentation control process by accessing the RAM 12. The storage unit 13 includes a non-volatile storage medium. The storage unit 13 stores various programs (presentation control programs and the like) executed by the processing unit 11.

The HCU 100 includes multiple function units that integrally control information presentation to the driver by executing presentation control programs stored in the storage unit 13 by the processing unit 11. Specifically, the HCU 100 includes function units such as an information acquisition unit 81 and a presentation control unit 88.

The information acquisition unit 81 acquires vehicle information, operation information, driver status information, and the like. The vehicle information is information indicating a state of the subject vehicle Am. The information acquisition unit 81 acquires the vehicle information from the communication bus 99 or the like. The vehicle information includes, for example, vehicle speed information provided to the communication bus 99 by the traveling control ECU 40. The operation information is information indicating contents of the user operation. The information acquisition unit 81 acquires the operation information from the CID 22, the operation device 26, and the like. The driver status information is information provided from the driver monitor 29 to the information acquisition unit 81. The information acquisition unit 81 recognizes a status of the driver based on the driver status information. As an example, the information acquisition unit 81 recognizes, as the status of the driver, whether the driver is monitoring the periphery of the subject vehicle Am, contents of the second task being performed by the driver, a driving posture of the driver, and the like.

The information acquisition unit 81 cooperates with an information cooperation unit 61 (to be described later) of the automated driving ECU 50b, and shares information acquired by each. The information acquisition unit 81 provides, to the automated driving ECU 50b, the operation information and information (hereinafter, referred to as action information) indicating the status of the driver. The information acquisition unit 81 acquires, from the information cooperation unit 61, control status information indicating a status of the automated driving function and an issuing request for a notification related to the automated driving function.

The presentation control unit 88 integrally controls provision of information to the driver using each display device and the audio device 24. The presentation control unit 88 provides contents and presents information in accordance with an operation state of the automated driving based on the control status information and the issuing request acquired by the information acquisition unit 81. Specifically, when the execution of the autonomous traveling control by the automated driving ECU 50b is recognized by the information acquisition unit 81, the presentation control unit 88 enables reproduction of the moving image contents and the like. Further, the presentation control unit 88 issues the driving takeover request, a shift completion notification, a vehicle-to-vehicle distance change notification, a following restart notification, and the like, which will be described later.

The driver-assistance ECU 50a and the automated driving ECU 50b enable in-lane traveling in which the subject vehicle Am autonomously travels along a traveling subject vehicle lane Lns. When the subject vehicle Am is caused to autonomously travel along the subject vehicle lane Lns and there is a preceding vehicle traveling on the subject vehicle lane Lns, the driver-assistance ECU 50a and the automated driving ECU 50b perform following traveling control (see FIG. 4).

In the following traveling control, the preceding vehicle is set to be a follow-target vehicle At (see FIG. 4), and a vehicle-to-vehicle distance VD (see FIG. 4) from the subject vehicle Am to the follow-target vehicle At is controlled. In the following traveling control, the driver-assistance ECU 50a and the automated driving ECU 50b set a target vehicle-to-vehicle time from the follow-target vehicle At to the subject vehicle Am. When the target vehicle-to-vehicle time is the same, the vehicle-to-vehicle distance VD increases as a traveling speed of the subject vehicle Am increases, and the vehicle-to-vehicle distance VD decreases as the traveling speed of the subject vehicle Am decreases. In the following traveling control, the driver-assistance ECU 50a and the automated driving ECU 50b manage the traveling speed of the subject vehicle Am such that the vehicle-to-vehicle distance VD based on the target vehicle-to-vehicle time is maintained.

The driver-assistance ECU 50a is a computer mainly including a control circuit including a processing unit, a RAM, a storage unit, an input and output interface, a bus connecting the processing unit, the RAM, the storage unit, and the input and output interface, and the like. The driver-assistance ECU 50a implements driver-assistance functions of adaptive cruise control (ACC), lane trace control (LTC), and the like by executing programs by the processing unit. The driver-assistance ECU 50a performs the above-described in-lane traveling and following traveling control based on the cooperation of the functions of the ACC and the LTC.

The automated driving ECU 50b has a higher calculation capability than the driver-assistance ECU 50a, and can perform at least traveling control corresponding to the ACC and the LTC. In a scene in which the autonomous traveling control is temporarily interrupted, the automated driving ECU 50b may perform the driver-assistance control with a periphery monitoring obligation by the driver, instead of the driver-assistance ECU 50a.

Similar to the HCU 100, the automated driving ECU 50b is a computer mainly including a control circuit including a processing unit 51, a RAM 52, a storage unit 53, an input and output interface 54, a bus connecting the processing unit 51, the RAM 52, the storage unit 53, and the input and output interface 54, and the like. The processing unit 51 executes various processes for implementing an automated driving control method according to the present disclosure by accessing the RAM 52. The storage unit 53 stores various programs (such as an automated driving control program) executed by the processing unit 51. According to the execution of the programs by the processing unit 51, in the automated driving ECU 50b, the information cooperation unit 61, an environment recognition unit 62, an action determination unit 63, a control execution unit 64, and the like are constructed as multiple function units for implementing the automated driving function.

The information cooperation unit 61 provides information to the information acquisition unit 81 and acquires information from the information acquisition unit 81. The cooperation of the information cooperation unit 61 and the information acquisition unit 81 allows the automated driving ECU 50b and the HCU 100 to share the acquired information. As an example, the information cooperation unit 61 acquires the operation information, the action information, and the like provided by the information acquisition unit 81. The information cooperation unit 61 generates control status information and provides the generated control status information to the information acquisition unit 81.

The control status information is information indicating an operation state of the automated driving function by the automated driving system 50. The control status information includes switching information, vehicle-to-vehicle change information, starting control information, and the like. The switching information is information indicating switching of the traveling control state of the automated driving function. When the automated driving function is in an operation state and the traveling control state is switched between multiple states, the switching information is provided from the information cooperation unit 61 to the information acquisition unit 81. The vehicle-to-vehicle change information is information indicating a change in the setting of the vehicle-to-vehicle distance VD under the following traveling control. When the setting of the vehicle-to-vehicle distance VD is changed in accordance with the switching of the traveling control state, the vehicle-to-vehicle change information is provided from the information cooperation unit 61 to the information acquisition unit 81. The starting control information is information related to a timing of restart of the subject vehicle Am during traffic congestion. When the subject vehicle Am temporarily stopped during traffic congestion restarts, the starting control information is provided from the information cooperation unit 61 to the information acquisition unit 81.

The information cooperation unit 61 includes an input recognition unit 71 and a notification request unit 73 as sub-function units for information cooperation with the information acquisition unit 81.

The input recognition unit 71 recognizes the user operation input to the CID 22, the operation device 26, and the like based on driver operation information acquired from the HCU 100. As an example, the input recognition unit 71 recognizes a driver input (a Level 3 shift operation, see FIG. 9 and the like) that instructs the shift from the driver-assistance control to the autonomous traveling control.

The notification request unit 73 outputs an issuing request for a notification to the information acquisition unit 81 to enable the HCU 100 to perform notification in synchronization with the operation state of the automated driving function. The issuing request is information that enables provision of information synchronized with behavior control of the subject vehicle Am by the automated driving function. An output process of the issuing request for the notification by the notification request unit 73 corresponds to a process for issuing the notification. The notification request unit 73 transmits, to the information acquisition unit 81, an issuing request for the driving takeover request, an issuing request for the shift completion notification, an issuing request for the vehicle-to-vehicle distance change notification, an issuing request for the following restart notification, and the like as the issuing request for the notification related to the automated driving. The control status information may also function as an issuing request. That is, the switching information may also serve as the issuing request for the shift completion notification, the vehicle-to-vehicle change information may also serve as the issuing request for the vehicle-to-vehicle distance change notification, and the starting control information may also serve as the issuing request for the following restart notification.

The environment recognition unit 62 combines the locator information and the map data acquired from the locator 35 with the detection information acquired from the periphery monitoring sensor 30, and recognizes a traveling environment in the periphery of the subject vehicle Am for executing the autonomous traveling control. The environment recognition unit 62 includes an other vehicle recognition unit 74, a road information recognition unit 75, and a traffic congestion recognition unit 76 as sub-function units for traveling environment recognition.

The other vehicle recognition unit 74 recognizes a relative position, a relative speed, and the like of a dynamic target in the periphery of the subject vehicle, such as another vehicle. The other vehicle recognition unit 74 recognizes at least a preceding vehicle traveling in front of the subject vehicle Am on the subject vehicle lane Lns and a parallel traveling vehicle AL (see FIG. 4) traveling on an adjacent lane Lna of the subject vehicle lane Lns. The preceding vehicle recognized by the other vehicle recognition unit 74 is the follow-target vehicle At (see FIG. 4) of the subject vehicle Am in the following traveling control described above.

The road information recognition unit 75 recognizes information related to a road on which the subject vehicle Am travels. Specifically, the road information recognition unit 75 recognizes whether the road on which the subject vehicle Am travels or a road to be traveling is within a preset permitted area SeA (see FIG. 9) or a restricted permitted area SeD (see FIG. 9). The information indicating whether the area is the permitted area SeA or the restricted permitted area SeD may be recorded in the map data stored in the map DB 36 or may be included in reception information received by the in-vehicle communication device 39.

More specifically, the permitted area SeA and the restricted permitted area SeD correspond to an operational design domain in which automated driving with no periphery monitoring obligation by the driver is permitted under regulation. In the automated driving ECU 50*b*, as a traveling control state belonging to the autonomous traveling control, traffic congestion limit control (hereinafter, referred to as congested time Level 3) performed only for traveling during traffic congestion and area limit control (hereinafter, referred to as area Level 3) performed only for traveling in a specific area are set. On a road in the permitted area SeA, execution of both congested time Level 3 and area Level 3 is permitted. On the other hand, on a road in the restricted permitted area, execution of only congested time Level 3 is permitted, and execution of area Level 3 is not permitted. Further, on a road (hereinafter, referred to as a non-permitted area SeX, see FIG. 9) that is not included in any of the permitted area SeA and the restricted permitted area SeD, traveling under the autonomous traveling control with no periphery monitoring obligation is prohibited. At congested time Level 3, traveling control is performed such that the subject vehicle Am follows the preceding vehicle while ensuring a distance to the preceding vehicle. On the other hand, at area Level 3, traveling control is performed such that the subject vehicle Am follows the preceding vehicle or the subject vehicle Am cruises at a constant speed along the subject vehicle lane Lns.

The road information recognition unit 75 recognizes the number of lanes of a road on which the vehicle travels based on the map data or the like, and determines whether multiple lanes having the same traveling direction are present on the road on which the vehicle travels. When the subject vehicle Am travels on a road including multiple lanes by automated driving, the road information recognition unit 75 specifies the subject vehicle lane Lns on which the subject vehicle Am travels among the multiple lanes based on the locator information, the detection information, and the like. The road information recognition unit 75 recognizes characteristics of the subject vehicle lane Lns.

The road information recognition unit 75 determines whether the subject vehicle lane Lns is a passing lane Lnp as the characteristics of the subject vehicle lane Lns. In a road including two or more lanes per direction, a lane located closest to the center of the road (on a median strip MS side, see FIG. 4) corresponds to the passing lane Lnp. In the case of a left-hand traffic road, a rightmost lane is the passing lane Lnp, and in the case of a right-hand traffic road, the leftmost lane is the passing lane Lnp.

The road information recognition unit 75 further determines whether the subject vehicle lane Lns is a low-speed lane. The low-speed lane is a lane in which a traveling speed of the parallel traveling vehicle AL traveling on the adjacent lane Lna is lower than the traveling speed of the subject vehicle Am. In a road including two or more lanes per direction, a traveling lane Lnt located on an outermost side of the road (on a road edge RS side, see FIG. 4) corresponds to a low-speed lane. In the case of the left-hand traffic road, a leftmost lane is the low-speed lane, and in the case of the right-hand traffic road, a rightmost lane is the low-speed lane. The low-speed lane is not limited to a normal traveling lane Lnt, and may be an uphill lane, a branched lane, a merging lane, or the like.

The traffic congestion recognition unit 76 recognizes traffic congestion in the periphery of the subject vehicle Am by combining the detection information from the periphery monitoring sensor 30 and the vehicle speed information from the traveling control ECU 40 and the like. The traffic congestion recognition unit 76 determines whether the periphery are in a traffic congestion state, predicts that the traffic congestion is to be resolved, and determines whether the traffic congestion is resolved. The traffic congestion recognition unit 76 may use traffic congestion information received by the in-vehicle communication device 39 to perform a determination related to traffic congestion.

When a current vehicle speed of the subject vehicle Am is equal to or lower than a traffic congestion speed (for example, about 10 km/h) and there is a preceding vehicle traveling on the subject vehicle lane Lns, the traffic congestion recognition unit 76 determines that the periphery of the subject vehicle Am are in a traffic congestion state. After determining that the periphery of the subject vehicle are in a traffic congestion state, when the vehicle speed of the subject vehicle Am exceeds the traffic congestion speed, the traffic congestion recognition unit 76 predicts that the traffic congestion in the periphery of the subject vehicle is to be resolved. After predicting that the traffic congestion is to be resolved, when the vehicle speed of the subject vehicle Am is equal to or lower than the traffic congestion speed again, the traffic congestion recognition unit 76 cancels the prediction that the traffic congestion is to be resolved. Furthermore, after predicting that the traffic congestion in the periphery of the subject vehicle is to be resolved, when the vehicle speed of the subject vehicle Am or a vehicle speed of the preceding vehicle exceeds a traffic congestion resolution speed (for example, about 60 km/h), the traffic congestion recognition unit 76 determines that the traffic congestion is resolved.

The action determination unit 63 cooperates with the HCU 100 and controls driving takeover between the automated driving system 50 and the driver. When the automated driving system 50 has a control right of the driving operation, the action determination unit 63 generates a scheduled traveling line on which the subject vehicle Am travels based on a recognition result of the traveling environment generated by the environment recognition unit 62, and outputs the generated scheduled traveling line to the control execution unit 64. When the follow-target vehicle At is recognized by the other vehicle recognition unit 74, the action determination unit 63 generates a scheduled traveling line for executing following target control for the follow-target vehicle At.

The action determination unit 63 includes a control switching unit 78 and a travel setting control unit 79 as sub-function units that control an operation state of the automated driving function.

Figure 5:
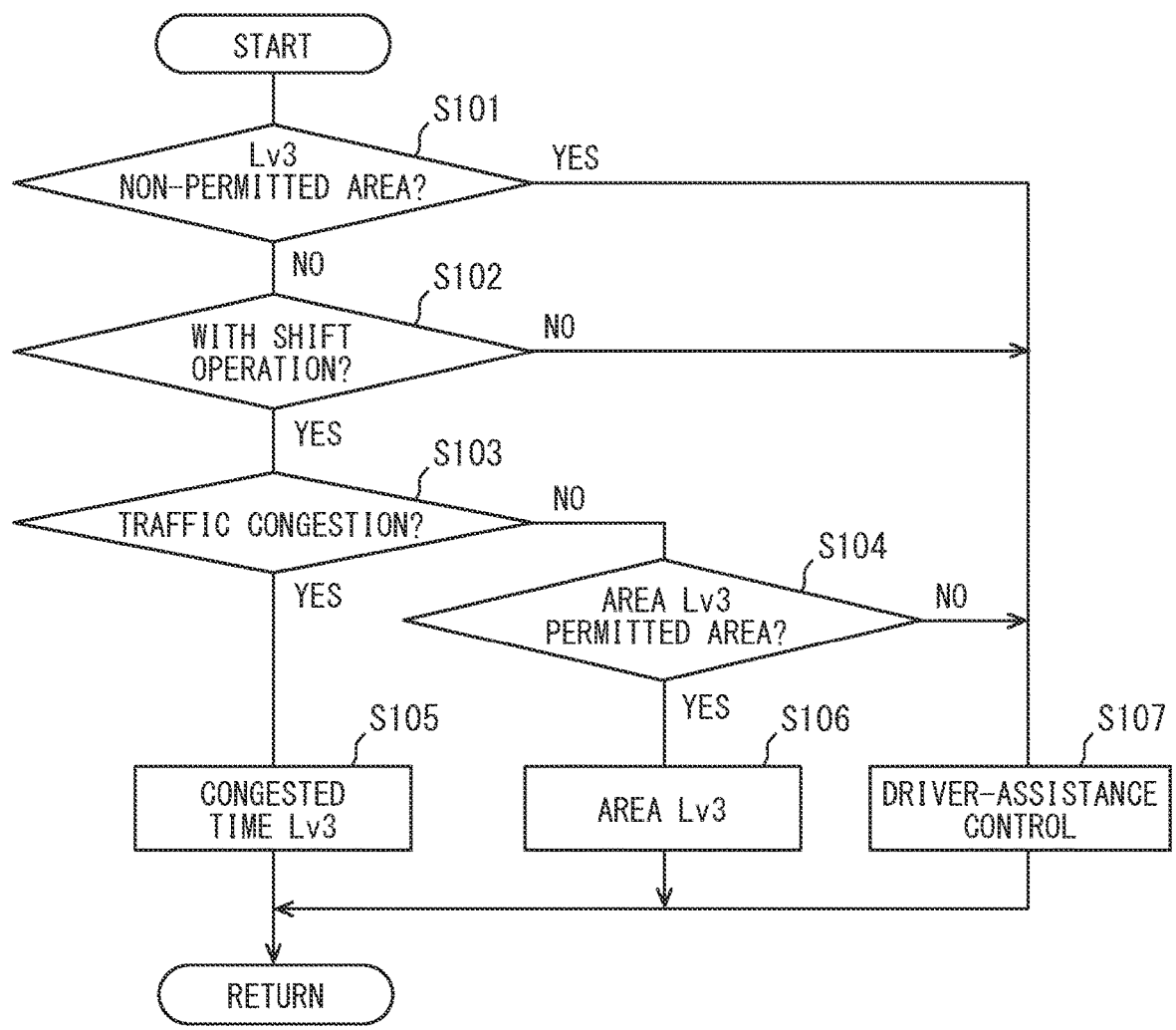
FIG. 5 is a flowchart showing details of a driving control switching process performed mainly by a control switching unit.

The control switching unit 78 switches between the driver-assistance control with a periphery monitoring obligation by the driver and the autonomous traveling control with no periphery monitoring obligation by the driver. In addition, when the subject vehicle Am travels under the autonomous traveling control, the control switching unit 78 switches a traveling control state between multiple states including area Level 3 and congested time Level 3. The control switching unit 78 cooperates with the driver-assistance ECU 50a and switches the traveling control state between the multiple states by executing a driving control switching process (see FIG. 5). The control switching unit 78 starts the driving control switching process, for example, based on the start of the driver-assistance control by the driver-assistance ECU 50a.

In the driving control switching process, the control switching unit 78 determines whether the subject vehicle Am is traveling on a road on which the execution of the autonomous traveling control is permitted (S101). When the road information recognition unit 75 recognizes that the subject vehicle Am is traveling in the non-permitted area SeX (see FIG. 9) (S101: YES), the control switching unit 78 does not permit the execution of the autonomous traveling control and causes the driver-assistance ECU 50a to continue the driver-assistance control (S107). When the traveling control state shifts from the autonomous traveling control to the driver-assistance control by the control switching unit 78, the automated driving ECU 50b may perform the driver-assistance control. On the other hand, when the subject vehicle Am is traveling in the permitted area SeA or the restricted permitted area SeD (S101: NO), the control switching unit 78 determines whether Level 3 shift operation is recognized by the input recognition unit 71 (S102). When Level 3 shift operation is recognized by the input recognition unit 71 (S102: YES), the control switching unit 78 enables the execution of the autonomous traveling control.

When the traffic congestion recognition unit 76 recognizes the traffic congestion in the periphery of the subject vehicle (S103: YES), the control switching unit 78 sets autonomous traveling control of congested time Level 3 to a traveling control state of the subject vehicle Am (S105). On the other hand, when the traffic congestion in the periphery of the subject vehicle is not recognized (S103: NO), the control switching unit 78 determines whether the subject vehicle Am is traveling in the permitted area SeA (see FIG. 9) (S104). When the road information recognition unit 75 recognizes that the subject vehicle Am is traveling in the restricted permitted area SeD (see FIG. 9) (S104: NO), the control switching unit 78 does not permit the shift to the autonomous traveling control and causes the driver-assistance ECU 50a to continue the driver-assistance control (S107). On the other hand, when it is recognized that the subject vehicle Am is traveling in the permitted area SeA (S104: YES), the control switching unit 78 sets autonomous traveling control of area Level 3 to the traveling control state of the subject vehicle Am (S106).

Figure 6:
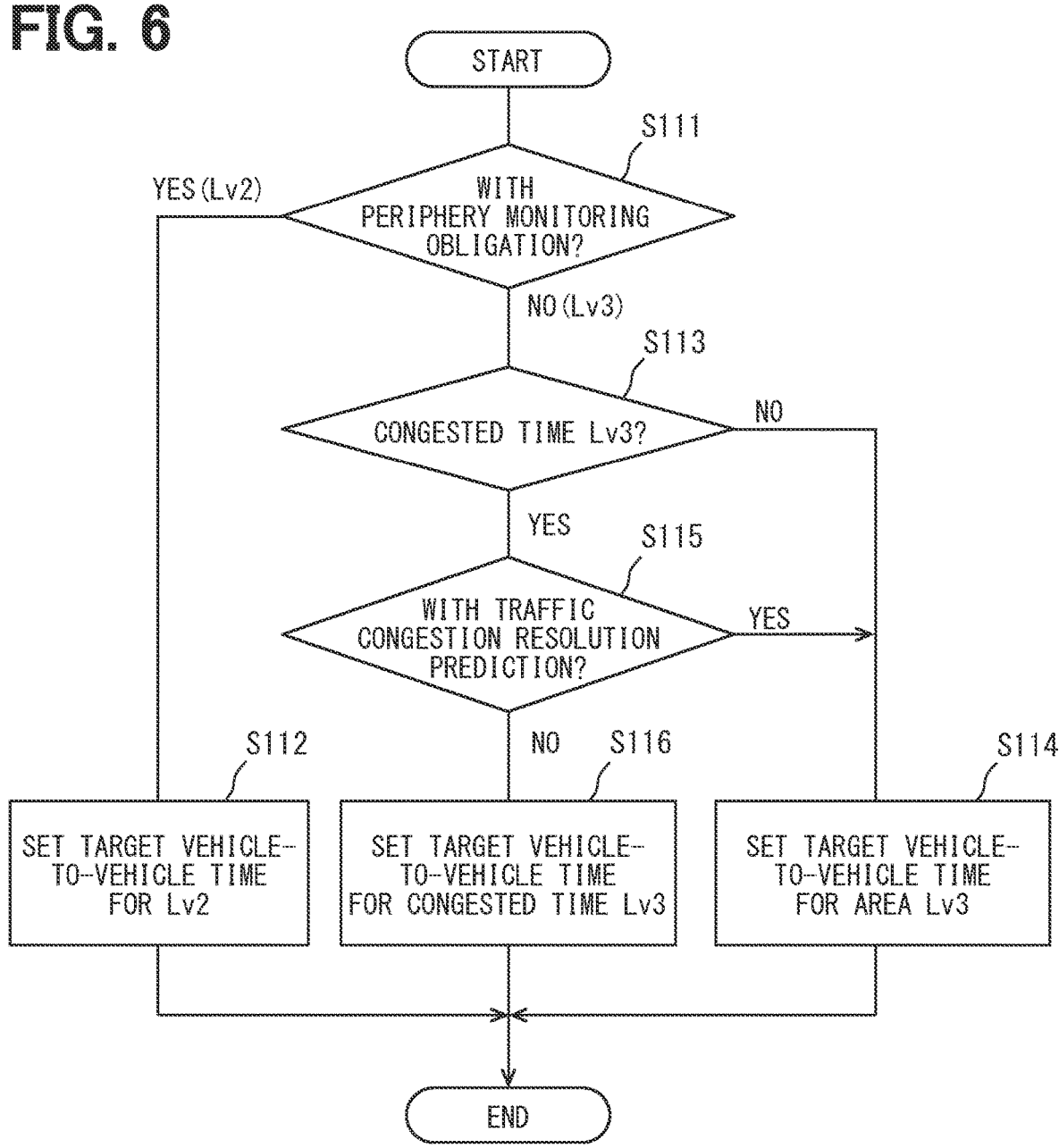
FIG. 6 is a flowchart showing details of a vehicle-to-vehicle setting process performed mainly by a travel setting control unit.

The travel setting control unit 79 changes setting of a parameter related to the autonomous traveling control based on the information recognized by the information cooperation unit 61 and the environment recognition unit 62. The travel setting control unit 79 sets the vehicle-to-vehicle distance VD (see FIG. 4) under the above-described following traveling control. The travel setting control unit 79 cooperates with the driver-assistance ECU 50a and changes the setting of the vehicle-to-vehicle distance VD (see FIG. 4) according to the traveling control state by executing a vehicle-to-vehicle setting process (see FIG. 6). The travel setting control unit 79 starts the vehicle-to-vehicle setting process, for example, based on the start of the driver-assistance control by the driver-assistance ECU 50a.

In the vehicle-to-vehicle setting process, the travel setting control unit 79 determines whether there is a periphery monitoring obligation for a current traveling control state (S111). In response to determining that there is a periphery monitoring obligation for the traveling control state (S111: YES), the travel setting control unit 79 cooperates with the driver-assistance ECU 50a and sets a target vehicle-to-vehicle time associated with the driver-assistance control (S112). On the other hand, in response to determining that there is no periphery monitoring obligation for the traveling control state (S111: NO), the travel setting control unit 79 determines whether the traveling control state is the autonomous traveling control of congested time Level 3 (S113). When the traveling control state is at area Level 3 (S113: NO), the travel setting control unit 79 sets a target vehicle-to-vehicle time associated with the autonomous traveling control of area Level 3 (S114).

When the traveling control state is at congested time Level 3 (S113: YES), the travel setting control unit 79 determines whether there is a traffic congestion resolution prediction generated by the traffic congestion recognition unit 76 (S115). When the traffic congestion recognition unit 76 predicts the resolution of the traffic congestion (S115: YES), the travel setting control unit 79 sets the target vehicle-to-vehicle time associated with the autonomous traveling control of area Level 3 (S114). On the other hand, when the resolution of the traffic congestion is not predicted (S115: NO), the travel setting control unit 79 sets a target vehicle-to-vehicle time associated with the autonomous traveling control of congested time Level 3 (S116).

The travel setting control unit 79 can switch, among multiple (for example, four) control patterns (see FIG. 7), magnitude relations of the vehicle-to-vehicle distance VD associated with the driver-assistance control (Level 2 or lower), the vehicle-to-vehicle distance VD associated with the autonomous traveling control of congested time Level 3, and the vehicle-to-vehicle distance VD associated with the autonomous traveling control of area Level 3.

In a control pattern 1, the vehicle-to-vehicle distance VD associated with the autonomous traveling control of congested time Level 3 is the smallest, and the vehicle-to-vehicle distance VD associated with the autonomous traveling control of area Level 3 is the largest. In the control pattern 1, the vehicle-to-vehicle distance VD associated with driver-assistance control of Level 2 or lower is set to be larger than that of congested time Level 3 and smaller than that of area Level 3.

In a control pattern 2, the vehicle-to-vehicle distance VD associated with congested time Level 3 is substantially the same as the vehicle-to-vehicle distance VD associated with area Level 3. The vehicle-to-vehicle distance VD associated with the driver-assistance control of Level 2 or lower is set to be larger than the vehicle-to-vehicle distance VD associated with autonomous traveling control of Level 3 or higher.

In a control pattern 3, the vehicle-to-vehicle distance VD associated with the autonomous traveling control of congested time Level 3 is set to be smaller than the vehicle-to-vehicle distance VD associated with the autonomous traveling control of area Level 3. The vehicle-to-vehicle distance VD associated with the driver-assistance control of Level 2 or lower is substantially the same as the vehicle-to-vehicle distance VD associated with the autonomous traveling control of area Level 3.

In a control pattern 4, the vehicle-to-vehicle distance VD associated with the driver-assistance control of Level 2 or lower is set to be smaller than the vehicle-to-vehicle distance VD associated with the autonomous traveling control of Level 3 or higher. On the other hand, the vehicle-to-vehicle distance VD associated with congested time Level 3 is substantially the same as the vehicle-to-vehicle distance VD associated with area Level 3.

When the automated driving ECU 50b has the control right of the driving operation, the control execution unit 64 performs acceleration and deceleration control, steering control, and the like of the subject vehicle Am in accordance with the scheduled traveling line generated by the action determination unit 63 in cooperation with the traveling control ECU 40. Specifically, the control execution unit 64 generates control commands based on the scheduled traveling line, and sequentially outputs the generated control commands to the traveling control ECU 40.

When the switching of the traveling control state described above is performed by the automated driving system 50, the HMI system 10 issues a notification related to the switching of the traveling control state. Specifically, the HCU 100 issues the shift completion notification, the vehicle-to-vehicle distance change notification, and the like in synchronization with shift of the traveling control state.

The shift completion notification is information presentation for notifying the driver of completion of the shift of the traveling control state. The shift completion notification is started based on, for example, the start of the shift of the traveling control state, and is continued until the shift of the traveling control state is completed. The shift completion notification is issued by combining reproduction of voice messages for notifying start of the shift and completion of the shift, and additional display of a mode change of an image indicating the traveling control state and an image indicating control shift. The shift completion notification to the autonomous traveling control also functions as a notification indicating that the second task can be performed. In other words, the notification for performing the second task may be issued as the shift completion notification to the autonomous traveling control.

The vehicle-to-vehicle distance change notification is information presentation for notifying the driver of a change in the setting of the vehicle-to-vehicle distance VD related to the shift of the traveling control state. The vehicle-to-vehicle distance change notification is issued when the setting of the vehicle-to-vehicle distance VD is changed in a scene of shift from the driver-assistance control to the autonomous traveling control or a scene of shift from the autonomous traveling control to the driver-assistance control, and indicates, to the driver, that the vehicle-to-vehicle distance VD is changed. The vehicle-to-vehicle distance change notification may be issued in parallel with the shift completion notification. The vehicle-to-vehicle distance change notification is started based on, for example, the change in the setting of the vehicle-to-vehicle distance VD by the travel setting control unit 79. The vehicle-to-vehicle distance change notification may be terminated when a predetermined time elapses, or may be continued until adjustment of the vehicle-to-vehicle distance VD is completed. When the following traveling control is performed in the automated driving system 50, the presentation control unit 88 displays, on at least one of the meter display 21 and the HUD 23, a vehicle-to-vehicle status image Pds indicating a current setting status of the vehicle-to-vehicle distance VD. In addition to displaying the vehicle-to-vehicle status image Pds, by reproducing a voice message or additionally displaying an image, information presentation indicating that the vehicle-to-vehicle distance VD is being adjusted or the adjustment of the vehicle-to-vehicle distance VD is completed is performed as the vehicle-to-vehicle distance change notification.

In order to issue the shift completion notification, the vehicle-to-vehicle distance change notification, and the like described above, the HCU 100 starts a notification issuing process (see FIG. 8) when recognizing the activation of the automated driving function in the automated driving system 50. The HCU 100 repeats the notification issuing process until the automated driving function is stopped.

In the notification issuing process, the information acquisition unit 81 waits for reception of the issuing request for the shift completion notification or the vehicle-to-vehicle distance change notification (S11). When the information acquisition unit 81 acquires the issuing request (S11: YES), the presentation control unit 88 issues a notification associated with the acquired issuing request (S12). As described above, the switching information or the vehicle-to-vehicle change information may be provided to the information acquisition unit 81 as an issuing request of each notification. The presentation control unit 88 can start the shift completion notification or the vehicle-to-vehicle distance change notification using the switching information or the vehicle-to-vehicle change information as a trigger.

Next, details of multiple scenes 1 to 3 in which the setting of the vehicle-to-vehicle distance VD of the following traveling control is changed by the travel setting control unit 79 in accordance with the switching of the traveling control state by the control switching unit 78 will be described below with reference to FIGS. 1 to 4 and 7 based on FIGS. 9 to 11.

<Scene 1: Control Shift Between Driver-Assistance Control and Autonomous Traveling Control/Control Pattern 4>

Figure 9:
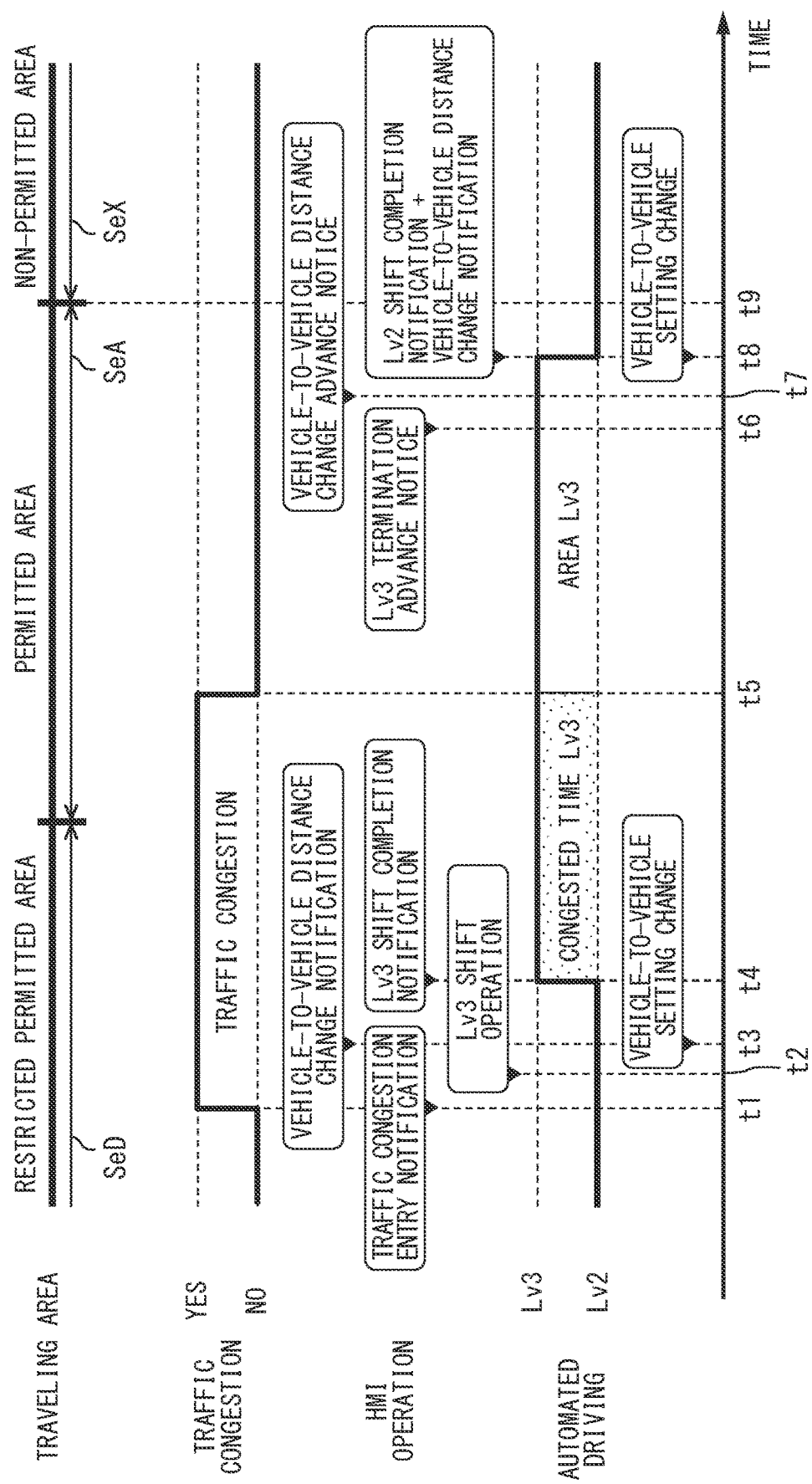
FIG. 9 is a time chart showing details of control in a scene 1 in which the setting of the vehicle-to-vehicle distance is changed.

In a scene 1 shown in FIG. 9, setting of a vehicle-to-vehicle distance of a control pattern 4 (see FIG. 7) is adopted. The travel setting control unit 79 sets the vehicle-to-vehicle distance VD under the autonomous traveling control of Level 3 or higher to be larger than that under the driver-assistance control of Level 2 or lower. In the scene 1, when the traffic congestion recognition unit 76 recognizes an entry into the traffic congestion in the restricted permitted area SeD (time t1), the control switching unit 78 permits the shift to congested time Level 3. The presentation control unit 88 gives a notification of the entry into the traffic congestion based on a notification request acquired from the notification request unit 73. The notification indicating the entry into the traffic congestion in the scene 1 also functions as a notification indicating that the autonomous traveling control of Level 3 is available.

When Level 3 shift operation is recognized by the input recognition unit 71 after the use of congested time Level 3 is possible (time t2), the travel setting control unit 79 changes the setting to increase the vehicle-to-vehicle distance VD (time t3). Specifically, the travel setting control unit 79 changes the setting from the target vehicle-to-vehicle time associated with the driver-assistance control to the target vehicle-to-vehicle time associated with the autonomous traveling control. As a result, vehicle speed control is started to increase the vehicle-to-vehicle distance VD. The presentation control unit 88 issues the vehicle-to-vehicle distance change notification indicating a change for increasing the vehicle-to-vehicle distance VD, based on the notification request acquired from the notification request unit 73 or the vehicle-to-vehicle change information.

After the vehicle-to-vehicle distance VD is changed by the travel setting control unit 79, the control switching unit 78 switches the traveling control state from the driver-assistance control to the autonomous traveling control of congested time Level 3 (time t4). When the traveling control state shifts from the driver-assistance control to the autonomous traveling control, the notification request unit 73 outputs the issuing request such that the shift completion is notified after the vehicle-to-vehicle distance VD is changed. Based on the acquisition of the notification request, the presentation control unit 88 issues the shift completion notification indicating completion of the shift to the autonomous traveling control of Level 3 after the vehicle-to-vehicle distance VD is changed.

The control switching unit 78 switches the traveling control state from congested time Level 3 to area Level 3 when the resolution of the traffic congestion in the periphery of the subject vehicle is recognized in the permitted area SeA (time t5). In the scene 1, the vehicle-to-vehicle distances VD of congested time Level 3 and area Level 3 are set to be the same. Therefore, the change in the vehicle-to-vehicle distance VD and the notification related to control shift associated with the shift from congested time Level 3 to area Level 3 are not issued together.

When a scheduled exit from the permitted area SeA is recognized by the road information recognition unit 75, the presentation control unit 88 notices in advance the termination of the autonomous traveling control based on the notification request from the notification request unit 73 or scheduled exit information (time t6). Further, the presentation control unit 88 issues a change advance notice of the vehicle-to-vehicle distance VD following a termination advance notice of the autonomous traveling control (time t7). The termination advance notice of the autonomous traveling control and the change advance notice of the vehicle-to-vehicle distance VD are issued by reproduction of a voice message, additional display of an image, and the like.

The control switching unit 78 switches the traveling control state from the autonomous traveling control of area Level 3 to the driver-assistance control (time t8) before the subject vehicle Am exits from the permitted area SeA (time t9). The travel setting control unit 79 changes the setting of the vehicle-to-vehicle distance VD in accordance with the shift of the traveling control state by the control switching unit 78, and changes the setting to reduce the vehicle-to-vehicle distance VD during traveling in the permitted area SeA. The presentation control unit 88 issues the shift completion notification to the driver-assistance control of Level 2 and the vehicle-to-vehicle distance change notification based on the notification request acquired from the control switching unit 78. In this case, the shift completion notification and the vehicle-to-vehicle distance change notification may be issued in parallel or sequentially.

<Scene 2: Control Shift from Area Level 3 to Congested Time Level 3/Control Patterns 1 and 3>

Figure 10:
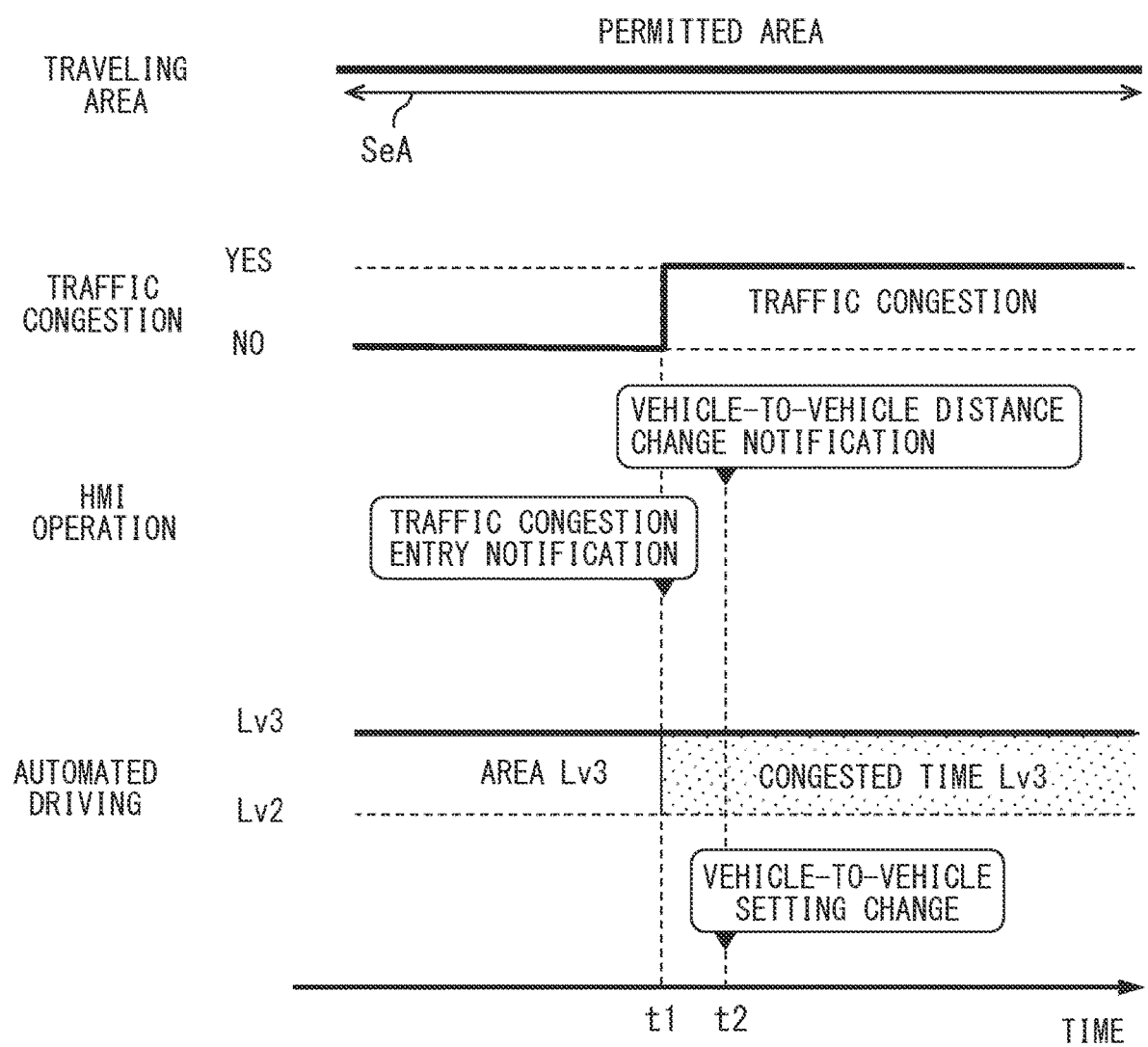
FIG. 10 is a time chart showing details of control in a scene 2.

In a scene 2 shown in FIG. 10, setting of a vehicle-to-vehicle distance of a control pattern 1 or 3 (see FIG. 7) is adopted. The travel setting control unit 79 sets the vehicle-to-vehicle distance VD of congested time Level 3 to be smaller than that of area Level 3. In the scene 2, when the traffic congestion recognition unit 76 recognizes an entry into the traffic congestion in the permitted area SeA (time t1), the control switching unit 78 shifts the traveling control state from area Level 3 to congested time Level 3.

The notification request unit 73 outputs a notification request to the HCU 100 based on the shift of the traveling control state. The presentation control unit 88 gives a notification of the entry into the traffic congestion based on a notification request acquired from the notification request unit 73. The notification indicating the entry into the traffic congestion in the scene 2 also functions as a control shift notification from area Level 3 to congested time Level 3.

When the traveling control state shifts from area Level 3 to congested time Level 3 by the control switching unit 78, the travel setting control unit 79 changes the setting to reduce the vehicle-to-vehicle distance VD after the shift to congested time Level 3 is completed (time t2). Based on the notification request acquired from the notification request unit 73, the presentation control unit 88 issues the vehicle-to-vehicle distance change notification indicating that the vehicle-to-vehicle distance VD is reduced in accordance with the change in the setting of the vehicle-to-vehicle distance VD by the travel setting control unit 79.

<Scene 3: Control Shift Between Driver-Assistance Control and Congested Time Level 3/Control Patterns 1 to 3>

Figure 11:
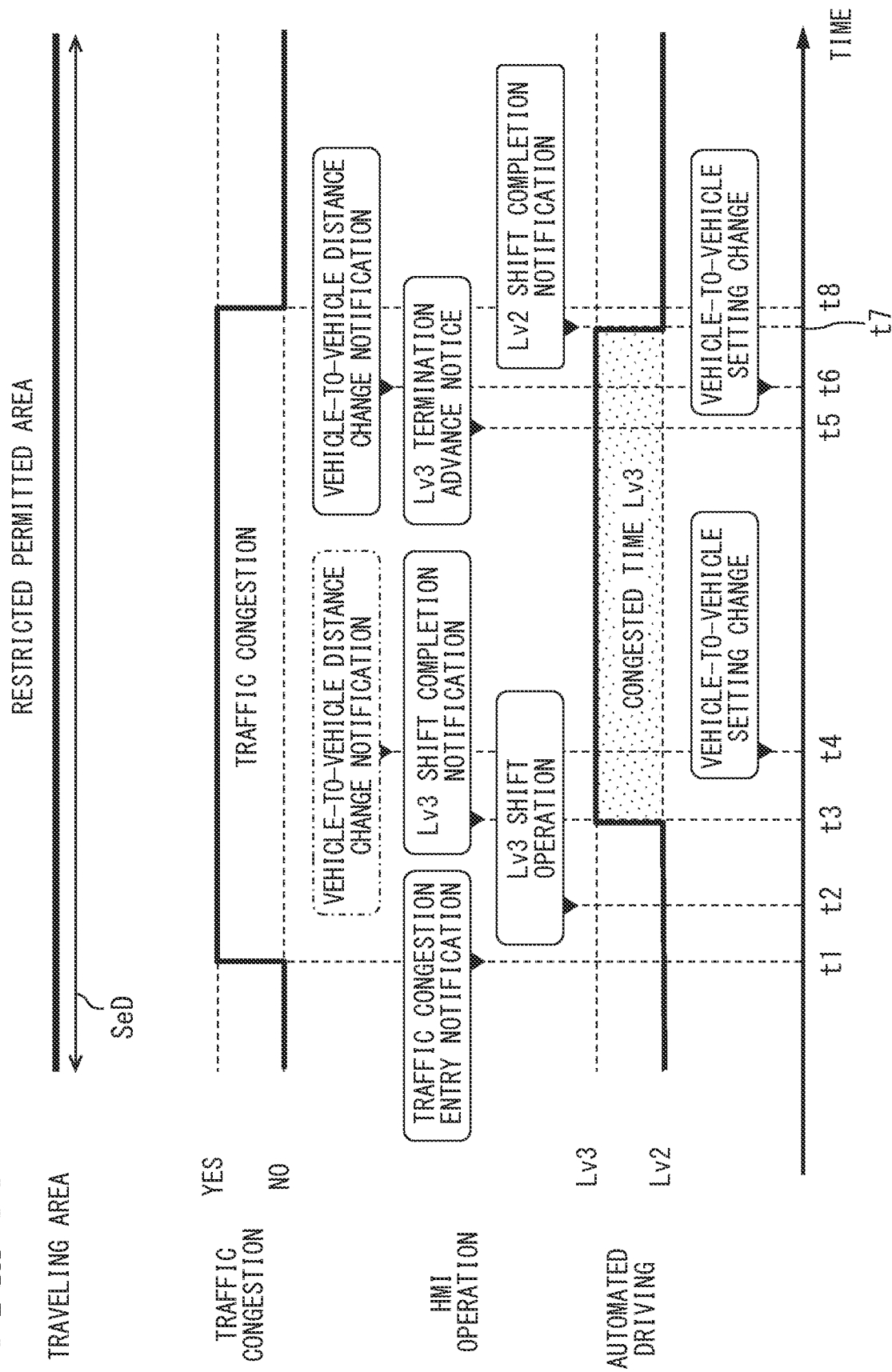
FIG. 11 is a time chart showing details of control in a scene 3.

In a scene 3 shown in FIG. 11, setting of a vehicle-to-vehicle distance of any one of control patterns 1 to 3 (see FIG. 7) is adopted. The travel setting control unit 79 sets the vehicle-to-vehicle distance VD of congested time Level 3 to be smaller than that of the driver-assistance control of Level 2 or lower. In the scene 3, when the traffic congestion recognition unit 76 recognizes an entry into the traffic congestion in the restricted permitted area SeD (time t1), the control switching unit 78 permits the shift to congested time Level 3. The presentation control unit 88 gives a notification of the entry into the traffic congestion based on a notification request acquired from the notification request unit 73. The notification indicating the entry into the traffic congestion in the scene 3 also functions as a notification indicating that the autonomous traveling control of Level 3 is unavailable.

When Level 3 shift operation is recognized by the input recognition unit 71 after the use of congested time Level 3 is possible (time t2), the control switching unit 78 switches the traveling control state from the driver-assistance control to the autonomous traveling control of congested time Level 3 (time t3). In the control patterns 1 to 3, traffic congestion is recognized during traveling under the driver-assistance control, and when the traveling control state shifts from the driver-assistance control to congested time Level 3, the travel setting control unit 79 maintains the setting of the vehicle-to-vehicle distance VD until the shift to congested time Level 3 is completed. Based on the acquisition of the notification request from the notification request unit 73 or the switching information, the presentation control unit 88 issues the shift completion notification indicating completion of the shift to congested time Level 3.

The travel setting control unit 79 changes the setting to reduce the vehicle-to-vehicle distance VD based on the elapse of a predetermined time after the shift from the driver-assistance control to congested time Level 3 is completed (time t4). When the setting of the vehicle-to-vehicle distance VD is changed after the shift to congested time Level 3, the vehicle-to-vehicle distance change notification by the presentation control unit 88 is stopped. However, a set vehicle-to-vehicle distance indicated by the vehicle-to-vehicle status image Pds (see FIG. 3) may be changed as the setting of the vehicle-to-vehicle distance VD is changed.

When the traffic congestion recognition unit 76 predicts the resolution of the traffic congestion during traveling according to congested time Level 3, the presentation control unit 88 notices in advance the termination of congested time Level 3 based on the notification request from the notification request unit 73 (time t5). In addition, the travel setting control unit 79 changes the setting to increase the vehicle-to-vehicle distance VD during the continuation of congested time Level 3 based on the traffic congestion resolution prediction (time t6). The presentation control unit 88 issues the vehicle-to-vehicle distance change notification indicating that the vehicle-to-vehicle distance VD increases, based on the notification request acquired from the notification request unit 73 or the vehicle-to-vehicle change information.

After the travel setting control unit 79 completes changing the vehicle-to-vehicle distance VD, before the traffic congestion resolution is determined by the traffic congestion recognition unit 76 (time t8), the control switching unit 78 switches the traveling control state from congested time Level 3 to the driver-assistance control (time t7). The presentation control unit 88 gives a notification of completion of the shift to the driver-assistance control in accordance with the switching of the traveling control state based on the notification request acquired from the notification request unit 73.

<Change in Vehicle-to-Vehicle Distance According to Traveling Environment>

Figure 12:
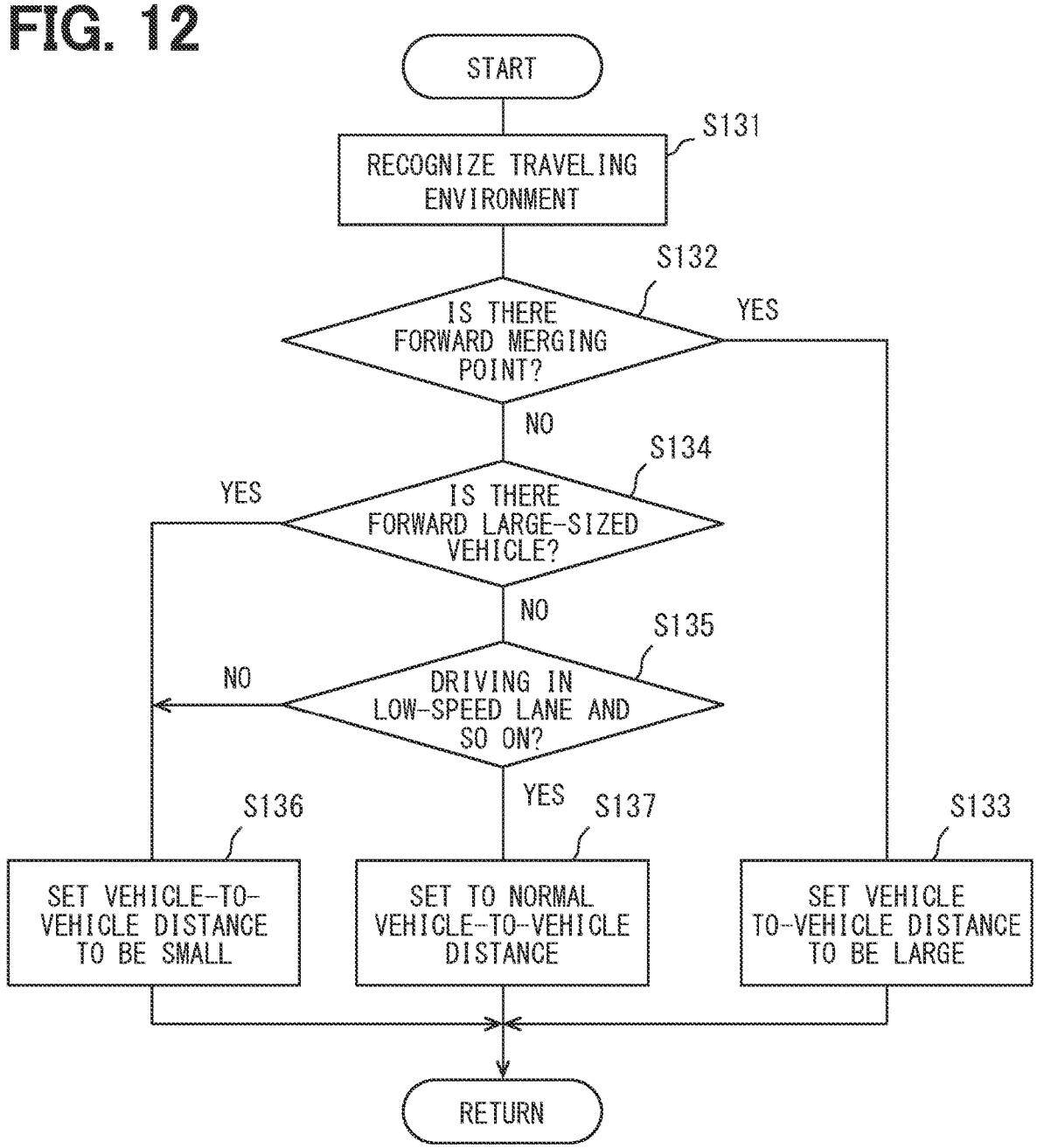
FIG. 12 is a flowchart showing details of a vehicle-to-vehicle adjustment process performed mainly by the travel setting control unit.

When the following travel is performed under the autonomous traveling control of Level 3 or higher, the travel setting control unit 79 changes the setting of the vehicle-to-vehicle distance VD to the follow-target vehicle At according to a traveling environment recognized by the environment recognition unit 62. The travel setting control unit 79 increases or decreases the vehicle-to-vehicle distance VD to the follow-target vehicle At with respect to a normal vehicle-to-vehicle distance VD associated with the autonomous traveling control (area Level 3) by executing a vehicle-to-vehicle adjustment process (see FIG. 12). The vehicle-to-vehicle adjustment process is started, for example, based on the switching of the traveling control state to area Level 3, and is continuously repeated until area Level 3 is terminated.

In the vehicle-to-vehicle adjustment process, the environment recognition unit 62 first recognizes the traveling environment in the periphery of the subject vehicle (S131). The travel setting control unit 79 determines whether a merging point is present in the traveling direction of the subject vehicle Am based on the traveling environment recognized by the environment recognition unit 62 (S132). When the presence of the merging point in the traveling direction of the subject vehicle Am is recognized (S132: YES), the travel setting control unit 79 changes the setting to increase the vehicle-to-vehicle distance VD (S133).

On the other hand, when the presence of the merging point is not recognized (S132: NO), the travel setting control unit 79 further determines whether the follow-target vehicle At is a large-sized vehicle based on the traveling environment recognized by the environment recognition unit 62 (S134). When the presence of the large-sized vehicle as the follow-target vehicle At is recognized (S134: YES), the travel setting control unit 79 changes the setting to reduce the vehicle-to-vehicle distance VD (S136).

When the presence of the large-sized vehicle is not recognized (S134: NO), the travel setting control unit 79 recognizes the characteristics of the subject vehicle lane Lns based on the traveling environment recognized by the environment recognition unit 62 (S135). Specifically, the travel setting control unit 79 determines whether the vehicle travels on a low-speed lane. When the subject vehicle Am is traveling on the passing lane Lnp (see FIG. 4) or the like, the travel setting control unit 79 determines that the vehicle does not travel on the low-speed lane (S135: NO), and changes the setting to reduce the vehicle-to-vehicle distance VD (S136). On the other hand, when the subject vehicle Am is traveling on the normal traveling lane Lnt (see FIG. 4), the uphill lane, or the like, the travel setting control unit 79 determines that the vehicle travels on the low-speed lane (S135: YES), and sets the normal vehicle-to-vehicle distance VD associated with area Level 3 (S137).

According to the above description, when the subject vehicle lane Lns is the passing lane Lnp, the setting is changed such that the vehicle-to-vehicle distance VD is smaller than that when the subject vehicle lane Lns is not the passing lane Lnp. When the traveling speed of the parallel traveling vehicle AL traveling on the adjacent lane Lna is higher than the traveling speed of the subject vehicle Am, the setting is changed such that the vehicle-to-vehicle distance VD is larger than that when the traveling speed of the parallel traveling vehicle AL is lower than the traveling speed of the subject vehicle Am.

<Notification of Restart Timing of Subject Vehicle>

Figure 13:
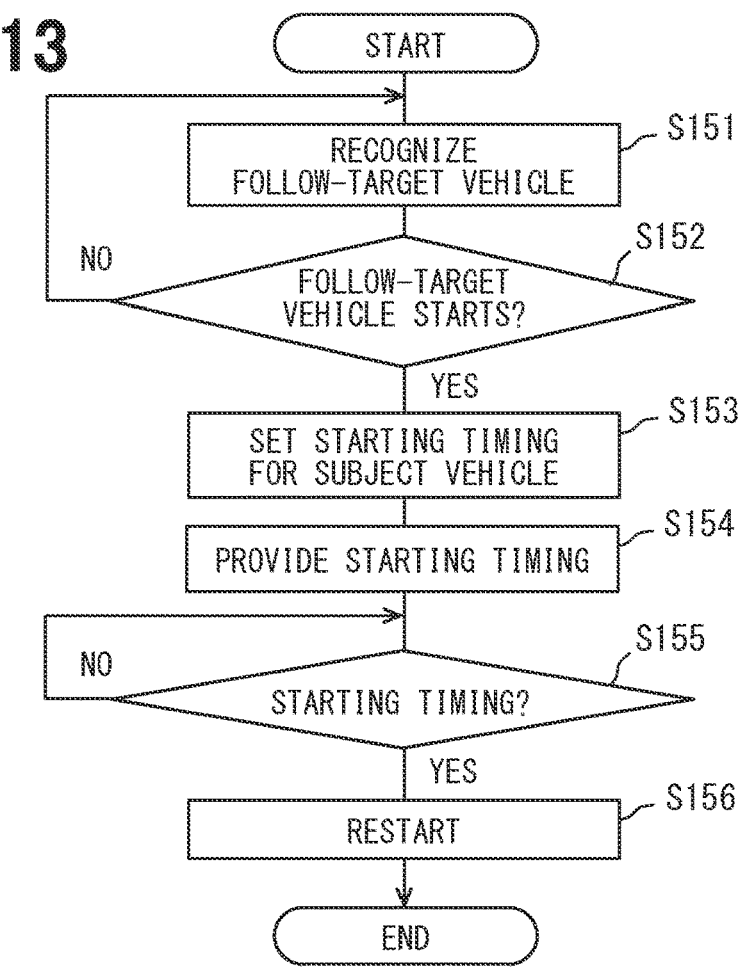
FIG. 13 is a flowchart showing details of a restart control process performed mainly by an action determination unit.

Under the following traveling control according to the automated driving system 50, for example, when the follow-target vehicle At is temporarily stopped in a scene in which the vehicle travels in traffic congestion or the like, the subject vehicle Am also stops while securing the vehicle-to-vehicle distance VD with the follow-target vehicle At. In this scene, the action determination unit 63 starts a restart control process (see FIG. 13) for controlling the restart of the subject vehicle Am.

In the restart control process, based on detection information of the follow-target vehicle At recognized by the other vehicle recognition unit 74, the action determination unit 63 determines whether the follow-target vehicle At started (S151, S152). When the starting of the follow-target vehicle At is recognized (S152: YES), the action determination unit 63 sets a starting timing of the subject vehicle Am (S153). The starting timing may be set using the elapsed time (vehicle-to-vehicle time) after the starting of the follow-target vehicle At, or may be set using the vehicle-to-vehicle distance VD from the subject vehicle Am to the follow-target vehicle At. The action determination unit 63 provides, to the HCU 100, the starting control information indicating the starting timing through the notification request unit 73 (S154). The action determination unit 63 waits for the starting timing (S155), and restarts the subject vehicle Am (S156) after reaching the starting timing (S155: YES).

Figure 14:
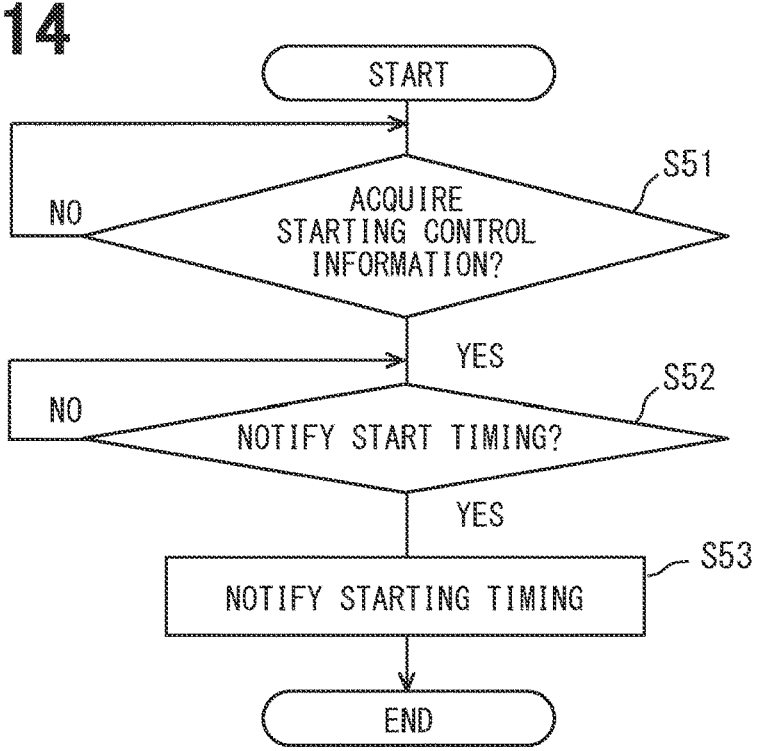
FIG. 14 is a flowchart showing details of a restart notification process performed by the HCU.
Figure 15:
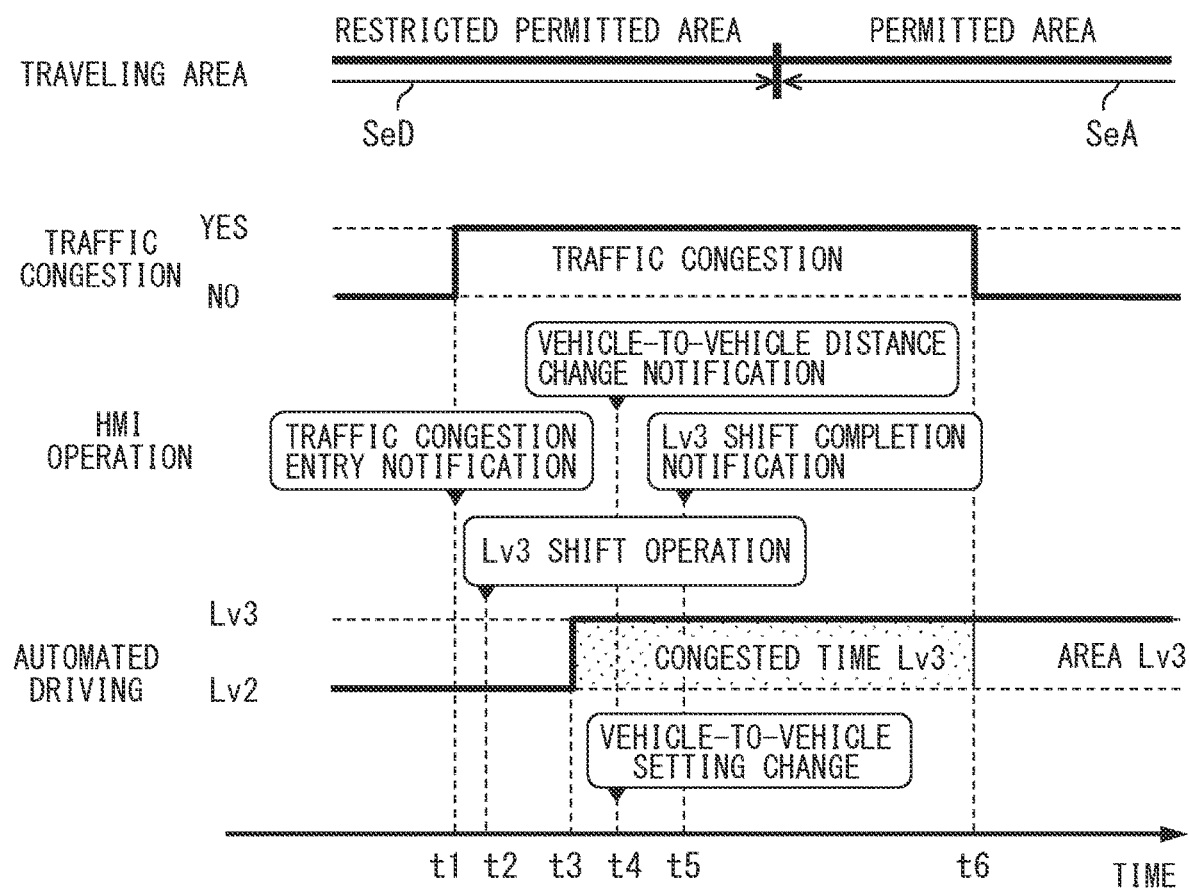
FIG. 15 is a flowchart showing details of a notification issuing process according to a second embodiment of the present disclosure.
Figure 16:
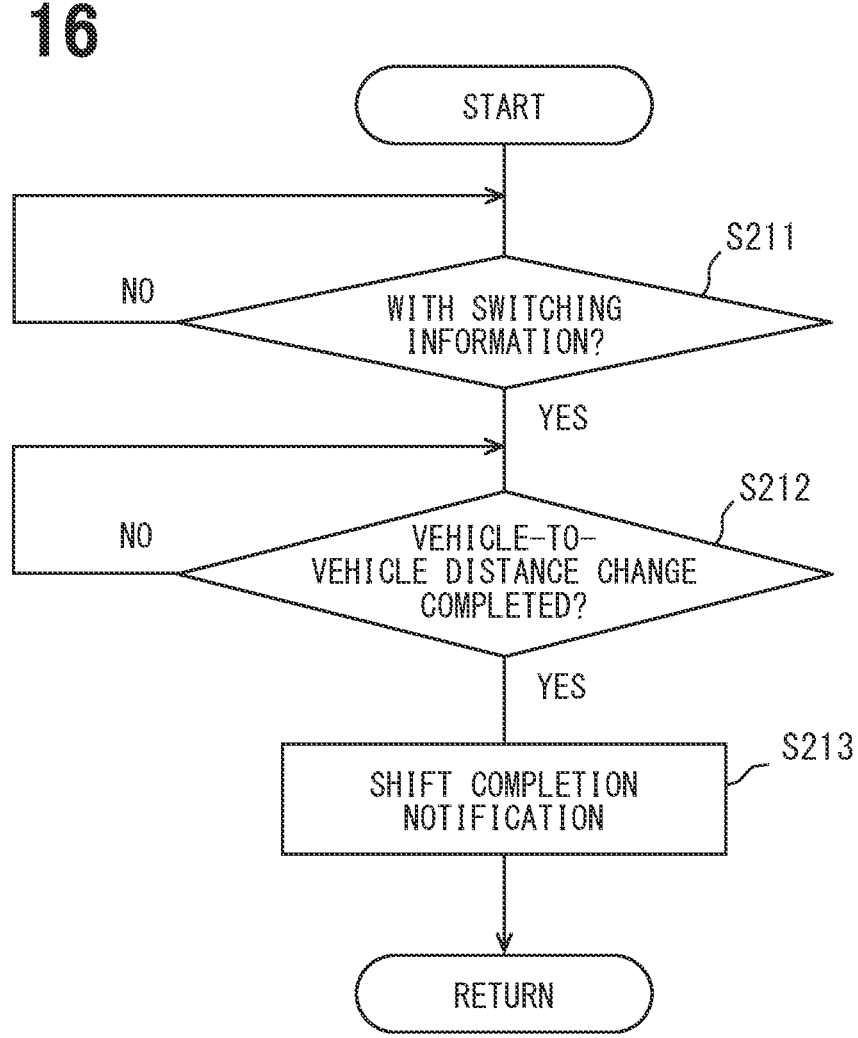
FIG. 16 is a time chart showing details of control in the scene 1 according to the second embodiment.

In the above-described restart scene, the HCU 100 issues a following restart notification related to the starting timing of the subject vehicle Am. The restart notification is issued singly, for example, by reproducing a voice message or displaying a notification image at a timing when the vehicle-to-vehicle distance VD is about several meters (for example, 3 meters) after the follow-target vehicle At starts to travel. When the HCU 100 recognizes the stop of the subject vehicle Am in a state in which the following traveling control is operating, the HCU 100 starts a restart notification process (see FIG. 14). In the restart notification process, acquisition of the starting control information indicating the starting timing is waited for (S51). When the starting control information is acquired by the information acquisition unit 81 (S51: YES), the presentation control unit 88 sets a start timing of the following restart notification based on the starting timing indicated by the starting control information. After reaching a notification start timing (S52: YES), the presentation control unit 88 issues a following restart notification after the starting of the follow-target vehicle At (S53).

In the first embodiment described above, when the traveling control state shifts from the driver-assistance control to the autonomous traveling control, the shift completion notification indicating completion of the shift to the autonomous traveling control is issued after the vehicle-to-vehicle distance VD is changed. Accordingly, the vehicle-to-vehicle distance VD is changed while the driver continues monitoring the periphery. As a result, the driver can easily recognize a process for changing the vehicle-to-vehicle distance VD, and thus the convenience of automated driving can be improved.

In addition, in the first embodiment, after the vehicle-to-vehicle distance VD is changed by the travel setting control unit 79, the control switching unit 78 switches the traveling control state from the driver-assistance control to the autonomous traveling control. According to the above description, the change in the vehicle-to-vehicle distance VD can be completed in a state of the periphery monitoring obligation by the driver. As a result, a situation in which a driver who does not see the periphery of the subject vehicle feels uneasy about a change in the setting of the vehicle-to-vehicle distance VD is less likely to occur.

In the first embodiment, the vehicle-to-vehicle distance VD in a case where the vehicle travels in traffic congestion under the autonomous traveling control is set to be smaller than the vehicle-to-vehicle distance VD in the case where the vehicle travels in the traffic congestion under the driver-assistance control. Therefore, in a traffic congestion traveling scene with no periphery monitoring obligation, it is difficult for another vehicle to cut in between the subject vehicle Am and the follow-target vehicle At. According to the above description, a situation in which the autonomous traveling control is terminated due to the cut-in of the other vehicle is less likely to occur. As a result, since a state with no periphery monitoring obligation is easily continued, the convenience of automated driving can be improved.

In the first embodiment, when the traveling control state shifts from area Level 3 to congested time Level 3 by the control switching unit 78, the travel setting control unit 79 changes the setting to reduce the vehicle-to-vehicle distance VD. Therefore, in a scene in which the autonomous traveling control of congested time Level 3 is performed, it is difficult for another vehicle to cut in front of the subject vehicle Am. As a result, since a state with no periphery monitoring obligation is easily continued, the convenience of automated driving can be improved.

In addition, in the first embodiment, when the traveling control state shifts from area Level 3 to congested time Level 3 by the control switching unit 78, the notification request unit 73 causes the HMI system 10 to issue the vehicle-to-vehicle distance change notification. Therefore, even when the driver does not see the periphery of the subject vehicle, the driver can recognize the change in the setting of the vehicle-to-vehicle distance VD through the vehicle-to-vehicle distance change notification.

In the first embodiment, traffic congestion is recognized during traveling by the driver-assistance control, and when the traveling control state shifts from the driver-assistance control to congested time Level 3, the travel setting control unit 79 maintains the setting of the vehicle-to-vehicle distance VD until the shift to congested time Level 3 is completed. According to the above description, since a sudden change in the vehicle-to-vehicle distance VD due to the entry into the traffic congestion does not occur, it is possible to reduce the uneasiness of the driver about the automated driving.

Further, in the first embodiment, the travel setting control unit 79 changes the setting to reduce the vehicle-to-vehicle distance VD based on the elapse of the predetermined time after the shift from the driver-assistance control to congested time Level 3 is completed. According to the above description, adjustment for reducing the vehicle-to-vehicle distance VD is performed in a state in which the speed of the subject vehicle Am is sufficiently decreased after the vehicle enters the traffic congestion, and is less likely to be recognized by the driver who does not see the periphery of the subject vehicle. As a result, the driver can comfortably perform the second task without being aware of the change in the vehicle-to-vehicle distance VD.

In addition, in the first embodiment, when the traveling control state shifts from the driver-assistance control to congested time Level 3, the vehicle-to-vehicle distance change notification that is issued at the time of shift from congested time Level 3 to the driver-assistance control is not performed. Therefore, the adjustment for reducing the vehicle-to-vehicle distance VD is less likely to be recognized by the driver. As a result, the driver can comfortably spend an automated driving period in which the vehicle travels under the autonomous traveling control.

In the first embodiment, the traffic congestion recognition unit 76 predicts the resolution of the traffic congestion that occurs in the periphery of the subject vehicle Am. When the resolution of the traffic congestion is predicted during traveling at congested time Level 3, the travel setting control unit 79 changes the setting to increase the vehicle-to-vehicle distance VD during the continuation of congested time Level 3. According to the above description, since the adjustment of increasing the vehicle-to-vehicle distance VD is performed at the time of low-speed traveling, a change in behavior associated with the adjustment of the vehicle-to-vehicle distance VD is less likely to be recognized by the driver. As a result, the uneasiness of the driver for the automated driving can be reduced.

Further, in the first embodiment, in a case where the traveling control state shifts from the driver-assistance control with a periphery monitoring obligation to the automated driving control with no periphery monitoring obligation, when the vehicle-to-vehicle distance is changed, a vehicle-to-vehicle distance change notification indicating the change in the vehicle-to-vehicle distance VD is issued. Therefore, since the driver can easily recognize the process for changing the vehicle-to-vehicle distance VD, the convenience of automated driving can be improved.

Furthermore, in the first embodiment, the setting of the vehicle-to-vehicle distance VD from the subject vehicle Am to the follow-target vehicle At is changed according to a periphery condition in the periphery of the subject vehicle Am or the characteristics of the subject vehicle lane Lns. Therefore, it is possible to prevent another vehicle from cutting in front of the subject vehicle Am, or to support smooth cutting in by the other vehicle. According to the above description, a situation in which the autonomous traveling control with no periphery monitoring obligation is terminated due to the cut-in of the other vehicle is less likely to occur. As a result, since a traveling state with no periphery monitoring obligation is easily continued, the convenience of automated driving can be improved.

In the first embodiment, when the presence of the merging point in the traveling direction of the subject vehicle Am is recognized, the travel setting control unit 79 changes the setting to increase the vehicle-to-vehicle distance VD. Therefore, even in a scene in which another vehicle cuts in front of the subject vehicle Am at the merging point, the automated driving ECU 50b can smoothly continue the autonomous traveling control. As a result, the convenience of automated driving is further improved.

Furthermore, in the first embodiment, when the presence of a large-sized vehicle as the follow-target vehicle At is recognized, the travel setting control unit 79 changes the setting to reduce the vehicle-to-vehicle distance VD. According to the above description, since air resistance of the subject vehicle Am is reduced by the large-sized vehicle, fuel consumption or electric consumption of the subject vehicle Am can be reduced.

In addition, the road information recognition unit 75 according to the first embodiment determines whether the subject vehicle lane Lns is the passing lane Lnp as the characteristics of the subject vehicle lane Lns. When the subject vehicle lane Lns is the passing lane Lnp, the vehicle-to-vehicle distance VD is set to be smaller than that when the subject vehicle lane Lns is not the passing lane Lnp. As described above, in a case where the vehicle-to-vehicle distance VD when the vehicle travels on the passing lane Lnp is reduced, it is difficult for another vehicle to cut in front of the subject vehicle Am. As a result, since the autonomous traveling control is easily continued, the convenience of automated driving can be improved.

In addition, the road information recognition unit 75 according to the first embodiment recognizes, as the characteristics of the subject vehicle lane Lns, whether the traveling speed of the parallel traveling vehicle AL traveling on the adjacent lane Lna is higher than the traveling speed of the subject vehicle Am. When the traveling speed of the parallel traveling vehicle AL is higher than the traveling speed of the subject vehicle Am, the travel setting control unit 79 changes the setting such that the vehicle-to-vehicle distance VD is larger than that when the traveling speed of the parallel traveling vehicle AL is lower than the traveling speed of the subject vehicle Am. In general, when the vehicle travels on a low-speed lane with a low traveling speed, it is difficult for the parallel traveling vehicle AL to forcibly cut in from the adjacent lane Lna. Therefore, if control is performed such that the vehicle-to-vehicle distance VD is ensured to be large and the subject vehicle Am gently follows the follow-target vehicle At while traveling on the low-speed lane, the comfort and the convenience of automated driving can be improved.

In the first embodiment, when the subject vehicle Am is stopped together with the follow-target vehicle At while traveling under the autonomous traveling control with no periphery monitoring obligation, the following restart notification related to the starting timing of the subject vehicle Am is issued after the starting of the follow-target vehicle At. Therefore, even when the vehicle-to-vehicle distance VD is temporarily large and empty until the subject vehicle Am starts after the follow-target vehicle At starts, the driver can recognize a starting schedule of the subject vehicle Am, and thus the driver is less likely to feel uncomfortable with the large vehicle-to-vehicle distance VD. When the discomfort is reduced by the notification, the convenience of automated driving can be improved.

Figures 7, 8:
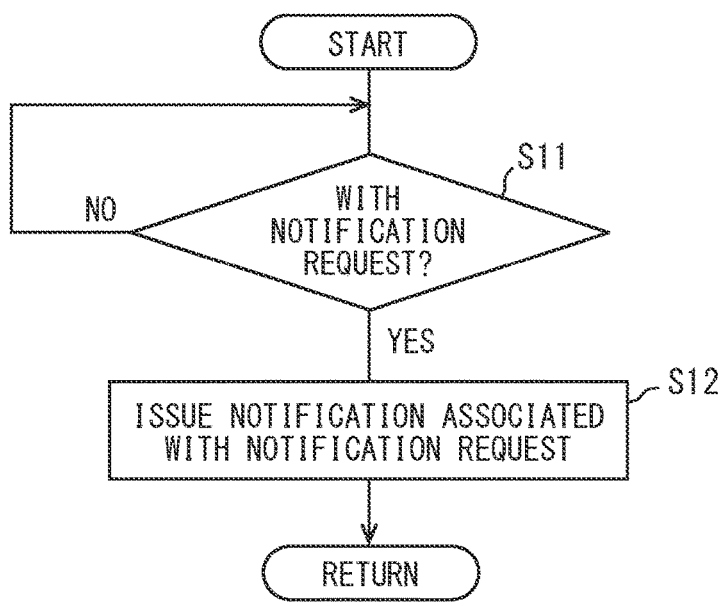
FIG. 7 is a diagram showing a relation in setting of a vehicle-to-vehicle distance in control patterns 1 to 4.
FIG. 8 is a flowchart showing details of a notification issuing process performed by the HCU.

Further, in the first embodiment, the vehicle-to-vehicle distance VD when the periphery of the subject vehicle Am are in traffic congestion is set to be smaller than the vehicle-to-vehicle distance VD when the periphery of the subject vehicle Am are not in traffic congestion (see the control patterns 1 and 3 in FIG. 7). Therefore, when the traffic congestion in the periphery of the subject vehicle is continued, an interruption of another vehicle ahead of the subject vehicle Am is less likely to occur. As a result, the autonomous traveling control with no periphery monitoring obligation is easily continued, and thus the convenience of automated driving can be improved.

In the first embodiment, the parallel traveling vehicle AL corresponds to "another vehicle", the permitted area SeA corresponds to a "specific area", the HMI system 10 corresponds to an "information presentation device", and the automated driving ECU 50b corresponds to an "automated driving control device". The notification request unit 73 and the presentation control unit 88 correspond to a "notification control unit", the road information recognition unit 75 corresponds to a "lane recognition unit", the travel setting control unit 79 corresponds to a "vehicle-to-vehicle control unit", and the HCU 100 corresponds to a "presentation control device".

Second Embodiment

A second embodiment of the present disclosure shown in FIGS. 1 to 3, FIG. 15, and FIG. 16 is a modification of the first embodiment. In the second embodiment, a mode of a notification in the scene 1 (see FIG. 15) in which the subject vehicle Am enters traffic congestion in the restricted permitted area SeD is different from that in the first embodiment (see FIG. 9). Hereinafter, control and notification in the scene 1 according to the second embodiment will be described in detail.

When Level 3 shift operation is recognized by the input recognition unit 71 (time t2) after the subject vehicle Am enters the traffic congestion (time t1), the control switching unit 78 switches a traveling control state from driver-assistance control to autonomous traveling control of congested time Level 3 (time t3). The travel setting control unit 79 changes the vehicle-to-vehicle distance VD after the traveling control state is switched to congested time Level 3 by the control switching unit 78 (time t4). As described above, when switching from the set vehicle-to-vehicle distance associated with the driver-assistance control to the set vehicle-to-vehicle distance associated with congested time Level 3, the travel setting control unit 79 does not start changing the vehicle-to-vehicle distance VD at the same time as the shift to congested time Level 3. After the shift to congested time Level 3, the travel setting control unit 79 performs adjustment to gradually increase the vehicle-to-vehicle distance VD in accordance with the tracking of the follow-target vehicle At (time t4 to t5). In addition, a vehicle-to-vehicle distance change notification is issued after the shift to congested time Level 3 in accordance with the adjustment of increasing the vehicle-to-vehicle distance VD (time t4).

Further, a shift completion notification to congested time Level 3 is issued after the vehicle-to-vehicle distance VD is changed, not when the traveling control state is switched. In a notification issuing process (see FIG. 16), the HCU 100 waits for acquisition of vehicle-to-vehicle change information indicating completion of the change of the vehicle-to-vehicle distance VD in addition to switching information indicating the shift from the driver-assistance control to congested time Level 3. When the vehicle-to-vehicle change information is further acquired (S212: YES) after the switching information is acquired by the information acquisition unit 81 (S211: YES), the presentation control unit 88 issues the shift completion notification indicating completion of the shift to congested time Level 3 (S213). As described above, after the control shift to congested time Level 3, the shift completion notification is issued following the vehicle-to-vehicle distance change notification indicating a change in the setting of the vehicle-to-vehicle distance VD (time t5).

In the second embodiment described above, after the vehicle-to-vehicle distance VD is changed, the shift completion notification indicating the completion of the shift of the traveling control state is also issued. As a result, the same effect as that of the first embodiment can be obtained, the driver can easily recognize the process for changing the vehicle-to-vehicle distance VD, and thus the convenience of automated driving can be improved.

In addition, in the second embodiment, after the traveling control state is switched from the driver-assistance control to the autonomous traveling control of congested time Level 3, the vehicle-to-vehicle distance VD is changed. At this time, the travel setting control unit 79 slowly changes the vehicle-to-vehicle distance VD such that the change in the setting of the vehicle-to-vehicle distance VD is not felt from the behavior of the vehicle. When the vehicle-to-vehicle distance VD suddenly starts to change at the same time as the shift to congested time Level 3, the driver is likely to feel uneasy. In order to avoid such a situation, the travel setting control unit 79 gradually increases the vehicle-to-vehicle distance VD after the shift to the traveling control state with no periphery monitoring obligation. As a result, the driver is less likely to feel that the setting of the vehicle-to-vehicle distance VD changed from the behavior of the vehicle. Thus, a sense of security of the driver for the autonomous traveling control can be improved.

In the second embodiment, the vehicle-to-vehicle distance change notification indicating the change in the setting of the vehicle-to-vehicle distance VD is issued after the shift to the autonomous traveling control (the congested time Level 3) in accordance with the vehicle-to-vehicle control by the travel setting control unit 79 described above. Therefore, the driver can more reliably recognize the change in the setting of the vehicle-to-vehicle distance VD, and accordingly, even if the driver feels the change in the vehicle-to-vehicle distance VD from the behavior of the vehicle, the driver is less likely to feel uneasy.

Third Embodiment

A third embodiment of the present disclosure shown in FIGS. 1 to 4 and FIG. 17 to FIG. 19 is another modification of the first embodiment. In the third embodiment, when autonomous traveling control is performed using information from the periphery monitoring sensor 30, the set vehicle-to-vehicle distance under following traveling control is adjusted such that the periphery monitoring sensor 30 can easily detect the periphery of the subject vehicle. Specifically, the travel setting control unit 79 performs a vehicle-to-vehicle adjustment process (see FIG. 18) for changing the distance setting in the autonomous traveling control, in addition to a vehicle-to-vehicle setting process (see FIG. 17) for switching the vehicle-to-vehicle setting according to a traveling control state. Hereinafter, details of the vehicle-to-vehicle setting process and the vehicle-tovehicle adjustment process performed in the third embodiment will be described with reference to FIGS. 1 to 4.

Figure 17:
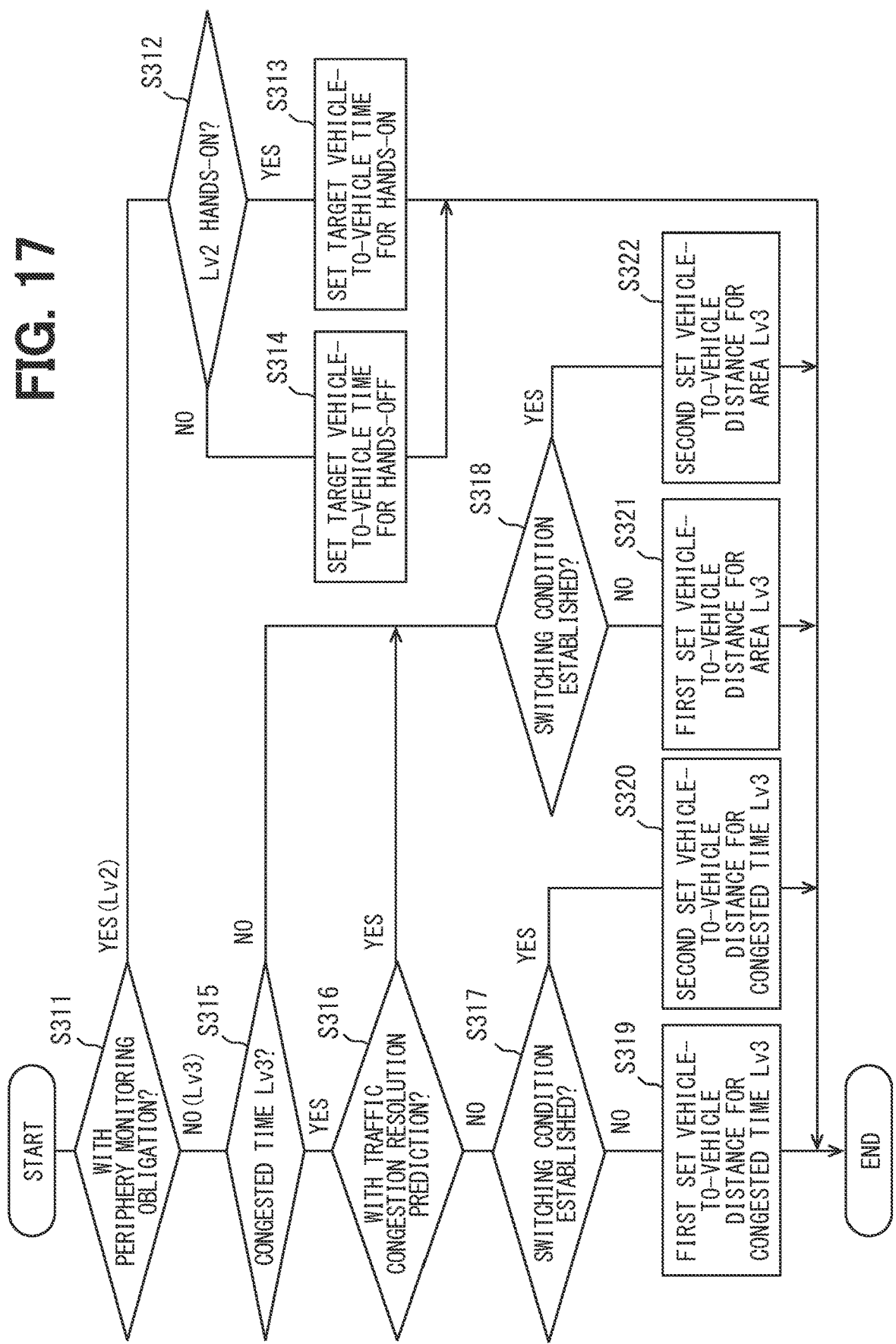
FIG. 17 is a flowchart showing details of a vehicle-to-vehicle setting process according to a third embodiment of the present disclosure.
Figure 18:
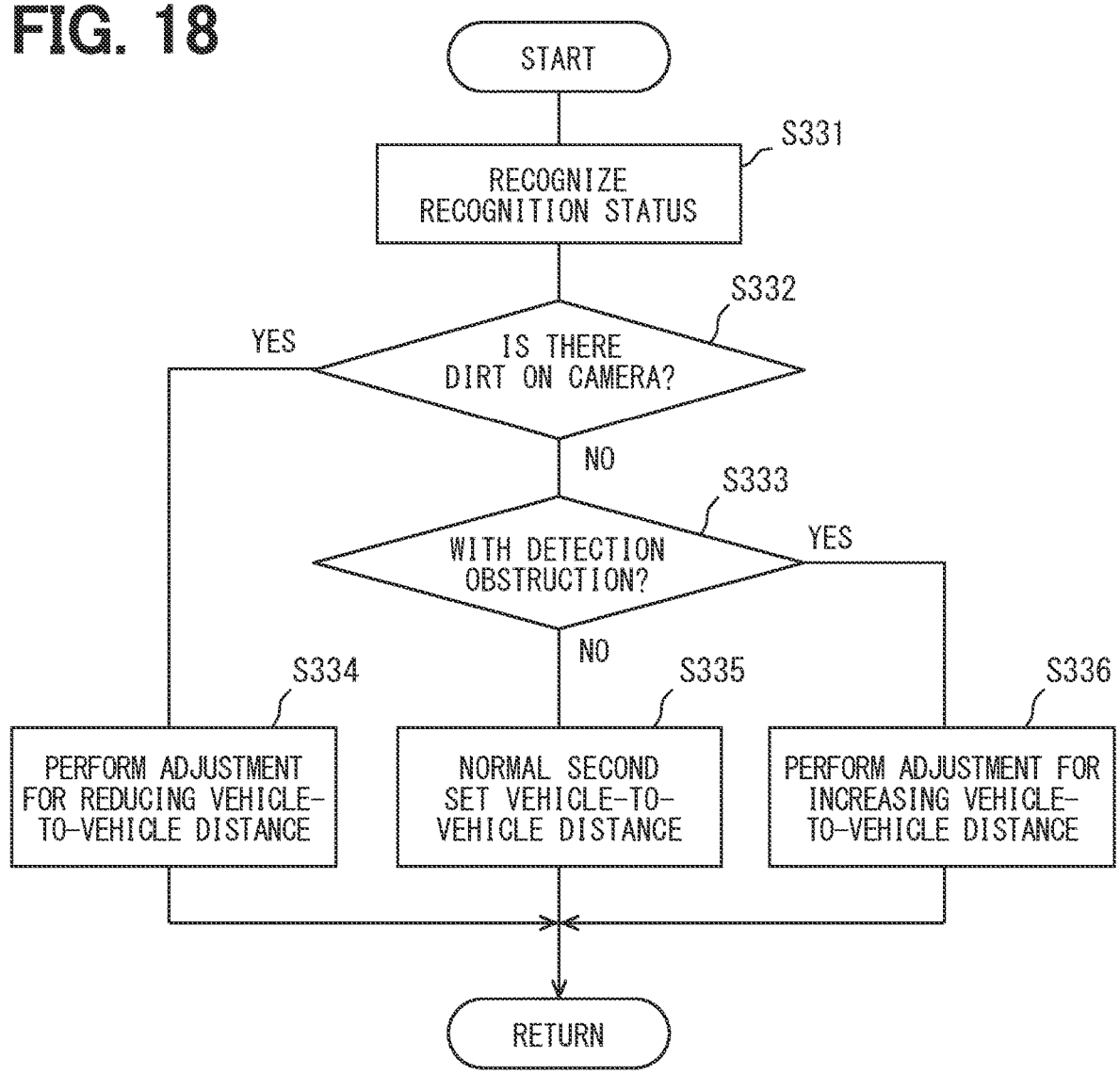
FIG. 18 is a flowchart showing details of a vehicle-to-vehicle adjustment process for adjusting a second vehicle-to-vehicle distance.

In the vehicle-to-vehicle setting process shown in FIG. 17, the travel setting control unit 79 determines whether there is a periphery monitoring obligation for a current traveling control state (S311). In response to determining that there is a periphery monitoring obligation for the traveling control state (S311: YES), the travel setting control unit 79 determines whether there is an obligation to grip a steering wheel under the driver-assistance control in execution (S312).

When the driver-assistance control (hereinafter, referred to as "hands-on control") in which there is an obligation to grip the steering wheel is being performed (S312: YES), the travel setting control unit 79 sets a target vehicle-to-vehicle time associated with the hands-on control (S313). The hands-on control is performed in scenes such as when there is no traffic congestion or immediately after the autonomous traveling control is released.

When the driver-assistance control (hereinafter, referred to as "hands-off control") in which there is no obligation to grip the steering wheel is being performed (S312: NO), the travel setting control unit 79 sets a target vehicle-to-vehicle time associated with the hands-off control (S314). The hands-off control is performed in a traffic congestion traveling scene in the non-permitted area SeX (see FIG. 9). The travel setting control unit 79 sets a target vehicle-to-vehicle time associated with each control such that the vehicle-to-vehicle distance VD under the hands-on control is larger than the vehicle-to-vehicle distance VD under the hands-off control. That is, the target vehicle-to-vehicle time associated with the hands-on control is set to be longer than the target vehicle-to-vehicle time associated with the hands-off control.

In response to determining that there is no periphery monitoring obligation for the traveling control state (S311: NO), the travel setting control unit 79 determines a control mode of the autonomous traveling control, and determines whether congested time Level 3 is being performed (S315). When the autonomous traveling control in execution is at congested time Level 3 (S315: YES), the travel setting control unit 79 determines whether there is a traffic congestion resolution prediction generated by the traffic congestion recognition unit 76 (S316). When there is no traffic congestion resolution prediction (S316: NO), the travel setting control unit 79 determines whether a switching condition of the vehicle-to-vehicle control of congested time Level 3 is established (S317). On the other hand, when there is a traffic congestion resolution prediction (S316: YES), or when the autonomous traveling control in execution is at area Level 3 (S315: NO), the travel setting control unit 79 determines whether a switching condition of the vehicle-to-vehicle control of area Level 3 is established (S318).

The travel setting control unit 79 switches the setting of the vehicle-to-vehicle distance VD associated with the autonomous traveling control based on establishment of the switching condition at each of congested time Level 3 and area Level 3. Specifically, the travel setting control unit 79 switches the setting of the vehicle-to-vehicle distance VD between a first set vehicle-to-vehicle distance as a reference and a second set vehicle-to-vehicle distance in which the detection of the periphery of the subject vehicle by the periphery monitoring sensor 30 is easier than in the first set vehicle-to-vehicle distance. The first set vehicle-to-vehicle distance is a preset fixed value (a constant distance or a constant vehicle-to-vehicle time), and is, for example, a value close to a vehicle-to-vehicle time used in the driver-assistance control. On the other hand, the second set vehicle-to-vehicle distance is a variable value that is changed according to the situation of the subject vehicle Am based on the vehicle-to-vehicle adjustment process (see FIG. 18) to be described later.

The switching condition is set in association with an elapsed time after the switching of the control state, a change in the vehicle speed of the subject vehicle Am, deterioration of a detection environment of the periphery monitoring sensor 30, and the like. For example, when the environment recognition unit 62 recognizes deterioration of the weather such as rain, snow, and fog, or incident of strong sunlight such as the morning sun and the afternoon sun, the travel setting control unit 79 determines that the detection environment deteriorates. In addition, the travel setting control unit 79 determines that the detection environment deteriorates even during nighttime and during traveling in a tunnel.

The travel setting control unit 79 determines that the switching condition of congested time Level 3 is not established immediately after congested time Level 3 starts or in a situation where the detection environment of the periphery monitoring sensor 30 is favorable (S317: NO). In this case, the travel setting control unit 79 controls the vehicle-to-vehicle distance VD under the following traveling control based on the first set vehicle-to-vehicle distance associated with congested time Level 3 (hereinafter, first vehicle-to-vehicle distance for traffic congestion control) (S319). On the other hand, in response to determining that a predetermined time (for example, several tens of seconds) elapsed from the start of congested time Level 3 and the detection environment of the periphery monitoring sensor 30 deteriorates, the travel setting control unit 79 determines that the switching condition of congested time Level 3 is established (S317: YES). In this case, the travel setting control unit 79 controls the vehicle-to-vehicle distance VD under the following traveling control based on the second set vehicle-to-vehicle distance associated with congested time Level 3 (hereinafter, second vehicle-to-vehicle distance for traffic congestion control) (S320). By switching the setting from the first vehicle-to-vehicle distance for traffic congestion control to the second vehicle-to-vehicle distance for traffic congestion control, the subject vehicle Am relatively moves in a direction of increasing the vehicle-to-vehicle distance VD to the follow-target vehicle At.

The travel setting control unit 79 determines that the switching condition of area Level 3 is not established immediately after area Level 3 starts or in a situation where the detection environment of the periphery monitoring sensor 30 is favorable (S318: NO). In this case, the travel setting control unit 79 controls the vehicle-to-vehicle distance VD under the following traveling control based on the first set vehicle-to-vehicle distance associated with area Level 3 (hereinafter, a first vehicle-to-vehicle distance for area control) (S321). The first set vehicle-to-vehicle distance for area control is set such that the vehicle-to-vehicle distance VD is larger than that of the first set vehicle-to-vehicle distance for traffic congestion control.

On the other hand, in response to determining that a predetermined time (for example, several tens of seconds) elapsed from the start of area Level 3 and the detection environment of the periphery monitoring sensor 30 deteriorates, the travel setting control unit 79 determines that the switching condition of area Level 3 is established (S318: YES). When the predetermined time elapsed from the start of area Level 3 and the vehicle speed of the subject vehicle Am is less than a predetermined value (for example, 30 km/h), the travel setting control unit 79 determines that the switching condition of area Level 3 is established. In this case, the travel setting control unit 79 controls the vehicle-to-vehicle distance VD under the following traveling control based on the second set vehicle-to-vehicle distance associated with area Level 3 (a second vehicle-to-vehicle distance for area control) (S322). By switching the setting from the first vehicle-to-vehicle distance for area control to the second vehicle-to-vehicle distance for area control, the subject vehicle Am relatively moves in a direction of reducing the vehicle-to-vehicle distance VD to the follow-target vehicle At.

In response to determining that the switching condition is established in the vehicle-to-vehicle setting process (S317 or S318: YES), the travel setting control unit 79 starts the vehicle-to-vehicle adjustment process shown in FIG. 18. The travel setting control unit 79 recognizes a recognition situation of the traveling environment recognized by the environment recognition unit 62 (S331), and in particular, prioritizes the camera unit 31 of the periphery monitoring sensor 30, and diagnoses whether detection by the camera unit 31 can be performed satisfactorily.

Specifically, the travel setting control unit 79 determines whether a fault such as dirt or a failure occurring on the camera unit 31 is recognized by the environment recognition unit 62 (S332). When the dirt or the like of the camera unit 31 is recognized (S332: YES), the travel setting control unit 79 performs adjustment to reduce the vehicle-to-vehicle distance VD (S334). In this way, when a fault of the camera unit 31 is recognized, the travel setting control unit 79 sets the second set vehicle-to-vehicle distance smaller than that when the fault of the camera unit 31 is not recognized. When the autonomous traveling control of congested time Level 3 is performed, the travel setting control unit 79 adjusts the second set vehicle-to-vehicle distance such that, for example, the second set vehicle-to-vehicle distance has the vehicle-to-vehicle distance VD substantially the same as that in the first setting vehicle-to-vehicle distance (refer to S319 in FIG. 17) or the vehicle-to-vehicle distance VD slightly larger than that in the first setting vehicle-to-vehicle distance.

When there is no dirt on the camera unit 31 (S332: NO), the travel setting control unit 79 refers to a recognition status of the environment recognition unit 62 and determines whether a detection obstruction of the camera unit 31 is present (S333). The environment recognition unit 62 determines whether the detection by the camera unit 31 is obstructed by the follow-target vehicle At. The environment recognition unit 62 determines that the detection is obstructed when a length of a lane marking that defines the subject vehicle lane Lns is equal to or less than a predetermined value or when a size of the follow-target vehicle At exceeds a predetermined size in a front image captured by the camera unit 31. In addition, the environment recognition unit 62 recognizes a type of the follow-target vehicle At based on information (the front image) detected by the camera unit 31. When the type of the follow-target vehicle At is a large-sized vehicle, the environment recognition unit 62 determines that the detection by the camera unit 31 is obstructed.

When the environment recognition unit 62 determines that the detection by the camera unit 31 is not obstructed by the follow-target vehicle At, the travel setting control unit 79 determines that the detection obstruction is not present (S333: NO). In this case, the travel setting control unit 79 performs the following control based on the normal second set vehicle-to-vehicle distance (S335).

On the other hand, when the environment recognition unit 62 determines that the detection by the camera unit 31 is obstructed by the follow-target vehicle At, the travel setting control unit 79 determines that the detection obstruction is present (S333: YES). In this case, the travel setting control unit 79 performs adjustment to increase the vehicle-to-vehicle distance VD (S336), and sets the second set vehicle-to-vehicle distance larger than that when it is determined that the detection by the camera unit 31 is not obstructed by the follow-target vehicle At. When the autonomous traveling control of area Level 3 is performed, the travel setting control unit 79 adjusts the second set vehicle-to-vehicle distance such that, for example, the second set vehicle-to-vehicle distance has the vehicle-to-vehicle distance VD substantially the same as that in the first setting vehicle-to-vehicle distance (refer to S321 in FIG. 17) or the vehicle-to-vehicle distance VD slightly smaller than that in the first setting vehicle-to-vehicle distance. As described above, the travel setting control unit 79 prioritizes the detection by the camera unit 31, changes a control amount of the second set vehicle-to-vehicle distance in accordance with the type or the like of the forward follow-target vehicle At, and moves the subject vehicle Am to a position where the camera unit 31 easily confirms the front.

Next, an example of a scene in which the setting of the vehicle-to-vehicle distance VD under the following traveling control is changed by vehicle-to-vehicle setting control and vehicle-to-vehicle adjustment control described above will be described with reference to FIGS. 1, 4, 17, and 18 based on FIG. 19.

Figure 19:
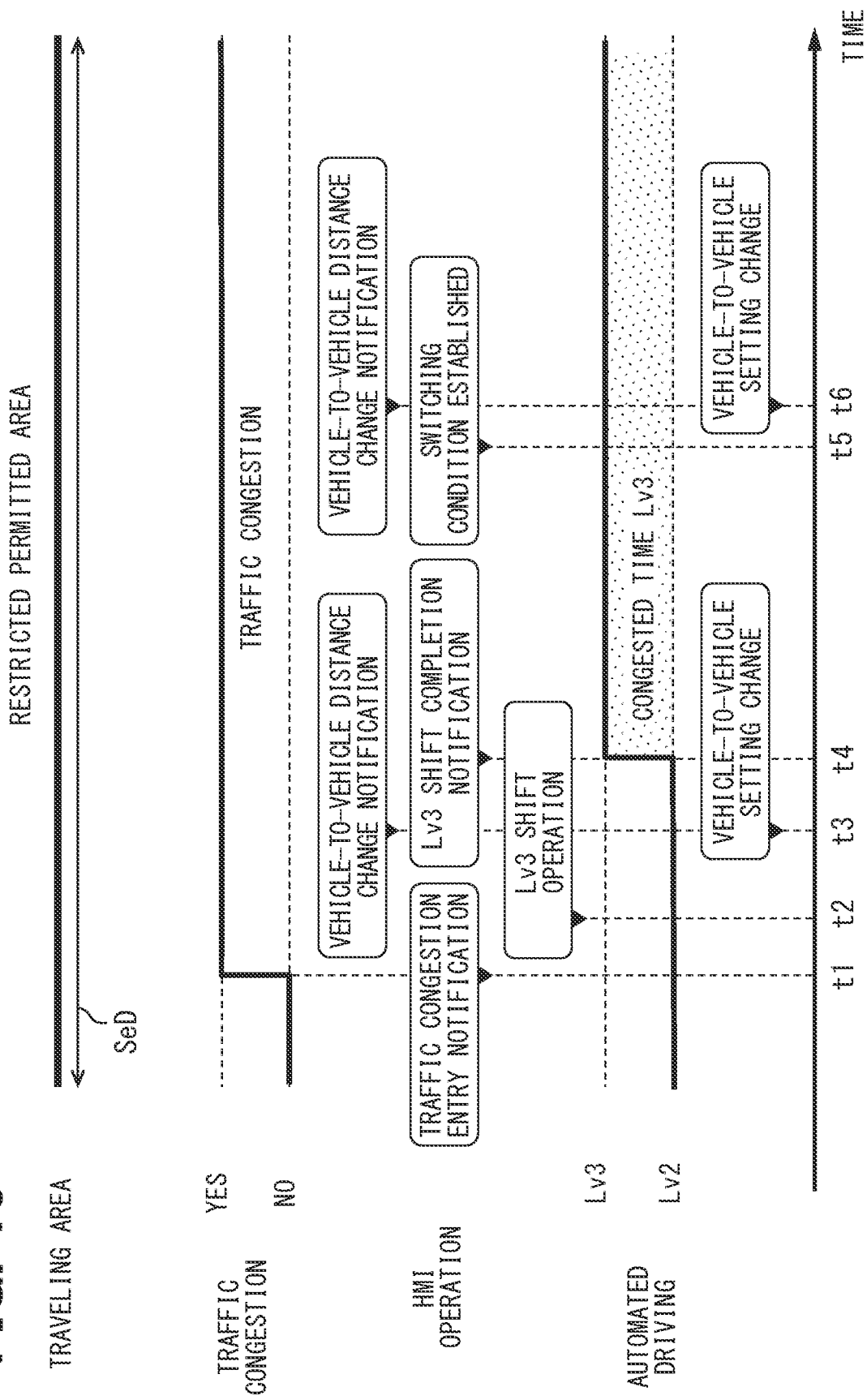
FIG. 19 is a time chart showing details of control in a scene in which the setting of the vehicle-to-vehicle distance is changed from a first vehicle-to-vehicle distance to the second vehicle-to-vehicle distance.

In a scene shown in FIG. 19, the subject vehicle Am is traveling in the restricted permitted area SeD. When the traffic congestion recognition unit 76 recognizes an entry into the traffic congestion in the restricted permitted area SeD (time t1), the control switching unit 78 permits the shift to congested time Level 3. The presentation control unit 88 issues a traffic congestion entry notification based on the notification request acquired from the notification request unit 73, and notifies the driver that the autonomous traveling control of congested time Level 3 is available.

When Level 3 shift operation input in response to the traffic congestion entry notification is recognized by the input recognition unit 71 (time t2), the travel setting control unit 79 changes the setting to increase the vehicle-to-vehicle distance VD (time t3). The presentation control unit 88 issues the vehicle-to-vehicle distance change notification indicating a change for increasing the vehicle-to-vehicle distance VD, based on the notification request acquired from the notification request unit 73 or the vehicle-to-vehicle change information. After the vehicle-to-vehicle distance VD is changed by the travel setting control unit 79, the control switching unit 78 switches the traveling control state from the driver-assistance control to the autonomous traveling control of congested time Level 3 (time t4). The presentation control unit 88 issues a shift completion notification indicating completion of the shift to autonomous traveling control of congested time Level 3 based on acquisition of the notification request output after the vehicle-to-vehicle distance VD is changed.

When a predetermined time elapsed from the start of congested time Level 3 and the detection environment of the periphery monitoring sensor 30 deteriorates, for example, the travel setting control unit 79 establishes a switching condition for setting the vehicle-to-vehicle distance VD (time t5). The travel setting control unit 79 switches a control target from the first set vehicle-to-vehicle distance to the second set vehicle-to-vehicle distance based on the establishment of the switching condition, and changes the vehicle-to-vehicle distance VD to the follow-target vehicle At (time t6). For example, the vehicle-to-vehicle distance VD which is about 20 m is gradually increased to about 30 m by switching the setting of the vehicle-to-vehicle.

The notification request unit 73 outputs a notification request to the information acquisition unit 81 based on a change in the setting of the target vehicle-to-vehicle distance by the travel setting control unit 79, and notifies the driver of the change in the inter-vehicle distance VD associated with the switching between the first set vehicle-to-vehicle distance and the second set vehicle-to-vehicle distance. The presentation control unit 88 issues a vehicle-to-vehicle distance change notification indicating a change for increasing the vehicle-to-vehicle distance VD, based on acquisition of the notification request by the information acquisition unit 81.

Further, when congested time Level 3 is terminated and the traveling control state shifts from the driver-assistance control, the travel setting control unit 79 changes the setting of the vehicle-to-vehicle distance VD from the subject vehicle Am to the follow-target vehicle At (refer to time t6 in FIG. 11). In the third embodiment, since the target vehicle-to-vehicle time associated with the hands-on control and the target vehicle-to-vehicle time associated with the hands-off control are different from each other, a degree of change in the setting of the vehicle-to-vehicle distance VD after the shift changes depending on whether the traveling control state after the shift is under the hands-on control or the hands-off control. That is, the travel setting control unit 79 changes the setting of the vehicle-to-vehicle distance VD after the shift, depending on a case of shift from the autonomous traveling control to the hands-on control or a case of shift from the autonomous traveling control to the hands-off control. As described above, in the case of the shift to the hands-on control, the vehicle-to-vehicle distance VD is larger than that in the case of the shift to the hands-off control. The vehicle-to-vehicle distance VD after the shift to the hands-off control may be approximately the same as the vehicle-to-vehicle distance VD under the autonomous traveling control.

In the third embodiment described above, after the vehicle-to-vehicle distance VD is changed, the shift completion notification indicating the completion of the shift of the traveling control state is issued. As a result, the same effect as that of the first embodiment can also be obtained in the third embodiment, the driver can easily recognize the process for changing the vehicle-to-vehicle distance VD, and thus the convenience of automated driving can be improved.

In addition, in the third embodiment, in the subject vehicle Am traveling under the autonomous traveling control, by switching the setting of the vehicle-to-vehicle distance VD from the first set vehicle-to-vehicle distance to the second set vehicle-to-vehicle distance, detection of the periphery of the subject vehicle by the periphery monitoring sensor 30 and recognition for the traveling environment are facilitated. As a result, the automated driving with no periphery monitoring obligation is easily continued, and thus the convenience of automated driving can be improved.

The environment recognition unit 62 according to the third embodiment recognizes a fault occurring in the periphery monitoring sensor 30, such as adhesion of dirt to an angle of view of the camera unit 31. When a fault of the periphery monitoring sensor 30 is recognized, the travel setting control unit 79 sets the second set vehicle-to-vehicle distance smaller than that when the fault of the periphery monitoring sensor 30 is not recognized. According to such adjustment of the vehicle-to-vehicle distance VD, the subject vehicle Am can move to a position where the camera unit 31 can easily detect the front of the subject vehicle. As a result, the automated driving with no periphery monitoring obligation is more likely to be continued.

Further, the environment recognition unit 62 according to the third embodiment determines whether the detection by the periphery monitoring sensor 30 such as the camera unit 31 is obstructed by the follow-target vehicle At. In response to determining that the detection by the periphery monitoring sensor 30 is obstructed by the follow-target vehicle At, the travel setting control unit 79 sets the second set vehicle-to-vehicle distance larger than that when it is determined that the detection by the periphery monitoring sensor 30 is not obstructed by the follow-target vehicle At. According to such adjustment of the vehicle-to-vehicle distance VD, the subject vehicle Am can move to a position where the camera unit 31 can easily detect the front of the subject vehicle. Therefore, the automated driving with no periphery monitoring obligation is more likely to be continued.

In addition, in the third embodiment, the control mode of the autonomous traveling control includes area Level 3 that is performed only for travel in the permitted area SeA, and congested time Level 3 that is performed only for travel in the traffic congestion. The travel setting control unit 79 is provided with the first vehicle-to-vehicle distance for area control associated with area Level 3 and the first vehicle-to-vehicle distance for traffic congestion control associated with congested time Level 3. Further, the second set vehicle-to-vehicle distance for area control is made smaller than the first vehicle-to-vehicle distance for area control, and the second set vehicle-to-vehicle distance for traffic congestion control is made larger than the first vehicle-to-vehicle distance for traffic congestion control. According to the switching of the vehicle-to-vehicle setting in each state, the automated driving ECU 50b can continuously locate the subject vehicle Am at a position where the detection of the periphery monitoring sensor 30 is easy in relation to a target in the periphery of the subject vehicle. As a result, the automated driving with no periphery monitoring obligation is more likely to be continued.

In the third embodiment, the type of the follow-target vehicle At is recognized based on the information detected by the periphery monitoring sensor 30, and the second set vehicle-to-vehicle distance is changed according to the type of the follow-target vehicle At. According to this vehicle-to-vehicle control, for example, when the follow-target vehicle At is a large-sized vehicle, the vehicle-to-vehicle distance VD can be ensured large. As a result, since a field of view of the camera unit 31 is less likely to be blocked by the follow-target vehicle At, the automated driving with no periphery monitoring obligation is more likely to be continued.

Further, in the third embodiment, in order to facilitate the detection of the camera unit 31 that detects the periphery of the subject vehicle Am, that is, to prioritize the camera unit 31, the second set vehicle-to-vehicle distance is set. According to the above description, even when the following traveling control depending on the detection by the camera unit 31 is performed, the interruption of the automated driving due to the presence of the detection obstruction is less likely to occur.

In addition, in the third embodiment, a change in the vehicle-to-vehicle distance VD due to the switching between the first set vehicle-to-vehicle distance and the second set vehicle-to-vehicle distance is notified to the driver. By executing the vehicle-to-vehicle distance change notification, the driver can recognize that the vehicle-to-vehicle distance VD is changed, and can recognize that the change in the vehicle-to-vehicle distance VD is not caused by an abnormality. Accordingly, a situation in which the driver feels uncomfortable with the change in the vehicle-to-vehicle distance VD for detection by the periphery monitoring sensor 30 is less likely to occur.

In the third embodiment, the setting of the vehicle-to-vehicle distance VD is changed between a hands-on control in which the driver has a holding obligation of a steering wheel and a hands-off control in which the driver does not have the holding obligation of the steering wheel. According to the above description, since the vehicle-to-vehicle distance VD suitable for each of the hands-on control and the hands-off control can be ensured at the timing of the shift from the autonomous traveling control to the driver-assistance control, the driver is less likely to feel uncomfortable with the vehicle-to-vehicle distance VD under the driver-assistance control. As a result, the convenience of automated driving can be improved.

Further, in the third embodiment, the vehicle-to-vehicle distance VD under the hands-on control is set to be larger than the vehicle-to-vehicle distance VD under the hands-off control. In general, since a speed range where the hands-on control is used is higher than a speed range where the hands-off control is used, according to the setting in which the vehicle-to-vehicle distance VD under the hands-on control is ensured to be large, it is possible to perform the driver-assistance control in which it is less likely for the driver to feel uncomfortable. In the third embodiment, the periphery monitoring sensor 30 corresponds to an "autonomous sensor" and the camera unit 31 corresponds to a "camera".

Fourth Embodiment

A fourth embodiment according to the present disclosure is a modification of the second embodiment. In the fourth embodiment, the vehicle-to-vehicle distance VD is adjusted according to a gradient state of a road on which the vehicle travels. In addition, in the fourth embodiment, the setting of the vehicle-to-vehicle distance VD can be changed based on a driver's input. Hereinafter, details of the setting of the vehicle-to-vehicle distance VD in the fourth embodiment will be described with reference to FIGS. 1 to 4.

<Vehicle-to-vehicle Control According to Gradient>

The road information recognition unit 75 recognizes gradient information on the road on which the subject vehicle Am travels. The road information recognition unit 75 can estimate the gradient of the road on which the vehicle travels based on three-dimensional map data sequentially provided from the locator 35 to the environment recognition unit 62. In addition, the road information recognition unit 75 may estimate the gradient of the road on which the subject vehicle Am travels based on measurement information from an acceleration sensor, a height sensor, and the like among vehicle-mounted sensors mounted on the subject vehicle Am.

The travel setting control unit 79 changes the setting of the vehicle-to-vehicle distance VD under the following traveling control according to a gradient state of the road on which the vehicle travels based on the gradient information acquired by the road information recognition unit 75. The travel setting control unit 79 may adjust the setting of the vehicle-to-vehicle distance VD regardless of the presence or absence of the periphery monitoring obligation of the driver, or may adjust a set vehicle-to-vehicle distance based on the gradient information only in a driver-assistance period in which the driver has the periphery monitoring obligation.

When the vehicle travels on a road having a downward gradient, the travel setting control unit 79 sets the vehicle-to-vehicle distance VD larger than that when the vehicle travels on a road having an upward gradient and when the vehicle travels on a horizontal road (flat road), based on the gradient information. The travel setting control unit 79 adjusts the set vehicle-to-vehicle distance such that the vehicle-to-vehicle distance VD increases stepwise or continuously as the downward gradient of the road increases. When the downward gradient of the road exceeds a predetermined threshold, the travel setting control unit 79 may perform adjustment to increase the vehicle-to-vehicle distance VD by one step.

<Adjustment of Vehicle-to-Vehicle Distance Setting by Driver>

The driver-assistance ECU 50a and the automated driving ECU 50b can change the setting of the vehicle-to-vehicle distance VD under the following traveling control based on the driver's input. For example, the driver-assistance ECU 50a and the automated driving ECU 50b can switch the set vehicle-to-vehicle distance among three stages such as "long (far), intermediate, short (close)" or five stages such as "long, slightly long, intermediate, slightly short, short". The setting of the vehicle-to-vehicle distance VD corresponding to each traveling control state is associated with the multi-stage set vehicle-to-vehicle distance. As a result, a change in the setting of the vehicle-to-vehicle distance VD associated with the shift of the traveling control state corresponds to, for example, a process for automatically switching the set vehicle-to-vehicle distance among the five stages.

When the vehicle-to-vehicle distance VD associated with the driver-assistance control is set to be larger than the vehicle-to-vehicle distance VD associated with the autonomous traveling control, the travel setting control unit 79 prioritizes the setting of the vehicle-to-vehicle distance VD associated with the driver-assistance control even when the traveling control state shifts from the driver-assistance control to the autonomous traveling control. Therefore, when the driver performs an operation of increasing the set vehicle-to-vehicle distance during traveling under the driver-assistance control, the setting of the vehicle-to-vehicle distance VD is maintained even when the traveling control state shifts from the driver-assistance control to the autonomous traveling control. In this case, before or after the shift to the autonomous traveling control, the execution of the vehicle-to-vehicle distance change notification (see FIGS. 9 and 16) may be omitted.

When the vehicle-to-vehicle distance VD associated with the autonomous traveling control is set to be larger than the vehicle-to-vehicle distance VD associated with the driver-assistance control, the travel setting control unit 79 prioritizes the setting of the vehicle-to-vehicle distance VD associated with the autonomous traveling control even when the traveling control state shifts from the autonomous traveling control to the driver-assistance control. Therefore, when the driver performs an operation of increasing the set vehicle-to-vehicle distance during traveling under the autonomous traveling control, the setting of the vehicle-to-vehicle distance VD is maintained even when the traveling control state shifts from the autonomous traveling control to the driver-assistance control. In this case, the vehicle-to-vehicle distance change notification also may not be issued.

Figure 20:
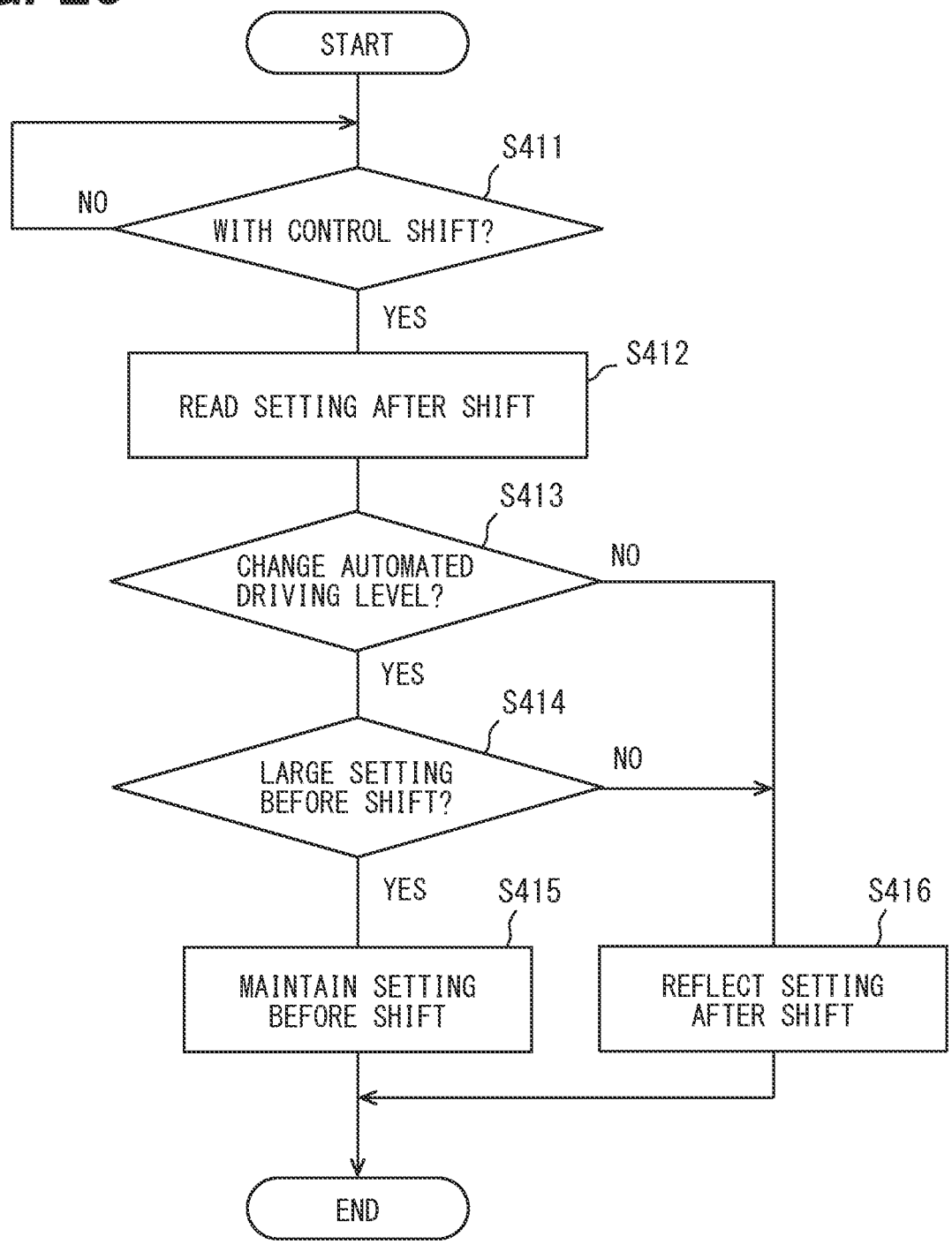
FIG. 20 is a flowchart showing details of a vehicle-to-vehicle setting process according to a fourth embodiment.

By executing a vehicle-to-vehicle setting process (see FIG. 20), the travel setting control unit 79 cooperates with the driver-assistance ECU 50a to reflect a set vehicle-tovehicle distance adjusted to match the preference of the driver in one traveling control state to a set vehicle-to-vehicle distance in another traveling control state. Similarly to the first embodiment, the travel setting control unit 79 starts the vehicle-to-vehicle setting process based on the start of the driver-assistance control by the driver-assistance ECU 50a, and continues the vehicle-to-vehicle setting process until the driver-assistance control is in an off-state.

The travel setting control unit 79 recognizes the presence or absence of the shift (scheduled shift) of the traveling control state by the control switching unit 78 in the vehicle-to-vehicle setting process (S411). When the traveling control state shifts (S411: YES), the travel setting control unit 79 reads the setting of the vehicle-to-vehicle distance VD associated with the traveling control state after the shift (S412). The travel setting control unit 79 determines whether the automated driving level is changed, in other words, whether the presence or absence of the periphery monitoring obligation is changed, based on the shift of the traveling control state (S413). When the automated driving level is not changed (S413: NO), the travel setting control unit 79 reflects the setting of the vehicle-to-vehicle distance VD associated with the traveling control state after the shift (S416). For example, in a case where the traveling control state shifts from one of congested time Level 3 and area Level 3 to the other, or in a case where the traveling control state shifts from one of hands-on Level 2 and hands-off Level 2 to the other, the set vehicle-to-vehicle distance is changed as usual.

When the automated driving level is changed (S413: YES), the travel setting control unit 79 compares a set vehicle-to-vehicle distance before the shift (present) with a set vehicle-to-vehicle distance after the shift (S414). When the set vehicle-to-vehicle distance before the shift is smaller than the set vehicle-to-vehicle distance after the shift (S414: NO), the travel setting control unit 79 reflects the setting of the vehicle-to-vehicle distance VD associated with the traveling control state after the shift (S416). On the other hand, when the set vehicle-to-vehicle distance before the shift is larger than the set vehicle-to-vehicle distance after the shift (S414: YES), the travel setting control unit 79 maintains the setting of the vehicle-to-vehicle distance VD associated with the traveling control state before the shift (S415). At this time, the travel setting control unit 79 may update information on the set vehicle-to-vehicle distance associated with the traveling control state after the shift stored in the storage unit 53 with information on the set vehicle-to-vehicle distance before the shift. As described above, the setting of the vehicle-to-vehicle distance VD preferred by the driver is shared in multiple traveling control states.

In the fourth embodiment described above, the same effects as those of the above-described embodiments can also be achieved, and the convenience of automated driving can also be improved. Specifically, in the fourth embodiment, the gradient information on the road on which the subject vehicle Am travels is recognized, and the setting of the vehicle-to-vehicle distance VD is changed according to the gradient information. Therefore, a traveling position of the subject vehicle Am under the following traveling control may be adjusted to maintain the vehicle-to-vehicle distance VD at which an occupant including the driver is less likely to feel uneasy about the follow-target vehicle At. According to the above description, since the following traveling control with a sense of security can be performed, the convenience of automated driving can be improved.

In addition, in the fourth embodiment, when the vehicle travels on a road having a downward gradient, the vehicle-to-vehicle distance VD is set to be larger than that when the vehicle travels on a road having an upward gradient and when the vehicle travels on a horizontal road. Since the speed of the subject vehicle Am is likely to increase on the road having a downward gradient, the occupant is likely to feel uneasy. Therefore, if control for increasing the vehicle-to-vehicle distance VD is performed particularly on the road having a downward gradient, it is possible to further improve the sense of security for the following traveling control.

In the fourth embodiment, when the vehicle-to-vehicle distance VD associated with the driver-assistance control is set to be larger than the vehicle-to-vehicle distance VD associated with the autonomous traveling control, the setting of the vehicle-to-vehicle distance VD associated with the driver-assistance control is prioritized even when the traveling control state shifts from the driver-assistance control to the autonomous traveling control. According to the above description, even after the shift to the autonomous traveling control, the vehicle-to-vehicle distance VD that is less likely to cause the driver to be uneasy can be ensured.

Further, in the fourth embodiment, when the vehicle-to-vehicle distance VD associated with the autonomous traveling control is set to be larger than the vehicle-to-vehicle distance VD associated with the driver-assistance control, the setting of the vehicle-to-vehicle distance VD associated with the autonomous traveling control is prioritized even when the traveling control state shifts from the autonomous traveling control to the driver-assistance control. According to the above description, even when the autonomous traveling control is terminated, the vehicle-to-vehicle distance VD that is less likely to cause the driver to be uneasy can be ensured. In the fourth embodiment, the road information recognition unit 75 corresponds to a "gradient recognition unit".

Fifth Embodiment

Figure 21:
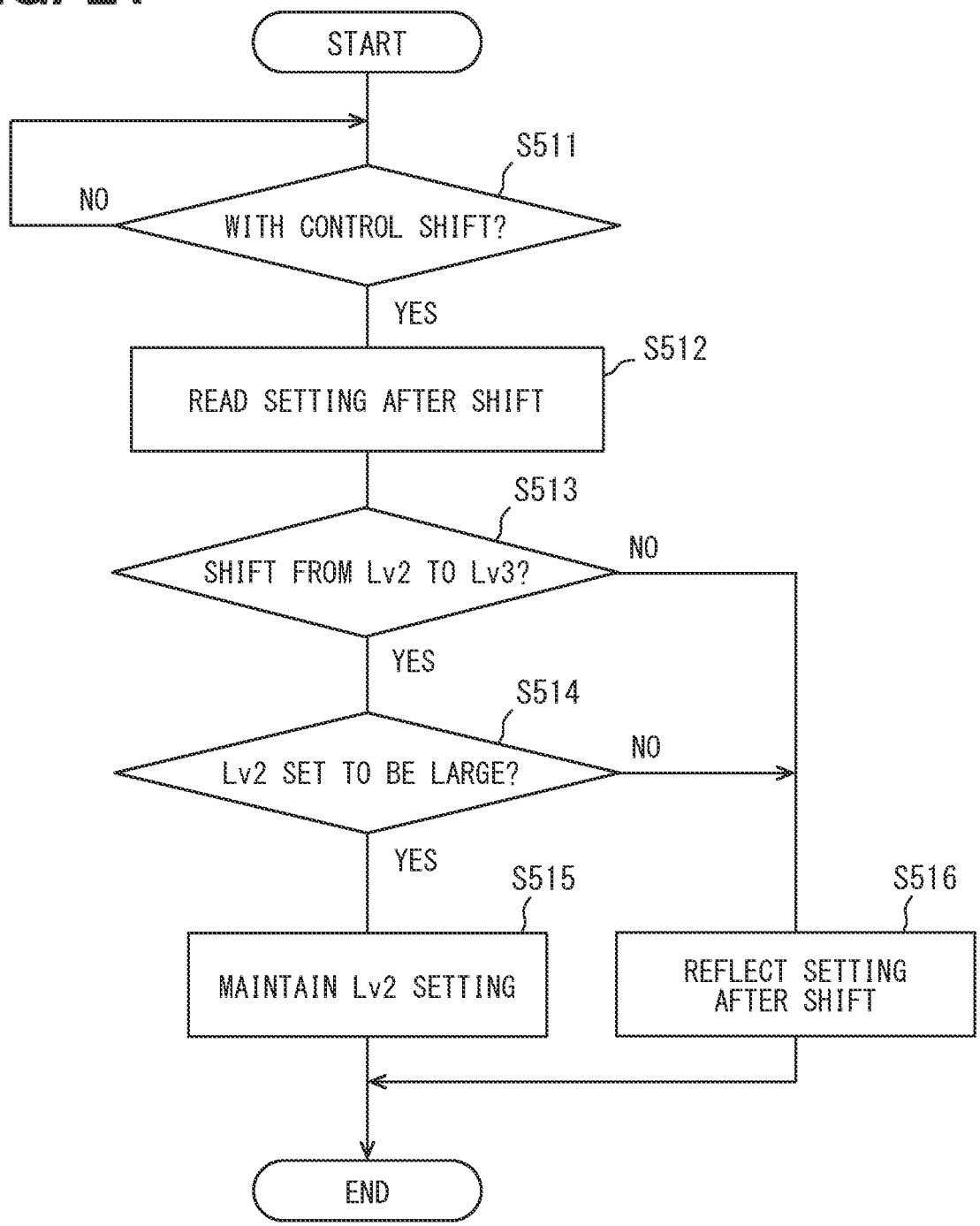
FIG. 21 is a flowchart showing details of a vehicle-to-vehicle setting process according to a fifth embodiment.

A fifth embodiment according to the present disclosure is a modification of the fourth embodiment. In the vehicle-to-vehicle setting process (see FIG. 21) according to the fifth embodiment, the travel setting control unit 79 recognizes whether the traveling control state is to be shifted (S511) as in the fourth embodiment (see FIG. 20). When there is a control shift schedule, the travel setting control unit 79 reads the setting of the vehicle-to-vehicle distance VD associated with the traveling control state after the shift (S512). The travel setting control unit 79 determines whether the recognized shift of the traveling control state is a shift from the driver-assistance control of Level 2 to the autonomous traveling control of Level 3 (S513).

When the shift from the driver-assistance control to the autonomous traveling control is recognized (S513: YES), the travel setting control unit 79 compares the set vehicle-to-vehicle distance of Level 2 before the shift (current) with the set vehicle-to-vehicle distance of Level 3 after the shift (S514), as in the fourth embodiment. In a case where the set vehicle-to-vehicle distance of Level 2 is larger than the set vehicle-to-vehicle distance of Level 3 (S514: YES), even when the traveling control state shifts from the driver-assistance control to the autonomous traveling control, the travel setting control unit 79 prioritizes the setting of the vehicle-to-vehicle distance VD associated with the driver-assistance control (S515). On the other hand, when the shift of the traveling control state to be performed is the shift from the autonomous traveling control to the driver-assistance control (S513: NO), the travel setting control unit 79 changes the setting to the setting of the vehicle-to-vehicle distance VD associated with the driver-assistance control without comparing the set vehicle-to-vehicle distances (S516).

In the fifth embodiment described above, the same effect as that of the fourth embodiment is also obtained, and highly convenient automated driving is realized. Specifically, in the fifth embodiment, the setting of the vehicle-to-vehicle distance VD preferred by the driver can be preferentially applied in a scene in which a control right of the driving operation is handed over to a system. As a result, even after the shift to the autonomous traveling control, the vehicle-to-vehicle distance VD that is less likely to cause the driver to be uneasy can be ensured.

In addition, in the fifth embodiment, even when the set vehicle-to-vehicle distance associated with the autonomous traveling control is larger than the set vehicle-to-vehicle distance associated with the driver-assistance control, the travel setting control unit 79 switches the setting to the setting of the vehicle-to-vehicle distance VD associated with the driver-assistance control when the traveling control state shifts from the autonomous traveling control to the driver-assistance control. Therefore, the driver can reliably notice that the automated driving level is changed from a state in which the vehicle-to-vehicle distance VD is changed. As described above, since it is easier for the driver to receive the control right smoothly, the convenience of automated driving can be further improved.

Other Embodiments

Although the multiple embodiments according to the present disclosure have been described above, the present disclosure is not construed as being limited to the above-mentioned embodiments, and can be applied to various embodiments and combinations within a scope not departing from the spirit of the present disclosure.

As in the fourth and fifth embodiments, when the setting of the vehicle-to-vehicle distance VD can be changed by the driver, there may be a case where a change in the setting of the vehicle-to-vehicle distance VD associated with the switching of the traveling control state does not occur depending on the vehicle-to-vehicle setting based on a driver operation. As an example, in a case where the set vehicle-to-vehicle distance under the driver-assistance control is adjusted to be the largest (longest) by the driver, the adjustment for increasing the vehicle-to-vehicle distance VD cannot be performed even when the traveling control state shifts from the driver-assistance control to congested time Level 3 as in the above-described scene 1. In this case, the setting of the vehicle-to-vehicle distance VD may be maintained even when a process for prioritizing the setting of the vehicle-to-vehicle distance VD by the driver is not performed.

A method for defining the vehicle-to-vehicle distance VD associated with each traveling control state can be appropriately changed. For example, in Modification 1 of the above embodiment, the target vehicle-to-vehicle distance VD is directly defined instead of the target vehicle-to-vehicle time. In the present disclosure, "change the setting to increase the vehicle-to-vehicle distance VD" means changing a setting to increase the vehicle-to-vehicle distance VD when conditions other than the traveling control state are the same. Similarly, "change the setting to reduce the vehicle-to-vehicle distance VD" means changing a setting to reduce the vehicle-to-vehicle distance VD when conditions other than the traveling control state are the same.

In the third embodiment, by switching to the second set vehicle-to-vehicle distance, the vehicle-to-vehicle distance VD is controlled such that the periphery monitoring sensor 30 can detect the periphery of the subject vehicle more easily than the first set vehicle-to-vehicle distance. Thus, the second set vehicle-to-vehicle distance is one of multiple values set in advance so as to be easily detected by the periphery monitoring sensor 30 (the camera unit 31). On the other hand, in Modification 2 of the third embodiment, the travel setting control unit 79 cooperates with the environment recognition unit 62 and adjusts the second set vehicle-to-vehicle distance so as to search for a position where the detection by the camera unit 31 is good. That is, the travel setting control unit 79 according to Modification 2 can set in real time, as the second set vehicle-to-vehicle distance, a position where the periphery of the subject vehicle can be easily detected by the camera unit 31.

In Modification 3 of the third embodiment, the second set vehicle-to-vehicle distance is set so as to prioritize detection by an autonomous sensor different from the camera unit 31. Further, in Modification 4 of the third embodiment, an autonomous sensor by which detection is prioritized is changed according to the traveling environment of the subject vehicle Am. The travel setting control unit 79 according to Modification 4 adjusts the second set vehicle-to-vehicle distance to facilitate the detection by the autonomous sensor selected according to the traveling environment. In Modification 5 of the third embodiment, the second set vehicle-to-vehicle distance is set so as to facilitate detection by an autonomous sensor that detects a rear side or a lateral side of the subject vehicle.

In Modification 6 of the third embodiment, a switching condition to the second set vehicle-to-vehicle distance is simplified as compared with the third embodiment. Specifically, the travel setting control unit 79 according to Modification 6 establishes the switching condition at a timing when an elapsed time after the start of congested time Level 3 or area Level 3 exceeds a predetermined time, and shifts to the vehicle-to-vehicle control using the second set vehicle-to-vehicle distance. Further, when the vehicle speed of the subject vehicle Am exceeds a predetermined value, the travel setting control unit 79 may establish the switching condition and shift to the vehicle-to-vehicle control using the second set vehicle-to-vehicle distance.

Magnitude relations among the first set vehicle-to-vehicle distance for traffic congestion control, the second set vehicle-to-vehicle distance for traffic congestion control, the first set vehicle-to-vehicle distance for area control, and the second set vehicle-to-vehicle distance for area control in the third embodiment may be appropriately changed. Further, a magnitude relation between the set vehicle-to-vehicle distances (target vehicle-to-vehicle times) associated with the hands-on control and the hands-off control may be appropriately changed.

In Modification 7 of the above embodiment, functions of the driver-assistance ECU 50a and the automated driving ECU 50b are provided by one automated driving ECU. That is, the function of the driver-assistance ECU 50a is implemented in the automated driving ECU 50b according to Modification 7.

In Modification 8 of the above embodiment, functions of the driver-assistance ECU 50a, the automated driving ECU 50b, and the HCU 100 are provided by one integrated ECU. In Modification 8, the integrated ECU corresponds to the "automated driving control device" and the "presentation control device".

Further, in the above embodiment, the automated driving ECU 50b and the HCU 100 correspond to the "automated driving control device" and the "presentation control device", respectively. However, a system including the automated driving ECU 50b and the HCU 100 may have a configuration corresponding to the "automated driving control device" and the "presentation control device".

In Modification 9 of the above embodiment, the automated driving ECU 50b can perform automated driving at Level 4 or higher. Further, in the fourth embodiment, a process for reflecting a set vehicle-to-vehicle distance of another level on a set vehicle-to-vehicle distance of Level 4 automated driving, or a process for reflecting the set vehicle-to-vehicle distance of Level 4 automated driving on the set vehicle-to-vehicle distance of the other level may be performed. Specifically, when the set vehicle-to-vehicle distance in Level 4 automated driving is larger than the set vehicle-to-vehicle distances in the other level (YES in S414 in FIG. 20), the set vehicle-to-vehicle distance of Level 4 may be preferentially applied even after the control shifts from Level 4 to Level 2 or Level 3. Further, when the set vehicle-to-vehicle distance of the other level is larger than the set vehicle-to-vehicle distance of Level 4 automated driving, the set vehicle-to-vehicle distance before the shift may be preferentially applied even after the control shift from Level 2 or 3 to Level 4.

In Modification 10 of the fourth embodiment, the setting of the vehicle-to-vehicle distance VD is shared only when the vehicle travels in traffic congestion. Specifically, in Modification 10, the setting of the vehicle-to-vehicle distance VD before the shift is maintained when the set vehicle-to-vehicle distance before the shift is larger than the set vehicle-to-vehicle distance after the shift during the shift from congested time Level 2 to congested time Level 3 or during the shift from congested time Level 3 to congested time Level 2. The driver-assistance control of Level 2 may be either hands-on Level 2 or hands-off Level 2.

In Modification 11 of the fourth embodiment, even in the control shift in which an automated driving level is maintained, when the set vehicle-to-vehicle distance before the shift is larger than the set vehicle-to-vehicle distance after the shift, the setting of the vehicle-to-vehicle distance VD before the shift is continuously used. For example, even in a case where the control shifts from one of congested time Level 3 and area Level 3 to the other, or in a case where the control shifts from one of hands-on Level 2 and hands-off Level 2 shifts to the other, control for reducing the vehicle-to-vehicle distance is not performed.

In Modification 12 of the fourth embodiment, adjustment control of the vehicle-to-vehicle distance VD based on the gradient information is different from that of the fourth embodiment. In Modification 12, the set vehicle-to-vehicle distance on a horizontal road having substantially no gradient is larger than a set vehicle-to-vehicle distance on a road having an upward gradient. The travel setting control unit 79 ensures a set vehicle-to-vehicle distance on a road having a downward gradient to be the largest, and sets the set vehicle-to-vehicle distance on the road having an upward gradient to be the smallest. As in Modification 12 described above, adjustment contents of the vehicle-to-vehicle distance VD according to a gradient state may be appropriately changed.

In the above embodiments, functions provided by the automated driving ECUs and the HCU can be provided by software and hardware for executing the software, only software, only hardware, or a complex combination of the hardware and the software. Moreover, when the above functions are provided by an electronic circuit as hardware, each function may also be provided by a digital circuit which includes multiple logic circuits, or an analog circuit.

Each processing unit according to the above-described embodiments may be individually mounted on a printed circuit board, or may be mounted on an application specific integrated circuit (ASIC), an FPGA, or the like. A form of a storage medium (a continuous tangible computer storage medium, a non-transitory tangible storage medium) that stores various programs and the like may also be appropriately changed. Further, the storage medium is not limited to a configuration provided on a circuit board, and may be provided in a form of a memory card or the like, inserted into a slot portion, and electrically connected to a control circuit of the automated driving ECUs or the HCU. The storage medium may be an optical disk, a hard disk drive, or the like from which programs are copied to the automated driving ECUs or the HCU.

The vehicle on which the automated driving system and the HMI system are mounted is not limited to a general passenger vehicle for private use, and may be a rental vehicle, a manned taxi vehicle, a ride-sharing vehicle, a cargo vehicle, a bus, or the like. The vehicle on which the automated driving system and the HMI system are mounted may be a right-hand drive vehicle or a left-hand drive vehicle. Further, a traffic environment in which the vehicle travels may be a traffic environment on the assumption of left-hand traffic or a traffic environment on the assumption of right-hand traffic. Autonomous driving control and information presentation according to the present disclosure may be optimized as appropriate in accordance with the Road Traffic Law of each country and region, a steering wheel position of the vehicle, and the like.

The control unit and the method thereof described in the present disclosure may be implemented by a dedicated computer constituting a processor programmed to execute one or multiple functions embodied by a computer program. Alternatively, the device and the method thereof described in the present disclosure may be implemented by a dedicated hardware logic circuit. Alternatively, the device and the method thereof described in the present disclosure may be implemented by one or more dedicated computers configured by a combination of a processor executing a computer program and one or more hardware logic circuits. The computer program may be stored in a computer-readable non-transitory tangible recording medium as an instruction to be executed by the computer.

Here, the process of the flowchart or the flowchart described in this application includes a plurality of sections (or steps), and each section is expressed as, for example, S11. Further, each section may be divided into several subsections, while several sections may be combined into one section. Furthermore, each section thus configured may be referred to as a device, module, or means.

The invention claimed is:
1. An automated driving control device comprising:
  a control switching unit configured to switch a traveling control state of a subject vehicle among at least a driving assistance control with a periphery monitoring obligation of a driver and an autonomous traveling control without the periphery monitoring obligation of the driver;
  a vehicle-to-vehicle distance control unit configured to change a setting of a vehicle-to-vehicle distance from the subject vehicle to a follow-target vehicle when the traveling control state shifts from the driving assistance control to the autonomous traveling control; and a notification control unit configured to cause an information presentation device to perform notification indicating a shift completion of a shift to the autonomous traveling control after a change of the vehicle-to-vehicle distance when the traveling control state shifts from the driving assistance control to the autonomous traveling control, wherein the information presentation device presents information to the driver, and after the change of the vehicle-to-vehicle distance, the control switching unit switches the traveling control state from the driving assistance control to the autonomous traveling control, and after the control switching unit has switched the traveling control state from the driving assistance control to the autonomous traveling control, the notification control unit causes the information presentation device to perform the notification indicating the shift completion of the shift to the autonomous traveling control.

2. The automated driving control device according to claim 1, wherein the vehicle-to-vehicle distance control unit changes the vehicle-to-vehicle distance after the control switching unit switches the traveling control state from the driving assistance control to the autonomous traveling control.

3. A non-transitory computer readable storage medium storing an automated driving control program causing at least one processor to:

switch a traveling control state of a subject vehicle among at least a driving assistance control with a periphery monitoring obligation of a driver and an autonomous traveling control without the periphery monitoring obligation of the driver;

change a setting of a vehicle-to-vehicle distance from the subject vehicle to a follow-target vehicle when the traveling control state shifts from the driving assistance control to the autonomous traveling control; and cause an information presentation device to provide a notification indicating a shift completion of a shift to the autonomous traveling control after changing the vehicle-to-vehicle distance, wherein the information presentation device presents information to the driver, and after the change of the vehicle-to-vehicle distance, the at least one processor switches the traveling control state from the driving assistance control to the autonomous traveling control, and after having switched the traveling control state from the driving assistance control to the autonomous traveling control, the at least one processor causes the information presentation device to perform the notification indicating the shift completion of the shift to the autonomous traveling control.

4. A presentation control device that is used for a subject vehicle having an automated driving function and controls presentation of information to a driver, the device comprising:

an information acquisition unit configured to acquire switching information indicating switching of a traveling control state among at least a driving assistance control with a periphery monitoring obligation of the driver and an autonomous traveling control without the periphery monitoring obligation of the driver; and a notification control unit configured to provide a notification of shift completion of the traveling control state based on the switching information, wherein the notification control unit provides notification of shift completion of a shift to the autonomous traveling control after the automated driving function changes a vehicle-to-vehicle distance from the subject vehicle to a follow-target vehicle, when the traveling control state shifts from the driving assistance control to the autonomous traveling control, and after the vehicle-to-vehicle distance is changed by the automated driving function and also the traveling control state is switched from the driving assistance control to the autonomous traveling control, the notification control unit provides the notification indicating the shift completion of the shift to the autonomous traveling control.

5. A non-transitory computer readable storage medium storing a presentation control program that is used for a subject vehicle having an automated driving function and controls presentation of information to a driver, the program causing at least one processor to:

acquire switching information indicating switching of a traveling control state among at least a driving assistance control with a periphery monitoring obligation of the driver and an autonomous traveling control without the periphery monitoring obligation of the driver; and provide a notification of shift completion of the traveling control state based on the switching information, wherein the processor provides notification of shift completion of a shift to the autonomous traveling control after the automated driving function changes a vehicle-to-vehicle distance from the subject vehicle to a follow-target vehicle, when the traveling control state shifts from the driving assistance control to the autonomous traveling control, and after the vehicle-to-vehicle distance is changed by the automated driving function and also the traveling control state is switched from the driving assistance control to the autonomous traveling control, the processor provides the notification indicating the shift completion of the shift to the autonomous traveling control.

6. An automated driving control device comprising:

a control switching unit configured to switch a traveling control state of a subject vehicle among at least a driving assistance control with a periphery monitoring obligation of a driver and an autonomous traveling control without the periphery monitoring obligation of the driver;

a traffic congestion recognition unit configured to recognize a traffic congestion in a periphery of the subject vehicle; and a vehicle-to-vehicle distance control unit configured to set a vehicle-to-vehicle distance, from the subject vehicle to a follow-target vehicle, to be lower than the vehicle-to-vehicle distance recognized during traveling with the driving assistance control, when the traffic congestion recognition unit recognizes the traffic congestion during traveling with the autonomous traveling control.

7. The automated driving control device according to claim 6, wherein the autonomous traveling control includes an area limit control limited to traveling in a specific area and a traffic congestion limit control limited to traveling in a traffic congestion, and the vehicle-to-vehicle distance control unit sets the vehicle-to-vehicle distance to be shorter when the control switching unit shifts the traveling control state from the area limit control to the traffic congestion limit control.

8. The automated driving control device according to claim 7, further comprising:
a notification control unit configured to cause an information presentation device to perform notification indicating that the vehicle-to-vehicle distance becomes short when the control switching unit shifts the traveling control state from the area limit control to the traffic congestion limit control, the information presentation device presenting information to the driver.

9. The automated driving control device according to claim 6, wherein
the autonomous traveling control includes a traffic congestion limit control limited to traveling in a traffic congestion, and
the vehicle-to-vehicle distance control unit maintains a setting of the vehicle-to-vehicle distance until a shift to the traffic congestion limit control is completed, when the traffic congestion recognition unit recognizes a traffic congestion during traveling by the driving assistance control and the traveling control state shifts from the driving assistance control to the traffic congestion limit control.

10. The automated driving control device according to claim 9, wherein
the vehicle-to-vehicle distance control unit sets the vehicle-to-vehicle distance to be shorter based on a lapse of a predetermined time after shift completion of a shift from the driving assistance control to the traffic congestion limit control.

11. The automated driving control device according to claim 9, further comprising:
a notification control unit configured to cause an information presentation device to perform notification indicating a change of the vehicle-to-vehicle distance when the control switching unit shifts the traveling control state from the traffic congestion limit control to the driving assistance control, the information presentation device presenting information to the driver, and wherein
the notification control unit stops notification of the change of the vehicle-to-vehicle distance by the information presentation device when the control switching unit shifts the traveling control state from the driving assistance control to the traffic congestion limit control.

12. The automated driving control device according to claim 6, wherein
the autonomous traveling control includes a traffic congestion limit control limited to traveling in a traffic congestion,
the traffic congestion recognition unit predicts that a traffic congestion occurring in a periphery of the subject vehicle is going to be solved, and
the vehicle-to-vehicle distance control unit sets the vehicle-to-vehicle distance to be larger during continuation of the traffic congestion limit control when the traffic congestion recognition unit predicts that the traffic congestion is going to be solved during the traveling.

13. A non-transitory computer readable storage medium storing an automated driving control program causing at least one processor to:
switch a traveling control state of a subject vehicle among at least a driving assistance control with a periphery monitoring obligation of a driver and an autonomous traveling control without the periphery monitoring obligation of the driver; and
set a vehicle-to-vehicle distance, from the subject vehicle to a follow-target vehicle, to be lower than a vehicle-to-vehicle distance recognized during traveling with the driving assistance control in a traffic congestion, during traveling with the autonomous traveling control in the traffic congestion.

14. An automated driving control device comprising:
a control switching unit configured to switch a traveling control state of a subject vehicle among at least a driving assistance control with a periphery monitoring obligation of a driver and an autonomous traveling control without the periphery monitoring obligation of the driver;
a vehicle-to-vehicle distance control unit configured to change a setting of a vehicle-to-vehicle distance from the subject vehicle to a follow-target vehicle when the traveling control state shifts from the driving assistance control to the autonomous traveling control; and
a notification control unit configured to perform, in parallel with notification indicating completion of a shift to the autonomous traveling control, notification indicating that the vehicle-to-vehicle distance changes, when the vehicle-to-vehicle distance changes due to a shift of the traveling control state from the driving assistance control to the autonomous traveling control.

15. The automated driving control device according to claim 14, wherein
the notification control unit performs notification indicating that the vehicle-to-vehicle distance changes, after the shift from the driving assistance control to the autonomous traveling control.

16. The automated driving control device according to claim 14, wherein
the vehicle-to-vehicle distance control unit prioritizes a setting of the vehicle-to-vehicle distance associated with the driving assistance control even when the traveling control state shifts from the driving assistance control to the autonomous traveling control, in a case where the setting of the vehicle-to-vehicle distance associated with the driving assistance control is larger than a setting of the vehicle-to-vehicle distance associated with the autonomous traveling control.

17. The automated driving control device according to claim 14, wherein
the vehicle-to-vehicle distance control unit prioritizes a setting of the vehicle-to-vehicle distance associated with the autonomous traveling control even when the traveling control state shifts from the autonomous traveling control to the driving assistance control, in a case where the setting of the vehicle-to-vehicle distance associated with the autonomous traveling control is larger than a setting of the vehicle-to-vehicle distance associated with the driving assistance control.

18. The automated driving control device according to claim 14, wherein
the vehicle-to-vehicle distance control unit prioritizes a setting of the vehicle-to-vehicle distance associated with the driving assistance control even when the traveling control state shifts from the driving assistance control to the autonomous traveling control, in a case where the setting of the vehicle-to-vehicle distance associated with the driving assistance control is larger than a setting of the vehicle-to-vehicle distance associated with the autonomous traveling control, and the vehicle-to-vehicle distance control unit performs switching to the setting of the vehicle-to-vehicle distance associated with the driving assistance control in response to a shift of the traveling control state from the autonomous traveling control to the driving assistance control, in a case where the setting of the vehicle-to-vehicle distance associated with the autonomous traveling control is larger than a setting of the vehicle-to-vehicle distance associated with the driving assistance control.

19. The automated driving control device according to claim 14, further comprising:

a gradient recognition unit configured to recognize gradient information of road in which the subject vehicle travels, wherein the vehicle-to-vehicle distance control unit changes a setting of the vehicle-to-vehicle distance according to the gradient information.

20. The automated driving control device according to claim 19, wherein when the subject vehicle travels in a downward gradient road, the vehicle-to-vehicle distance control unit sets, based on the gradient information, the vehicle-to-vehicle distance to be larger than a vehicle-to-vehicle distance recognized when the subject vehicle travels in a upward gradient road and when the subject vehicle travels in a horizontal road.

21. An automated driving control device comprising:

a control switching unit configured to switch a traveling control state of a subject vehicle among at least a driving assistance control with a periphery monitoring obligation of a driver and an autonomous traveling control without the periphery monitoring obligation of the driver; and a vehicle-to-vehicle distance control unit configured to change a setting of a vehicle-to-vehicle distance from the subject vehicle to a follow-target vehicle when the traveling control state shifts from the driving assistance control to the autonomous traveling control, wherein the vehicle-to-vehicle distance control unit prioritizes a setting of the vehicle-to-vehicle distance associated with the autonomous traveling control even when the traveling control state shifts from the autonomous traveling control to the driving assistance control, in a case where the setting of the vehicle-to-vehicle distance associated with the autonomous traveling control is larger than a setting of the vehicle-to-vehicle distance associated with the driving assistance control.

22. An automated driving control device comprising:

a control switching unit configured to switch a traveling control state of a subject vehicle among at least a driving assistance control with a periphery monitoring obligation of a driver and an autonomous traveling control without the periphery monitoring obligation of the driver; and a vehicle-to-vehicle distance control unit configured to change a setting of a vehicle-to-vehicle distance from the subject vehicle to a follow-target vehicle when the traveling control state shifts from the driving assistance control to the autonomous traveling control, wherein the vehicle-to-vehicle distance control unit prioritizes a setting of the vehicle-to-vehicle distance associated with the autonomous traveling control even when the traveling control state shifts from the autonomous traveling control to the driving assistance control, in a case where the setting of the vehicle-to-vehicle distance associated with the autonomous traveling control is larger than a setting.

23. An automated driving control device comprising:

a control switching unit configured to switch a traveling control state of a subject vehicle among at least a driving assistance control with a periphery monitoring obligation of a driver and an autonomous traveling control without the periphery monitoring obligation of the driver; and a vehicle-to-vehicle distance control unit configured to change a setting of a vehicle-to-vehicle distance from the subject vehicle to a follow-target vehicle when the traveling control state shifts from the driving assistance control to the autonomous traveling control, wherein the vehicle-to-vehicle distance control unit prioritizes a setting of the vehicle-to-vehicle distance associated with the driving assistance control even when the traveling control state shifts from the driving assistance control to the autonomous traveling control, in a case where the setting of the vehicle-to-vehicle distance associated with the driving assistance control is larger than a setting of the vehicle-to-vehicle distance associated with the autonomous traveling control, and the vehicle-to-vehicle distance control unit performs switching to the setting of the vehicle-to-vehicle distance associated with the driving assistance control in response to a shift of the traveling control state from the autonomous traveling control to the driving assistance control, in a case where the setting of the vehicle-to-vehicle distance associated with the autonomous traveling control is larger than a setting of the vehicle-to-vehicle distance associated with the driving assistance control.

24. A non-transitory computer readable storage medium storing an automated driving control program causing at least one processor to:

switch a traveling control state of a subject vehicle among at least a driving assistance control with a periphery monitoring obligation of a driver and an autonomous traveling control without the periphery monitoring obligation of the driver;

change a setting of a vehicle-to-vehicle distance from the subject vehicle to a follow-target vehicle when the traveling control state shifts from the driving assistance control to the autonomous traveling control; and perform, in parallel with notification indicating completion of a shift to the autonomous traveling control, notification indicating that the vehicle-to-vehicle distance changes, when the vehicle-to-vehicle distance changes due to a shift of the traveling control state from the driving assistance control to the autonomous traveling control.

25. A non-transitory computer readable storage medium storing an automated driving control program causing at least one processor to:

switch a traveling control state of a subject vehicle among at least a driving assistance control with a periphery monitoring obligation of a driver and an autonomous traveling control without the periphery monitoring obligation of the driver;

change a setting of a vehicle-to-vehicle distance from the subject vehicle to a follow-target vehicle when the traveling control state shifts from the driving assistance control to the autonomous traveling control; and prioritize a setting of the vehicle-to-vehicle distance associated with the driving assistance control even when the traveling control state shifts from the driving assistance control to the autonomous traveling control, in a case where the setting of the vehicle-to-vehicle distance associated with the driving assistance control is larger than a setting of the vehicle-to-vehicle distance associated with the autonomous traveling control.

26. A non-transitory computer readable storage medium storing an automated driving control program causing at least one processor to:

switch a traveling control state of a subject vehicle among at least a driving assistance control with a periphery monitoring obligation of a driver and an autonomous traveling control without the periphery monitoring obligation of the driver;

change a setting of a vehicle-to-vehicle distance from the subject vehicle to a follow-target vehicle when the traveling control state shifts from the driving assistance control to the autonomous traveling control; and prioritize a setting of the vehicle-to-vehicle distance associated with the autonomous traveling control even when the traveling control state shifts from the autonomous traveling control to the driving assistance control, in a case where the setting of the vehicle-to-vehicle distance associated with the autonomous traveling control is larger than a setting of the vehicle-to-vehicle distance associated with the driving assistance control.

27. A non-transitory computer readable storage medium storing an automated driving control program causing at least one processor to:

switch a traveling control state of a subject vehicle among at least a driving assistance control with a periphery monitoring obligation of a driver and an autonomous traveling control without the periphery monitoring obligation of the driver;

change a setting of a vehicle-to-vehicle distance from the subject vehicle to a follow-target vehicle when the traveling control state shifts from the driving assistance control to the autonomous traveling control;

prioritize a setting of the vehicle-to-vehicle distance associated with the driving assistance control even when the traveling control state shifts from the driving assistance control to the autonomous traveling control, in a case where the setting of the vehicle-to-vehicle distance associated with the driving assistance control is larger than a setting of the vehicle-to-vehicle distance associated with the autonomous traveling control; and perform switching to the setting of the vehicle-to-vehicle distance associated with the driving assistance control in response to a shift of the traveling control state from the autonomous traveling control to the driving assistance control, in a case where the setting of the vehicle-to-vehicle distance associated with the autonomous traveling control is larger than a setting of the vehicle-to-vehicle distance associated with the driving assistance control.

28. A presentation control device that is used for a subject vehicle having an automated driving function and controls presentation of information to a driver, the device comprising:

an information acquisition unit configured to acquire control status information related to switching of a traveling control state among at least a driving assistance control with a periphery monitoring obligation of the driver and an autonomous traveling control without the periphery monitoring obligation of the driver; and a notification control unit configured to perform, in parallel with notification indicating completion of a shift to the autonomous traveling control, based on the control status information, notification indicating that a vehicle-to-vehicle distance from the subject vehicle to a follow-target vehicle changes when a change of the vehicle-to-vehicle distance due to a shift of the traveling control state from the driving assistance control to the autonomous traveling control is recognized.

29. A non-transitory computer readable storage medium storing a presentation control program that is used for a subject vehicle having an automated driving function and controls presentation of information to a driver, the program causing at least one processor to:

acquire control status information related to switching of a traveling control state among at least a driving assistance control with a periphery monitoring obligation of the driver and an autonomous traveling control without the periphery monitoring obligation of the driver; and perform, in parallel with notification indicating completion of a shift to the autonomous traveling control, based on the control status information, notification indicating that a vehicle-to-vehicle distance from the subject vehicle to a follow-target vehicle changes when a change of the vehicle-to-vehicle distance due to a shift of the traveling control state from the driving assistance control to the autonomous traveling control is recognized.

30. An automated driving control device capable of, by using information of an autonomous sensor, performing an autonomous traveling control without a periphery monitoring obligation of a driver, the device comprising:

an environment recognition unit configured to recognize a traveling environment of a periphery of a subject vehicle for performing the autonomous traveling control based on information detected by the autonomous sensor; and a vehicle-to-vehicle distance control unit configured to switch a setting of a vehicle-to-vehicle distance from the subject vehicle traveling with the autonomous traveling control to a follow-target vehicle among a first setting vehicle-to-vehicle distance associated with the autonomous traveling control and a second setting vehicle-to-vehicle distance that facilitates detection of the periphery of the subject vehicle by the autonomous sensor as compared with the first setting vehicle-to-vehicle distance.

31. The automated driving control device according to claim 30, wherein the environment recognition unit recognizes a failure of the autonomous sensor, and when environment recognition unit recognizes the failure of the autonomous sensor, the vehicle-to-vehicle distance control unit sets the second setting vehicle-to-vehicle distance to be smaller than the second setting vehicle-to-vehicle distance set when the environment recognition unit does not recognize the failure of the autonomous sensor.

32. The automated driving control device according to claim 30, wherein the environment recognition unit determines whether the follow-target vehicle has prevented the detection by the autonomous sensor, and when the environment recognition unit determines that the follow-target vehicle has prevented the detection by the autonomous sensor, the vehicle-to-vehicle distance control unit sets the second setting vehicle-to-vehicle distance to be larger than the second setting vehicle-to-vehicle distance set when the environment recognition unit determines that the follow-target vehicle has not prevented the detection by the autonomous sensor.

33. The automated driving control device according to claim 30, wherein
the autonomous traveling control includes an area limit control limited to traveling in a specific area and a traffic congestion limit control limited to traveling in a traffic congestion,
in the vehicle-to-vehicle distance control unit,
an area control first vehicle-to-vehicle distance that is the first setting vehicle-to-vehicle distance associated with the area limit control and
a traffic congestion control first vehicle-to-vehicle distance that is the first setting vehicle-to-vehicle distance associated with the traffic congestion limit control are prepared,
the second setting vehicle-to-vehicle distance in the area limit control is set to be shorter than the area control first vehicle-to-vehicle distance, and
the second setting vehicle-to-vehicle distance in the traffic congestion limit control is set to be larger than the traffic congestion control first vehicle-to-vehicle distance.

34. The automated driving control device according to claim 30, wherein
the environment recognition unit recognizes a type of the follow-target vehicle based on information detected by the autonomous sensor, and
the vehicle-to-vehicle distance control unit changes the second setting vehicle-to-vehicle distance according to the type of the follow-target vehicle.

35. The automated driving control device according to claim 30, wherein
the autonomous sensor includes at least a camera capturing a periphery of the subject vehicle, and
the vehicle-to-vehicle distance control unit sets the second setting vehicle-to-vehicle distance that facilitates detection of the periphery of the subject vehicle by the camera.

36. The automated driving control device according to claim 30, further comprising
a notification control unit configured to notify the driver of a change of the vehicle-to-vehicle distance due to switching between the first setting vehicle-to-vehicle distance and the second setting vehicle-to-vehicle distance.

37. A non-transitory computer readable storage medium storing an automated driving control program capable of, by using information of an autonomous sensor, performing an autonomous traveling control without a periphery monitoring obligation of a driver, the program causing at least one processor to:
recognize a traveling environment of a periphery of a subject vehicle for performing the autonomous traveling control based on information detected by the autonomous sensor; and
switch a setting of a vehicle-to-vehicle distance from the subject vehicle traveling with the autonomous traveling control to a follow-target vehicle among a first setting vehicle-to-vehicle distance associated with the autonomous traveling control and a second setting vehicle-to-vehicle distance that facilitates detection of the periphery of the subject vehicle by the autonomous sensor as compared with the first setting vehicle-to-vehicle distance.

38. An automated driving control device comprising:
a control switching unit configured to switch a traveling control state of a subject vehicle among at least a driving assistance control with a periphery monitoring obligation of a driver and an autonomous traveling control without the periphery monitoring obligation of the driver; and
a vehicle-to-vehicle distance control unit configured to change a setting of a vehicle-to-vehicle distance from the subject vehicle to a follow-target vehicle when the traveling control state shifts from the autonomous traveling control to the driving assistance control,
wherein
the driving assistance control includes a hands-on control with a steering wheel gripping obligation of the driver and a hands-off control without the steering wheel gripping obligation of the driver, and
depending on a case of a shift from the autonomous traveling control to a hands-on control or a case of a shift from the autonomous traveling control to a hands-off control, the vehicle-to-vehicle distance control unit changes the setting of the vehicle-to-vehicle distance after the shift.

39. The automated driving control device according to claim 38, wherein
the vehicle-to-vehicle distance control unit sets the vehicle-to-vehicle distance in the hands-on control to be smaller than the vehicle-to-vehicle distance in the hands-off control.

40. A non-transitory computer readable storage medium storing an automated driving control program causing at least one processor to:
switch a traveling control state of a subject vehicle among at least a driving assistance control with a periphery monitoring obligation of a driver and an autonomous traveling control without the periphery monitoring obligation of the driver;
change a setting of a vehicle-to-vehicle distance from the subject vehicle to a follow-target vehicle when the traveling control state shifts from the autonomous traveling control to the driving assistance control; and
depending on a case of a shift from the autonomous traveling control to a hands-on control with a steering wheel gripping obligation of the driver or a case of a shift from the autonomous traveling control to a hands-off control without the steering wheel gripping obligation of the driver, change the setting of the vehicle-to-vehicle distance after the shift.

41. An automated driving control device capable of performing an autonomous traveling control without a periphery monitoring obligation of a driver, the device comprising:
a lane recognition unit configured to recognize a characteristic of a subject vehicle lane in which a subject vehicle travels when the subject vehicle travels on a road including a plurality of lanes; and
a vehicle-to-vehicle distance control unit configured to change, according to the characteristic of the subject vehicle lane recognized by the lane recognition unit, a setting of a vehicle-to-vehicle distance from the subject vehicle to a follow-target vehicle in a case of traveling with the autonomous traveling control, wherein
the lane recognition unit is configured to recognize, as the characteristic of the subject vehicle, whether the subject vehicle lane is a passing lane, and
when the subject vehicle lane is the passing lane, the vehicle-to-vehicle distance control unit sets the vehicle-to-vehicle distance to be shorter than the vehicle-to-vehicle distance set when the subject vehicle lane is not the passing lane.

42. The automated driving control device according to claim 41, wherein
the lane recognition unit recognizes, as the characteristic of the subject vehicle lane, whether a traveling speed of a different vehicle traveling in an adjacent lane adjacent to the subject vehicle lane is higher than a traveling speed of the subject vehicle, and
when the traveling speed of the different vehicle in the adjacent lane is higher than the traveling speed of the subject vehicle, the vehicle-to-vehicle distance control unit sets the vehicle-to-vehicle distance to be larger than the vehicle-to-vehicle distance set when the traveling speed of the different vehicle in the adjacent lane is lower than the traveling speed of the subject vehicle.

43. A non-transitory computer readable storage medium storing an automated driving control program capable of performing an autonomous traveling control without a periphery monitoring obligation of a driver, the program causing at least one processor to:
recognize whether a subject vehicle lane is a passing lane, as a characteristic of the subject vehicle lane in which a subject vehicle travels when the subject vehicle travels on a road including a plurality of lanes;
change a setting of a vehicle-to-vehicle distance from the subject vehicle to a follow-target vehicle in a case of traveling with the autonomous traveling control, according to the recognized characteristic of the subject vehicle lane; and
when the subject vehicle lane is the passing lane, set the vehicle-to-vehicle distance to be shorter than the vehicle-to-vehicle distance set when the subject vehicle lane is not the passing lane.

* * * * *